United States Patent
Voss (12)

(10) Patent No.: US 10,351,206 B2
(45) Date of Patent: Jul. 16, 2019

(54) VEHICLE TERRAIN-TRACKING SYSTEMS

(71) Applicant: Darrell W. Voss, Vancouver, WA (US)

(72) Inventor: Darrell W. Voss, Vancouver, WA (US)

( * ) Notice: Subject to any disclaimer, the term of this patent is extended or adjusted under 35 U.S.C. 154(b) by 17 days.

(21) Appl. No.: 15/256,561

(22) Filed: Sep. 3, 2016

(65) Prior Publication Data

US 2016/0368559 A1    Dec. 22, 2016

Related U.S. Application Data

(63) Continuation-in-part of application No. PCT/US2015/018539, filed on Mar. 3, 2015.
(Continued)

(51) Int. Cl.
*B62K 21/02* (2006.01)
*B62K 25/28* (2006.01)
(Continued)

(52) U.S. Cl.
CPC ............ *B62K 25/286* (2013.01); *B62K 11/04* (2013.01); *B62K 15/006* (2013.01); *B62K 19/32* (2013.01); *B62K 21/02* (2013.01); *B62K 21/12* (2013.01); *B62K 21/14* (2013.01); *B62K 21/16* (2013.01); *B62K 21/20* (2013.01); *B62K 25/08* (2013.01); *B62K 25/30* (2013.01); *B62J 2099/002* (2013.01); *B62K 2025/044* (2013.01); *B62K 2201/02* (2013.01)

(58) Field of Classification Search
CPC ........ B62K 21/02; B62K 21/18; B62K 21/20; B62K 25/08
See application file for complete search history.

(56) References Cited

U.S. PATENT DOCUMENTS

| | | | | |
|---|---|---|---|---|
| 1,060,442 A | * | 4/1913 | Erickson | ................ B62K 21/14 403/104 |
| 1,468,835 A | * | 9/1923 | Rosen | .................... B62K 21/14 74/551.2 |

(Continued)

FOREIGN PATENT DOCUMENTS

| | | |
|---|---|---|
| DE | 187931 C | 7/1907 |
| DE | 571105 C | 2/1933 |

(Continued)

OTHER PUBLICATIONS

International Search Report for "Vehicle Terrain-Tracking Device," PCT/US2015/018539, Applicant: Darrell W. Voss, dated Jul. 28, 2015, International Search Authority: United States Patent and Trademark Office, Alexandria, Virginia, United States.
(Continued)

*Primary Examiner* — Joseph M Rocca
*Assistant Examiner* — Michael R Stabley
(74) *Attorney, Agent, or Firm* — Young's Patent Services; Bruce A. Young

(57) ABSTRACT

The present disclosure relates to terrain-tracking or vehicle suspension systems that include travel at least one of the front or the rear of the vehicle. Various embodiments include a suspension above the vehicle (upper suspension). Embodiments include a suspension or travel in at least one of t he upper vehicle (rear and/or front), middle vehicle (rear and/or front), or below vehicle (rear and/or front). Various embodiments included a combination thereof.

18 Claims, 26 Drawing Sheets

Related U.S. Application Data

(60) Provisional application No. 61/947,328, filed on Mar. 3, 2014.

(51) Int. Cl.

| | | |
|---|---|---|
| *B62K 25/30* | (2006.01) |
| *B62K 11/04* | (2006.01) |
| *B62K 15/00* | (2006.01) |
| *B62K 21/14* | (2006.01) |
| *B62K 21/20* | (2006.01) |
| *B62K 21/12* | (2006.01) |
| *B62K 25/08* | (2006.01) |
| *B62K 19/32* | (2006.01) |
| *B62K 21/16* | (2006.01) |
| *B62J 99/00* | (2009.01) |
| *B62K 25/04* | (2006.01) |

(56) References Cited

U.S. PATENT DOCUMENTS

| | | | |
|---|---|---|---|
| 2,233,313 A | 2/1941 | Hazelroth | |
| 2,294,839 A * | 9/1942 | Duffy | B62K 21/14 74/551.2 |
| 3,936,076 A * | 2/1976 | Probst | B62J 1/06 267/147 |
| 4,526,249 A * | 7/1985 | Parker | B62K 25/005 180/219 |
| 4,596,302 A | 6/1986 | Suzuki et al. | |
| 4,756,547 A * | 7/1988 | Trema | B62K 21/005 180/219 |
| 4,815,763 A * | 3/1989 | Hartmann | B62K 21/20 280/275 |
| 4,821,833 A | 4/1989 | Yamaguchi | |
| 4,881,750 A * | 11/1989 | Hartmann | B62K 21/20 188/269 |
| 4,939,950 A * | 7/1990 | Girvin | B62K 21/14 280/279 |
| 5,163,697 A * | 11/1992 | Kastan | B62K 21/20 280/276 |
| 5,186,074 A * | 2/1993 | Arnold | B62K 21/14 188/282.9 |
| 5,207,619 A | 5/1993 | Klein et al. | |
| 5,308,099 A * | 5/1994 | Browning | B62K 21/20 188/319.2 |
| 5,350,185 A * | 9/1994 | Robinson | B62K 21/20 188/322.19 |
| 5,360,088 A | 11/1994 | Voss | |
| 5,364,115 A | 11/1994 | Klein et al. | |
| 5,377,734 A | 1/1995 | Klein et al. | |
| 5,405,159 A | 4/1995 | Klein et al. | |
| 5,433,465 A | 7/1995 | Klein et al. | |
| 5,452,911 A | 9/1995 | Klein et al. | |
| 5,467,665 A * | 11/1995 | Huang | B62K 21/14 280/275 |
| 5,470,091 A | 11/1995 | Voss et al. | |
| 5,499,864 A | 3/1996 | Klein et al. | |
| 5,509,676 A * | 4/1996 | Fukutake | B62K 21/20 280/276 |
| 5,511,444 A * | 4/1996 | Clausen | B62K 21/14 280/276 |
| 5,517,878 A | 5/1996 | Klein et al. | |
| 5,557,982 A | 9/1996 | Voss et al. | |
| 5,579,825 A | 12/1996 | Shibata et al. | |
| 5,586,780 A | 12/1996 | Klein et al. | |
| 5,611,557 A | 3/1997 | Ferris et al. | |
| 5,626,355 A | 5/1997 | Voss et al. | |
| 5,660,406 A * | 8/1997 | Menze, sen. | B62K 21/14 280/276 |
| 5,692,764 A | 12/1997 | Klein et al. | |
| 5,743,547 A | 4/1998 | Voss et al. | |
| 5,749,590 A * | 5/1998 | Roerig | B62K 25/24 280/276 |
| 5,762,352 A | 6/1998 | Lee | |
| 5,826,899 A | 10/1998 | Klein et al. | |
| 5,906,385 A | 5/1999 | Voss | |
| 5,911,428 A * | 6/1999 | Ueda | B62K 21/20 280/276 |
| 5,944,932 A | 8/1999 | Klein et al. | |
| 5,988,741 A | 11/1999 | Voss et al. | |
| 6,026,939 A * | 2/2000 | Girvin | B60G 17/01941 188/266.7 |
| 6,032,971 A | 3/2000 | Herder | |
| 6,109,636 A | 8/2000 | Klein et al. | |
| 6,145,637 A * | 11/2000 | Hopey | B62K 21/08 188/306 |
| 6,164,424 A * | 12/2000 | Girvin | B60G 17/01941 188/266.7 |
| 6,244,398 B1 * | 6/2001 | Girvin | B60G 17/01941 188/282.5 |
| 6,609,722 B1 | 8/2003 | Miyoshi et al. | |
| RE38,669 E | 12/2004 | Voss et al. | |
| 6,848,700 B1 | 2/2005 | Fritschen | |
| 7,100,930 B2 | 9/2006 | Saiki | |
| 7,147,238 B2 | 12/2006 | Oi | |
| 7,350,787 B2 | 4/2008 | Voss | |
| 7,837,213 B2 | 11/2010 | Colegrove et al. | |
| 7,896,379 B2 * | 3/2011 | Nagao | B62K 25/24 280/276 |
| 9,085,337 B2 * | 7/2015 | Jordan | B62K 21/20 |
| 2002/0180166 A1 | 12/2002 | Voss | |
| 2003/0011167 A1 | 1/2003 | Turner | |
| 2006/0063624 A1 | 3/2006 | Voss | |
| 2006/0064223 A1 | 3/2006 | Voss | |
| 2007/0063476 A1 | 3/2007 | Yu | |
| 2008/0035431 A1 | 2/2008 | Vroomen et al. | |
| 2008/0272560 A1 | 11/2008 | Voss | |
| 2009/0160156 A1 | 6/2009 | Yu | |
| 2013/0020782 A1 | 1/2013 | Hoogendoom | |
| 2014/0265208 A1 | 9/2014 | Voss | |
| 2014/0265227 A1 | 9/2014 | Voss | |
| 2015/0291244 A1 | 10/2015 | Hsu | |
| 2016/0031521 A1 | 2/2016 | Voss | |
| 2016/0083042 A1 | 3/2016 | Voss | |
| 2016/0368559 A1 | 12/2016 | Voss | |

FOREIGN PATENT DOCUMENTS

| | | |
|---|---|---|
| DE | 29917301 U1 | 12/1999 |
| DE | 29917307 U1 | 1/2000 |
| GB | 228682 A | 2/1925 |
| JP | H08113178 A | 5/1996 |

OTHER PUBLICATIONS

Matt Brett, Suspension stems are back!, Road.CC, Dec. 3, 2014, Farrelly Atkinson Ltd., Bath, United Kingdom, Accessed on the Internet at: http://road.cc/content/news/164555-naild-launches-r3act-suspension-stem-60mm-travel on Aug. 29, 2016.

David Arthur, Suspension stems are back pt2! ShockStop hits Kickstarter target with pivoting suspension stem, Road.CC, Sep. 10, 2015, Farrelly Atkinson Ltd., Bath, United Kingdom, Accessed on the Internet at: http://road.cc/content/news/163688-suspension-stems-are-back-pt2-shockstop-hits-kickstarter-target-pivoting on Aug. 29, 2016.

European Patent Organization, Supplementary European Search Report and Opinion for counterpart EPO application EP15759157, dated Nov. 2, 2017.

* cited by examiner

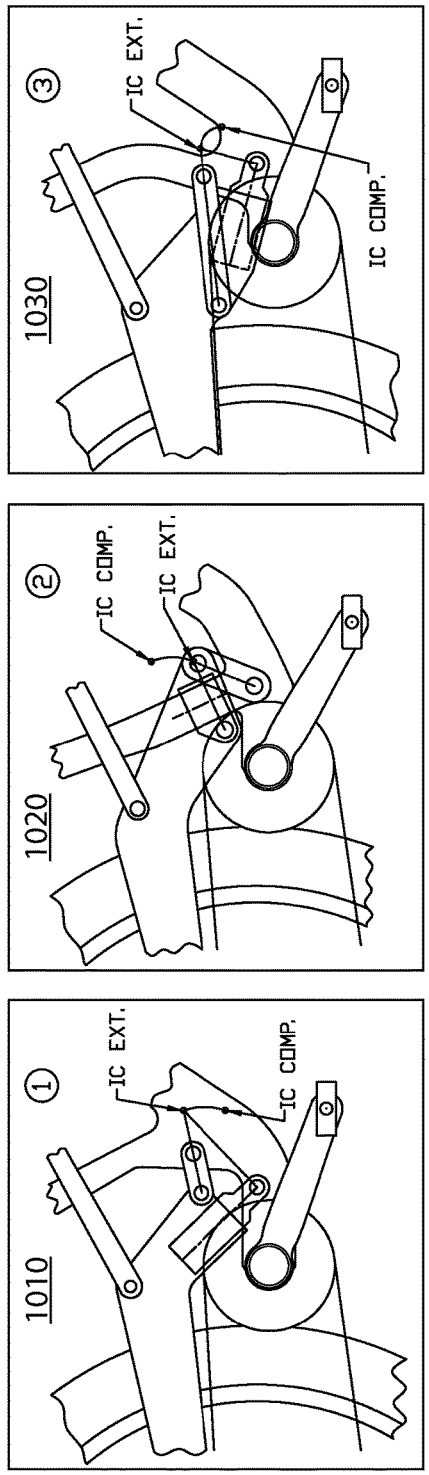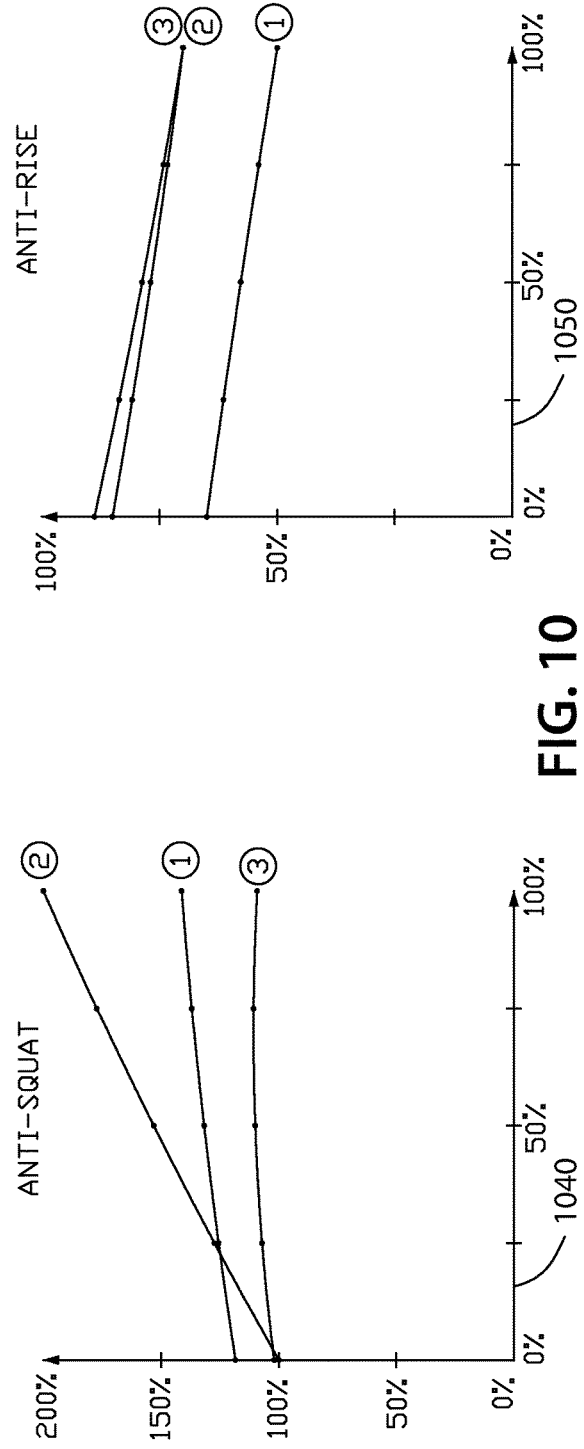
FIG. 10

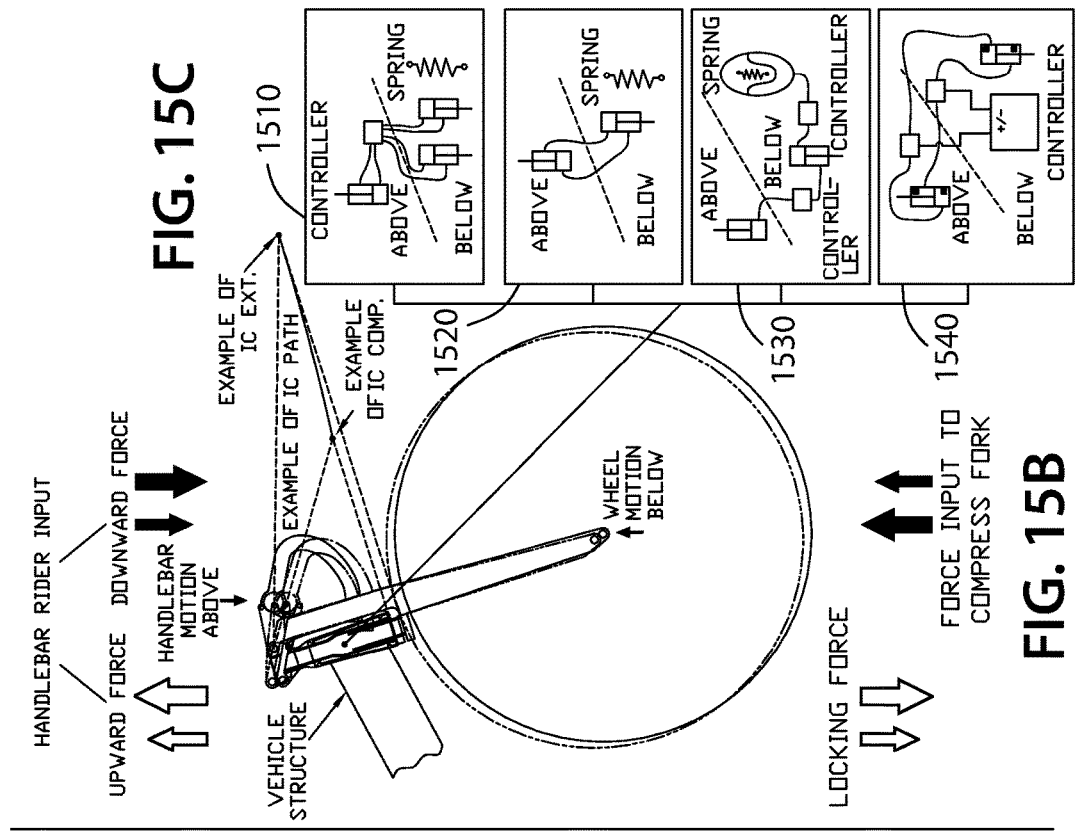
FIG. 15C
FIG. 15B
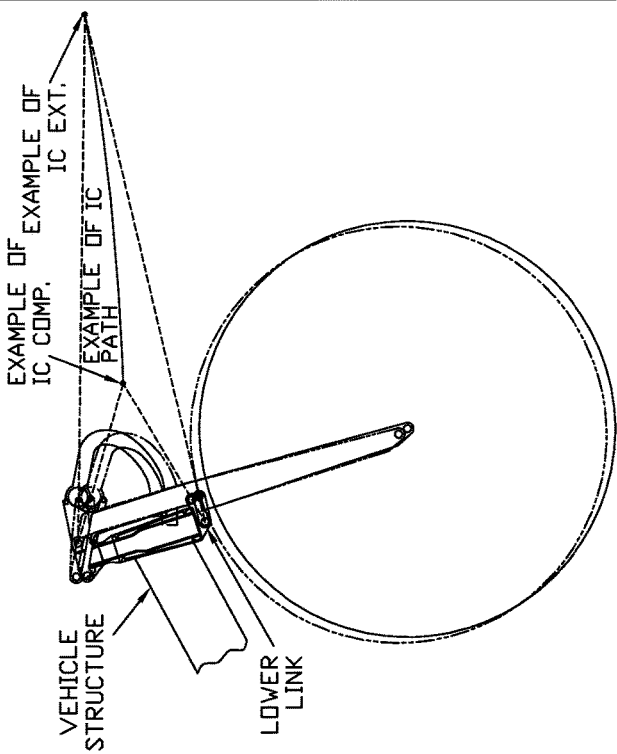
FIG. 15A

วEHICLE TERRAIN-TRACKING SYSTEMS

CROSS-REFERENCE

This application is a continuation-in-part of International Application No. PCT/US2015/018539, with an International filing date of Mar. 3, 2015, which claims the benefit of U.S. Provisional Patent Application Ser. No. 61/947,328 filed on Mar. 3, 2014. The contents of PCT/US2015/018539 and U.S. Provisional Application No. 61/947,328 are incorporated by reference.

FIELD OF THE INVENTION

The disclosure relates generally to a vehicle structure for carrying a vehicle payload that includes a rider and specifically to a vehicle terrain-tracking system.

BACKGROUND

Bicycle frames may be equipped with no suspension, only a front suspension, or with both a front and rear suspension. Bicycles with only front suspension are referred to as hardtail bicycles. Bicycles with only a rear suspension are fairly uncommon, as bicycles with a rear suspension generally also have a front suspension. Bicycles with suspension in both the front and rear of the frame are referred to as full-suspension bikes.

In the distant past, bicycles often had no suspension other than the flex of the frame and softness of the pneumatic tires. Thus, the bicycles were essentially "rigid," such that the bicycle frame transmitted shock from riding on uneven terrain directly to the rider through the seat, pedals, and handlebars. The transmitted shock through the rigid frame to the rider resulted in discomfort to the rider. It also contributes to loss of control and/or energy, especially with a mountain bike on rough terrain.

The most common frame design for a conventional upright bicycle consists of two triangles (i.e., a "diamond frame"), a main triangle forming the front of the frame and a paired triangle forming the rear of the frame. In the diamond frame, the main "triangle" consists of four tubes: the head tube, top tube, down tube and seat tube. The head tube contains the headset, which is the interface with the front forks and the handlebars—allowing them to rotate together relative to the frame. The top tube connects the head tube to the seat tube at the top of the frame. The down tube connects the head tube to the bottom bracket shell. The bottom bracket shell is located at the bottom of the seat tube. A bottom bracket is housed within the bottom bracket shell. The bottom bracket on a bicycle includes a crankset, which rotates. The bottom bracket comprises a spindle that houses the crankset and bearings, which allow the crankset to rotate relative to the spindle. The crankset is the component of a bicycle drivetrain that converts the reciprocating motion of the rider's legs into rotational motion used to drive the chain, which in turn drives the rear wheel. The crankset consists of one or more sprockets, also called chainrings attached to cranks to which the pedals attach.

The rear triangle consists of the seat tube connected by paired chain stays at the bottom of the seat tube and seat stays at an upper portion of the seat tube. The rear triangle connects to the rear fork ends or rear dropouts, where the rear wheel is attached. The rear fork ends include slots or apertures in the bicycle frame on each side of the rear wheel where the axle of a bicycle wheel is attached. The chain stays run connecting the bottom bracket to the rear fork ends. The seat stays connect the top of the seat tube, often located at or near the same point as the top tube, to the rear fork ends.

In order to reduce the discomfort associated with bicycles ridden on uneven terrain, suspension systems were developed. Besides providing comfort to the rider, suspension systems improve traction and safety by helping to keep one or both wheels in contact with the ground. Front suspension systems are often implemented using a telescopic fork configured as a shock absorber with a spring and damper in order to reduce transmitted shock. The implementation of the front suspension systems is relatively uncomplicated as the front wheel is supported by left and right forks that attach to a single head tube at the front of the bicycle frame. Rear suspension system designs may be more complicated due to the fact that the rear wheel is typically supported both by substantially horizontally oriented chain stays that are connected to the bottom bracket shell below the seat post and frame stays, which extend from the rear fork ends to an upper portion of the seat tube.

Rear bicycle frame suspensions are most commonly found in mountain bikes, due to the rough terrain experienced by mountain bike riders. The rear suspension, as with the front suspension, allows the rear wheel to move up and down relative to the rider to absorb shock forces and also to improve tire contact with the ground in rough terrain. Many early rear suspension designs included a shock absorber located between the rear frame and the seat post mounted in varying ways. Some rear suspensions also modified the conventional rear frame designs by utilizing additional frame members, or linking members between the conventional rear frame with the chain stays at the bottom of the seat tube and seat stays at an upper portion of the seat tube and the seat post. Some rear suspensions also modified the configuration of the seat tube.

The single pivot is the simplest type of rear suspension. The rear axle is held by a swingarm which is connected to the frame via a single pivot located on the bottom tube near the bottom bracket shell. When the suspension moves through its travel, the path the rear axle describes is a circle around the single pivot point. The rear triangle may simply be the swingarm. The rear shock may also be attached between the seat tube and the swingarm. This configuration of the single pivot design allows for a fairly linear leverage ratio between wheel travel and shock absorber travel. The main advantage of the single pivot design is its simplicity. It has few moving parts, few pivot points, is relatively easy to design and has good small bump compliance. Challenges with this single pivot design are brake jack and chain growth. Pedal induced forces and rider bobbing can rob the system of efficiency. Due to the limited power output of a human on a bicycle any lack of efficiency is undesirable. Some of these designs are heavy and tend to bounce up and down while a rider pedals. This movement takes power out of a rider's pedal stroke, especially during climbs.

Input from hard braking efforts also negatively affects full suspension designs. When a rider applies the brakes, some of these suspensions compress into their travel and lose some of their ability to absorb bumps. This may happen in situations where the rear suspension is needed most. When braking efforts cause the suspension to compress it is referred to as brake squat, when braking causes the suspension to extend it is called brake jack.

Some rear suspensions were designed to overcome or mitigate the above problems. One variation of single pivot suspension places the pivot in front of and above the bottom bracket, at a height above the smallest chain ring or higher.

This gives the design a significant amount of anti-squat when pedaling in smaller chain rings, which helps reduce loss of energy due to squat. This is particularly of importance on steep climbs, when one would use the smaller chain rings. However, this is a trade-off since the pivot's placement causes the design to suffer more from pedal kickback.

Another variation on the single pivot design is the split pivot design. The split pivot design is a special case of linkage driven single pivot in which one of the four-bar's pivot points coincides with the rear axle. This allows for the disc brake caliper to be mounted on the floating linkage instead of on the swingarm. As a result of this the braking torque now interacts with the suspension via the floating linkage. The linkages can be designed such that this has a positive effect on suspension performance under braking, typically reducing brake jack. Furthermore, the relative rotation between brake disc and brake caliper as the suspension goes through its travel is different from that in single pivot designs. The four linkages in a split pivot design influence how braking torque is transmitted, how the brake caliper moves in relation to the disc and influence the leverage ratio between wheel travel and shock travel. Since these influences may have a different optimum linkage design, the bike's design has to strike a balance.

Other suspension designs rely on the shock absorber design to reduce pedal-induced bobbing and squat. There are many additional rear suspension designs in the prior art. However, a need exists in the art for further improvements of bicycle rear suspension systems to further improve the performance of the rear suspension under braking, acceleration, and further improved anti-squat anti-dive characteristics without complicating trade-offs in performance. It is for these and other concerns that the present disclosure is offered.

SUMMARY

The present disclosure relates to terrain-tracking or vehicle suspension systems that include travel in at least one of the front or the rear of the vehicle. Embodiments may include a suspension or travel in at least one of the upper vehicle (rear and/or front), middle vehicle (rear and/or front), or below vehicle (rear and/or front). Various embodiments may include any such combination thereof. The various suspensions or travel may be actively monitored and/or controlled real time. Such suspensions are tuned to vary riding parameters during operation of the vehicle to provide enhanced vehicle performance.

Various embodiments include a terrain-tracing system for a vehicle for traveling over terrain on a terrain-engaging member. The vehicle has a frame and the terrain-tracing system suspends the frame relative to the terrain. The system includes a terrain-engaging member mounting assembly having a first end and a second end; the mounting assembly coupled to the frame generally at the first end and coupled the terrain-engaging member generally at the second end. The system also includes a slide link coupled to the frame and to the mounting assembly, wherein the slide link is configured and arranged to translate along a frame member of the frame. The system may further include a control link coupled to the frame and the terrain-engaging member mounting assembly.

The slide link includes an aperture that is configured and arranged to receive the frame member, such that when the slide link translates along the frame member, the slide link slides along the frame member that is received by the slide link aperture. An angle between the frame member and the frame is fixed such that when the slide link translates along the frame member, an angular orientation of the slide link relative to the frame is fixed. The frame member is rotationally coupled to the frame such that an angle between the frame member and the frame is variable and when the slide link translates along the frame member, an angular orientation of the slide link relative to the frame varies with the angle between the frame member and the frame.

An angle between the mounting assembly and the frame is variable and an angle between the mounting assembly and the frame member is fixed such that when the mounting assembly rotates relative to the frame, an angular orientation of the slide link relative to mounting assembly is fixed. When the slide link translates along frame member, the angular orientation of the slide link relative to the mounting assembly is fixed and when the mounting assembly rotates relative to the frame, an angular orientation of the slide link relative to the frame varies with the between the mounting assembly and the frame.

The system may be a front suspension, the terrain-engaging member is a front suspension, the terrain-engaging assembly is a fork, and the slide link and control link enables a relative translation between the fork and the frame. The vehicle includes a handlebar and the slide link and the control link enables a relative rotation between the handlebar and the frame. The system further includes a coupling between the relative translation between the fork and the frame and the relative rotation between the handlebar and the frame.

In some embodiments, the slide link includes an aperture and the frame member is a stanchion and is pivotally coupled to the frame, the slide link aperture receives the stanchion such that the slide link slides along the barrel. The control link includes at least one of a gearbox, transmission, or a power source. The frame includes a seat tube and a bottom bracket, wherein a forward end of the control link is pivotally coupled to the mounting assembly and a rearward end of the control link is pivotally coupled to the frame forward of the bottom bracket. The frame member includes at least a portion of the seat tube.

The system may further include at least one eccentric link that enables adjusting an angular orientation of the frame member relative to a vertical line. The at least one eccentric link enables adjusting an angular orientation of the frame member relative to a vertical line. The slide link is pivotally coupled to the arm. The terrain engaging-engaging member is a rear wheel and the mounting assembly forms a swingarm for the vehicle. The swingarm, the slide link, and the control link form a middle rear terrain-tracing sub-system that provides a middle travel of the rear wheel relative to the frame. The vehicle further includes a saddle that is coupled to the frame and supports at least a first portion of a mass of a rider and the system further includes an above rear terrain-tracing sub-system that provides an above travel of the saddle relative to the frame.

The middle and above rear terrain-tracing subsystems are coupled such that a feedback signal is generated between the middle and above rear terrain-tracing subsystems in response to at least one of the rear middle travel or the rear-above travel. The system further includes a middle front terrain-tracing sub-system and an above front terrain-tracing subsystem. The middle and above front terrain-tracing subsystems are is coupled such that a front feedback signal is generated between the middle and above front terrain-tracing subsystems in response to at least one of the front-middle travel or the front-above travel. At least one of the middle or the above rear terrain-tracing subsystems is coupled to at least one of the middle or the above front terrain-tracing subsystems.

The vehicle further includes a foot member that is coupled to the frame and supports at least a second portion of the mass of the rider and the system further includes a below rear terrain-tracing sub-system that provides a below travel of the foot member relative to the frame. The middle, above, and below rear terrain-tracing subsystems are coupled such that a feedback signal is generated between the middle, above terrain-tracing subsystems in response to at least one of the middle travel or the above travel. The vehicle further includes a foot member that is coupled to the frame and supports at least a second portion of the mass of the rider and the system further includes a below rear terrain-tracing sub-system that provides a below travel of the foot member relative to the frame.

The middle and below rear terrain-tracing subsystems are coupled such that a feedback signal is generated between the middle, above terrain-tracing subsystems in response to at least one of the middle travel or the above travel. The system further includes a cantilevered bottom bracket. The frame member is configurable in an anti-squat orientation and a pro-squat orientation. The system further includes a sensor that actively adjusts a terrain-tracing system parameter in response to a current position of a center of mass of a vehicle payload.

In other embodiments, a vehicle includes a frame member that includes an above-frame portion, a middle frame portion, and a below frame portion, a front ground-engaging member coupled to a front portion of the middle frame portion, and a rear ground-engaging member coupled to a rear portion of the middle frame portion. The vehicle may also include a saddle, a hand member, and a suspension system. The saddle is coupled to a rear portion of the above-frame portion and configured to support a first portion of a mass of a rider when the rider is seated in the saddle. The hand member is coupled to a front portion of the above-frame portion and configured to support a second portion of the rider's mass when at least one hand of the rider is in contact with the hand member.

The suspension system includes a first above-suspension that provides a first above-vehicle travel in response to a vehicle load, wherein the first above-vehicle travel includes a relative travel between the frame member and at least one of the saddle or the hand member. The system may include a first middle-suspension that provides a first middle-vehicle travel in response to the vehicle load, wherein the first middle-vehicle travel includes a relative travel between the frame member and at least one of the front ground-engaging member or the rear ground-engaging member. The system also includes a first suspension coupling that provides a first feedback load based on at least one of the first above-vehicle travel or the first middle-vehicle travel and the first feedback load is included in the vehicle load.

The first above-suspension is a rear-above suspension, the first above-vehicle travel is a relative travel between the frame member and the saddle, the first middle-suspension is a rear middle-suspension, and the first middle-vehicle travel is a relative travel between the frame member and the rear ground-engaging member.

The suspension system may further include a front-above suspension portion, a front-middle suspension portion, and a second suspension coupling. The front-above suspension portion provides a second above-vehicle travel in response to the vehicle load. The second above-vehicle travel includes a relative travel between the frame member and the hand member. The front-middle suspension provides a second middle-vehicle travel in response to the vehicle load, wherein the second middle-vehicle travel includes a relative travel between the frame member and the front ground-engaging member. The second suspension coupling provides a second feedback load based on at least one of the second above-vehicle travel or the second middle-vehicle travel and the second feedback load is included in the vehicle load.

The vehicle further includes a foot member coupled to a rear portion of the below frame portion and configured and arranged to support a third portion of the rider's mass when at least one foot of the rider is in contact with the foot member. The suspension system further includes a rear below-suspension that provides a first below-vehicle travel in response to the vehicle load, wherein the first below-vehicle travel includes a relative travel between the frame member and the foot member.

The first above-suspension is a front-above suspension, the first above-vehicle travel is a relative travel between the frame member and the hand member, the first middle-suspension is a front-middle suspension, and the first middle-vehicle travel is a relative travel between the frame member and the front ground-engaging member. The suspension system further includes a front below-suspension that provides a first below-vehicle travel in response to the vehicle load, wherein the first below-vehicle travel includes another relative travel between the frame member and the front ground-engaging member.

The first middle-suspension includes a slide link that couples the frame member and the at least one of the front ground-engaging member or the rear ground-engaging member. The first middle-suspension includes a slide link that couples the frame member and the at least one of the front ground-engaging member or the rear ground-engaging member. The slide link translates along a member that is pivotally coupled to the frame member. The slide link translates along a member that is rigidly coupled to the frame member. The first middle suspension further includes an eccentric link that pivotally couples a rear swingarm and the frame member. The first middle-suspension is a front-middle suspension and the first middle-vehicle travel is a relative travel between the frame member and the front ground-engaging member.

The first middle-suspension includes an eccentric link that pivotally couples the frame member and the at least one of the front ground-engaging member or the rear ground-engaging member. The eccentric link provides the first suspension coupling. The frame member includes a flexible top tube member that flexibly couples the saddle to the frame member such that the first above-vehicle travel includes a relative travel between the frame member and the saddle. The frame member includes a top tube member that is pivotally couples the saddle to the frame member such that the first above-vehicle travel includes a relative travel between the frame member and the saddle.

The first above-vehicle travel includes a relative rotation between the hand member and the frame member and the first middle-vehicle travel includes a relative translation between the front ground-engaging member and the frame member. The vehicle suspension system further includes a biasing member to at least partially inhibit the transmittance of the feedback load between the first above-suspension and the first middle suspension. The biasing member is a leaf spring.

The vehicle suspension system includes a control link that pivotally couples a rear member to the frame member, wherein the rear member is coupled to the rear ground-engaging member. Another link further couples the rear swingarm to the frame member. The other link is oriented in substantial alignment a drivetrain load of the vehicle, such that a majority of the drivetrain load is transmitted by the other link.

The other link is a slide link that translates along a stanchion that is rigidly coupled to the rear swingarm. The control link is coupled to the rear swingarm such that the control link crosses the control link. The control link is coupled to the rear swingarm such that the control link does not cross completely above the control link. The control link is coupled to a foot member that is coupled to the frame member to enable a relative travel between the foot member and the frame member, such that a rotation of the control link relative to the frame member induces the relative travel between the foot member and the frame member.

At least one of the first above-vehicle travel or the middle-vehicle travel is a digressive travel. At least one of the first above-vehicle travel or the middle-vehicle travel is a progressive travel. The first above-vehicle travel is a compensatory travel relative to the first middle-vehicle travel. A travel ratio between the first above-vehicle travel and the first middle-vehicle travel is based on at least the first suspension coupling.

In other embodiments, a vehicle includes a plurality of ground-engaging members, a frame supported by the plurality of ground-engaging members, a saddle that supports at least a first portion of a mass of a rider, and a handle member that supports at least a second portion of the mass of the rider. The vehicle also includes a braking system, a ground-tracing system, and a sensing system. The braking system dissipates energy away from at least one of the ground-engaging members. The ground-tracing system couples at least one of the ground-engaging members to the frame and suspends the frame relative to the at least one ground-engaging member. The sensing system at least partially generates a center of mass (CM)-shift signal based on a CM-shift of a vehicle payload, wherein the vehicle payload includes at least the mass of the rider. At least one operational parameter of the vehicle is based on at least the generated CM-shift sign.

The CM-shift signal is generated at the handle member. The ground-tracing system includes at least a middle suspension that provides a middle travel between the frame and at least one of the ground-engaging members and an above suspension that provides an above travel between the frame and at least one of the saddle or the handle member. The middle suspension is a rear middle suspension, the middle travel is between the frame and a rear ground-engaging member, the above suspension is a rear-above suspension, and the above travel is between the frame and the saddle member.

The middle suspension is a front-middle suspension, the middle travel is between the frame and a front ground-engaging member, the above suspension is a front-above suspension, and the above travel is between the frame and the handle member. The ground-tracing system includes at least a middle suspension that provides a middle travel between the frame and at least one of the ground-engaging members and a below suspension that provides a below travel between the frame and at least one of a foot member or a front ground-engaging member.

The middle suspension is a rear middle suspension, the middle travel is between the frame and a rear ground-engaging member, the below suspension is a rear below suspension, and the below travel is between the frame and the foot member. The middle suspension is a front-middle suspension, the middle travel is includes a translation between the frame and a front ground-engaging member, the below suspension is a front below suspension, and the below travel includes a rotation between the frame and the front ground-engaging member.

The sensing system includes a coupling between a first relative travel of the ground-tracing system and a second relative travel of the ground-tracing system. The coupling between the first and the second relative travel includes at least a mechanical link. The coupling between the first and the second relative travel includes at least one of a pneumatic coupling or a hydraulic coupling. The coupling between the first and the second relative travel includes at least at least an electrical coupling. The coupling generates the CM-shift signal. The first and the second relative travels are compensating travels such that a geometry parameter of the vehicle remains substantially constant over a range associated with the first and the second relative travels.

At least one of the first or second relative travels generates a progressive variance on the operation parameter. At least one of the first or second relative travels generates a digressive variance on the operation parameter. The sensing system further includes a clutch assembly to disengage and engage the coupling. A travel aspect ratio between the first and the second relative travels is based on the coupling. The sensing system further includes a controlling unit that controls a coupling strength of the coupling.

The coupling includes at least one of a plurality of gears, a transmission assembly, or a power source. The operational parameters include a travel aspect ratio between the first and the second relative travels. The frame geometry of the frame is based on a geometry parameter. The ground-tracing system is parameterized by a suspension parameter. The braking system is parameterized by a braking parameter. The drivetrain is parameterized by a drivetrain parameter. The operational parameter includes at least one of geometry parameter, the suspension parameters, the braking parameter, or the drivetrain parameter. The operational parameter includes at least one of a spring rate, or damping strength associated with the ground-tracing system.

Other embodiments of a portion of a vehicle include a frame, a front ground-engaging member, a front ground-tracking system, and a handgrip. The front ground-tracking system couples the front ground-engaging member to the frame and is configured and arranged to provide a relative movement between the front ground-engaging member and the frame in response to a vehicle load. The handgrip is coupled to the frame and configured and arranged to provide a point of contact between a hand of a rider and the vehicle. The vehicle portion may also include a sensor that is configured and arranged to sense a generally upward load on the hand grip, wherein in response to sensing the generally upward load on the hand grip generating an adjust signal that at least partially inhibits the relative movement between the front ground-engaging member and the frame.

In other embodiments, a vehicle includes a frame, a front wheel mounting assembly that is coupled to the frame and is configured and arranged to couple a front wheel to the vehicle, and a handlebar member that is coupled to the frame and is configured and arranged to provide a point of contact between a hand of a rider and the vehicle. The vehicle also includes a front ground-tracking system that, in response to a vehicle load, provides a relative translation between the frame and the front wheel mounting assembly along a translation axis and a relative rotation between the handlebar member and the frame about a rotation axis, wherein the translation axis is substantially transverse to the rotation axis.

In other embodiments, a vehicle includes a frame and a rear wheel mounting assembly configured and arranged to couple a rear wheel to the vehicle. The rear wheel mounting assembly includes a drivetrain member that is substantially aligned with an axis of a drivetrain of the vehicle and a stay member that is oriented at an angle with respect to the drivetrain member. Each of the drivetrain member and the stay member is coupled to the frame. At least one of the drivetrain member or the stay member is a flexible member such that the angle between the drivetrain member and the stay member varies in response to a vehicle load.

In some embodiments, a vehicle includes a frame with a head member and front wheel mounting assembly configured and arranged to couple a front wheel to the vehicle; at least a portion of the front wheel mounting assembly being received by the head member of the frame, such that the front wheel mounting assembly is coupled to the front wheel. The vehicle also includes a biasing member at least partially disposed within the head member that is configured and arranged to bias a relative travel between the frame and the front wheel mounting assembly.

The vehicle includes an energy-dissipating member at least partially disposed within the head member that is configured and arranged to dissipate at least a portion of energy associated with the relative travel between the frame and the front wheel mounting assembly. The biasing member is an elastomeric member. The biasing member is a microcellular urethane spring. A suspension travel occurs interior to the head tube.

In other embodiments, a vehicle includes a head tube and a concentric steerer tube configuration that includes at least a first steerer tube concentric to a second steerer tube, wherein at least a portion of the concentric steerer tube configuration in positioned within the head tube. A lower link couples a movement of the concentric steerer tube configuration with another movement of a wheel mounting assembly included with the vehicle.

In some embodiments, a signal originating between a handle bar and a human hand is generated. The signal measures at least one of a shift of Center-of-gravity (CG)/mass shift of a human or a payload, wherein the signal enables an adaptation of the vehicle or a conveyance system to affect a ride element, wherein the ride element may include at least one of a suspension, vehicle geometry, braking, and power, drive terrain. A corresponding control over another suspension, braking, vehicle structure, geometry adjusting devices is enabled by at least the signal. A range of kinematic movement that corresponds with improved braking, drive train, geometry adjustments and suspension efficiency is enabled by at least the signal. An affiant use of pedaling energy that is captured naturally in the process of pulling back on the bar increases a spring rate that then stiffens the below vehicle suspension increasing the use of energy output in the vehicle structure. In various embodiments, a vehicle had a suspension corresponding below and above the vehicle that contains variable ratio adjustments of travel, spring forces, damping forces.

BRIEF DESCRIPTION OF THE DRAWINGS

Preferred and alternative examples of the present invention are described in detail below with reference to the following drawings:

FIG. 10 illustrates the path of the instant center of rotation (IC), as well as the anti-squat and anti-rise behavior of several embodiments of a rear middle suspension.

FIG. 15A shows the kinematic behavior of the path of an IC of rotation for a front-middle, above, and below suspension that includes a lower link.

FIG. 15B shows an embodiment of a front-middle, above, and below suspension in both a compressed and an uncompressed state.

FIG. 15C in combination with 15B show various methods providing a controlling means for the front-middle, upper, and lower suspensions.

DESCRIPTION

Figure 1:
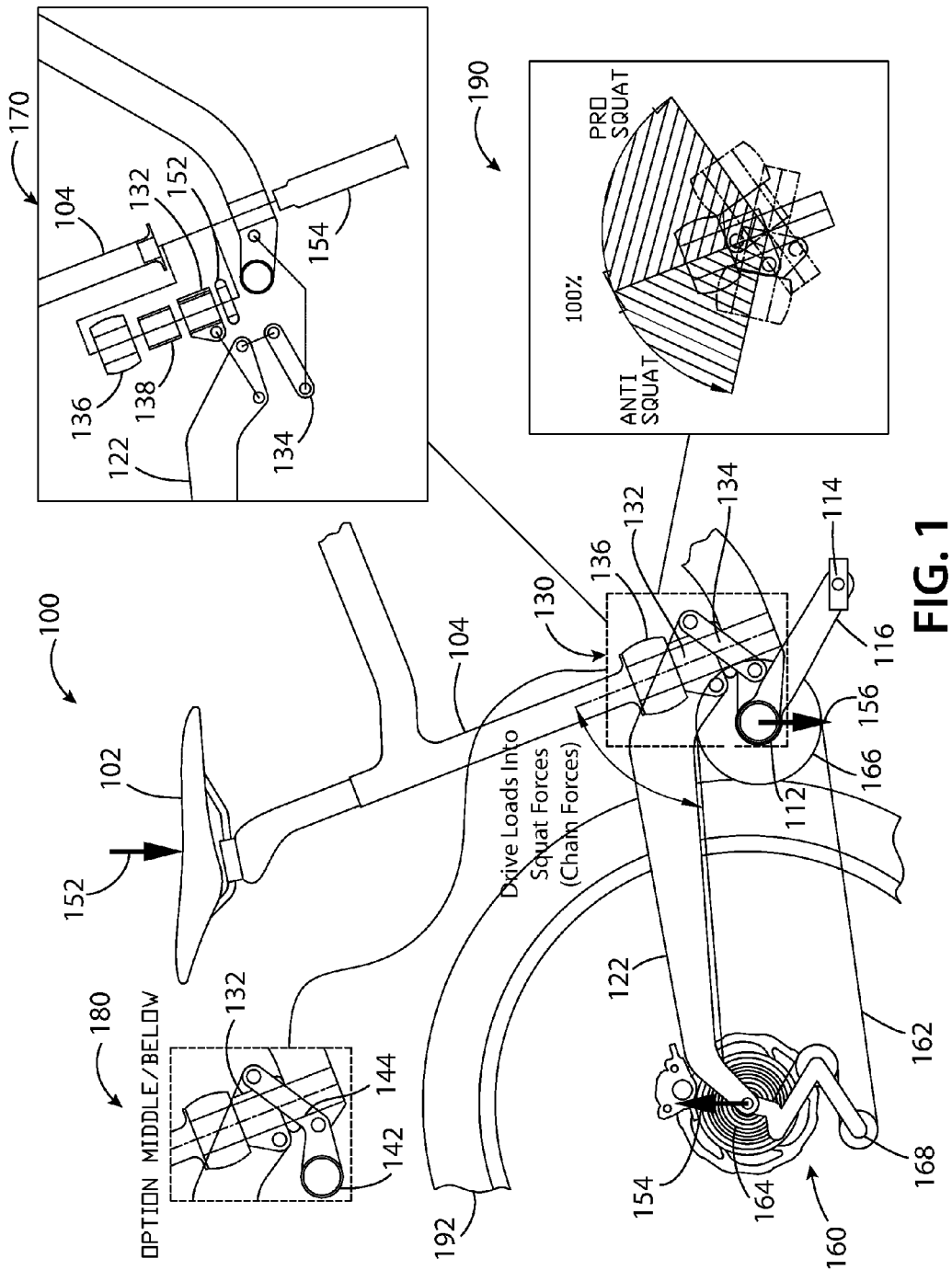
FIG. 1 illustrates various embodiments of a rear middle suspension for a two-wheeled vehicle that includes a slide link.

To facilitate the understanding of this invention, a number of terms are defined below. Terms defined herein have meanings as commonly understood by a person of ordinary skill in the areas relevant to the present invention. Terms such as "a," "an," and "the" are not intended to refer to only a singular entity, but include the general class of which a specific example may be used for illustration. The terminology herein is used to describe specific embodiments of the invention, but their usage does not delimit the invention, except as outlined in the claims.

The present disclosure presents various embodiments of terrain-tracking or—tracing systems for a vehicle. Vehicles generally include one or more terrain-engaging members, such as wheels or tires. The terrain tracking systems disclosed herein enhance the vehicle's ability to track or trace the terrain such that the terrain-engaging members are better enabled to remain in contact with the terrain. Furthermore, these systems enable a more efficient transfer of drivetrain energy in the vehicle. Accordingly, these systems contribute to the vehicle's ability to travel over terrain by enhancing the handing and stability of the vehicle. Furthermore, the terrain-tracking systems suspend, other vehicle components, such as the components that are in contact with a rider or with the ground-engaging members. Thus, these systems isolate a rider from terrain induced forces and/or loads. The terrain-tracking systems may be suspension systems.

Although the disclosure is not constrained to any vehicle type, many of the non-limiting exemplary embodiments of terrain-tracking systems throughout are applied to two-wheeled vehicles such as pedaled bicycles, electric bicycles, scooters, motorcycles, and the like. Many such vehicles include at least a frame and two ground-engaging members: a front wheel and a rear wheel. The wheels support the frame and provide contact with the terrain, as well as propel the vehicle over the terrain. Some of the various embodiments include a rear suspension that at least suspends the frame relative to the rear wheel. Some of the embodiments include a front suspension that at least suspends the frame relative to the front wheel. Furthermore, some embodiments include a combination of front and rear suspension systems or sub-systems.

Suspension systems typically enable a relative travel or movement of the suspended elements. For instance, in response to a terrain-induced force, such as a wheel rolling over uneven terrain, a rear suspension enables at least a relative travel between a rear wheel and the vehicle frame. The front suspension enables at least a relative travel between the front wheel and the vehicle frame. However, during operation of a vehicle, the wheels are not the only vehicle components that are exposed to vehicle loads.

In addition to terrain-induced forces (generally referred to as bottom-up forces or loads), during the operation of the vehicle, the presence of the rider or other payload masses generates other forces that may generally be categorized as top-down loads. Such top-down forces include, but are not limited to loads generated by the rider.

In regards to vehicles such as bicycles, wherein the rider's mass relative to the vehicle is significant, a shift in the rider's CM generates top-down forces on the vehicle that vary the performance of the vehicle and comfort of the rider during operation of the vehicle. Many of these top-down forces are transferred to the vehicle at the points of contact between the rider and the vehicle, i.e. the handlebars, the seat or saddle, and the pedals/cranks/bottom brocket or foot pegs. As an example, when a rider is sitting, 50% of the rider's mass may be supported by the saddle. As the rider shifts to a standing position, around 65% of the mass may be supported by the pedals. The proportion of the rider's mass that the handlebars supports also varies as the CM of the rider shifts. The load path and reactionary forces shift within the vehicle structure. Thus, suspending such elements relative to the frame (and ground-engaging members) provides greater isolation from the top-down forces.

As such, in addition to suspending the rear wheel (loosely defined as rear middle suspension), various rear suspension embodiments suspend and/or provide relative travel between the frame and the upper point of rider contact in the rear of the vehicle. Such rear upper points of rider contact include but are not limited to a seat or saddle structure. Because such suspension/travel is generally in the rear/above portion of the vehicle, these suspensions may be referred to as rear-above or upper suspensions.

Some embodiments suspend and/or provide a relative travel between the frame and the lower point of rider contact in the rear of the vehicle. Such rear lower points of rider contact include, but are not limited to a bottom bracket or foot pegs. Because such suspension/travel is generally in the rear/below portion of the vehicle, these suspensions may be referred to as rear-under or below suspensions. According, various embodiments of rear suspensions may include any combination of rear-above, middle, and below suspensions.

Likewise, the front suspension may include a combination of front-above, middle, and below suspensions. Front-middle suspensions suspend the frame with respect to the front wheel and enable a relative translational travel between the front wheel and the frame. Front-middle travel may include the travel of element in the front-middle vehicle portion, such as travel in a head tube of a bicycle or other two-wheeled vehicle. Front-above or upper suspensions provide a relative suspension or travel between the frame and the upper point of contact with the rider in the front of the vehicle. Such front upper points of rider contact include, but are not otherwise limited to handlebars, handgrip, throttle members, or the like. Front below suspensions further suspend the frame with respect to the front wheel and enable a further relative travel between the front wheel and the frame. Below travel may incorporate rotational relative travel.

Various vehicles may include any combination of the various embodiments of suspension subsystems disclosed here. Because there are six broad sub-system types, there are $2^6=64$ possible broad suspension combinations. Furthermore, any suspension sub-system may be coupled to any other suspension sub-system included on the vehicle to provide suspension feedback and enhance the vehicle's riding characteristics, as well as the rider's comfort.

For instance, a vehicle may include a rear-above suspension that is coupled to the vehicle's rear middle suspension. In response to travel in the middle suspension, the feedback signal may generate a compensating travel in the above suspension. Such compensating travel may actively adjust the frame geometry or positioning of the rider in real time. One benefit of such adjustability is the feature of providing vehicles a greater amount of suspension travel because the frame geometry can be configured to remains substantially constant over a great amount of travel. Also, one suspension sub-system may act as a tracer, or input, suspension for another. As discussed throughout, by coupling the various suspension subsystems, the kinematic behavior of the vehicle may be controlled in real-time, resulting in a vehicle with enhanced handling and performance. Various embodiments employ mechanical, hydraulic, pneumatic, electrical, and other such coupling means to provide feedback between the suspension subsystems.

As discussed further below, sensor means may be employed to actively monitor real time riding conditions. Signals from such sensor means are used to control and/or adjust vehicle or suspension parameters such that the vehicle responds, in real time, to the current terrain conditions. For instance, sensor means may detect an upward or downward force on the handlebars and actively adjust a responsiveness or stiffness in the front suspension. Likewise, sensors means may detect the position or shift of the rider's CM and actively adjust suspension parameters in response to such a shift. Sensor means include, but are not limited to mechanical sensors, such as links. Such controllably parameters include, but are not limited to suspension spring and damping rates, travel ratios between various suspension subsystems, frame geometry, and the like.

It is advantageous to provide a combination of upper, middle, and below suspension in at least one of the front or the rear of a vehicle, as described herein. Furthermore, it is advantageous to provide both a front and a rear suspension system, each of which includes a combination of middle, upper, and lower suspensions. For instance, simultaneous travel both above and below the vehicle stabilizes the geometry by compensating for shifts in the position of the CG or CM of a rider when riding the vehicle. For some vehicles, such as a bicycle, a shift in the CM of the rider is significant because, under normal conditions, the mass of a rider is much greater than the mass of the vehicle.

As is evident in the many embodiments discussed herein, existing rear and front suspensions may be modified or otherwise adapted to include many of the various advantages and/or features discussed within, including but not limited to upper, lower, and middle rear suspensions.

Furthermore, travel in at least one of the above, middle, and below may be compensating travel for variances introduced by travel in the other suspension. Various embodiments of the suspension systems, directed towards bicycles, provide both upper and lower travel in the rear and/or front of the bicycle, of which the effects are compensating to middle travel (and vice versa) and stabilize the geometry of the bicycle.

Travel above, below, and in the middle of the vehicle may provide adjustments to the performance of the vehicle, including the comfort and safety of a rider and any payload being ferried by the vehicle. For instance, controlling travel above and below the vehicle may provide enhanced braking and drive train capabilities, as well as enhanced suspension performance. In addition, multiple travels may provide adjustments to the vehicle's geometry, resulting in a vehicle geometry more tailored to the specific real time riding conditions.

The suspension systems dynamically control and/or regulate, in real time, the upper, lower, and middle travels. By actively monitoring and controlling the above, middle, and below travel, the various suspension systems may hold the travels in a fixed or constant ratio during operation of the vehicle. The systems may control the travels as independent travel, or may control the upper travel in response to the lower travel or suspension and vice versa. The upper or middle suspension may provide feedback to the lower suspension and vice versa.

In many riding conditions, fixing the ratio between the upper, middle, and lower suspensions improves the performance of the vehicle, including vehicle maneuverability and stability, safety of a payload, and comfort of a rider. The upper suspension may compensate for these variances by responding to the travel in the lower and/or middle suspension and undergoing compensating travel. In many riding conditions, the upper, middle, and lower suspensions may be operated as a single unit. Operating the multiple suspensions as a single unit enables fixing the suspension ratios and providing compensating travel in the upper and lower suspensions. As discussed below, in other embodiments, the travel ratios may be varied as a function of travel length. For instance, the travel rations may be digressive or progressive travel ratios.

For some riding conditions, such as when the terrain is extreme, controlling the suspension systems so that at least one of the upper, middle, and lower travels are more responsive to the terrain may be desired. Various embodiments of the systems are adaptive to the riding conditions, and vary in real time the suspension ratio when appropriate. In some riding conditions, the upper and lower suspensions are operated as a single unit. In other conditions, each of the suspensions is operated independently. Varying the ratio between the upper, middle, and lower travels allow for the vehicle to respond to more extreme terrain. In various embodiments, ratio of travel, spring forces, and dampening forces may be varied in real time and in response to instantaneous riding conditions.

The control of the suspensions may be dynamic and adaptive to the terrain and other riding conditions. The control may shift between operating the front and the rear suspensions as a single unit or independently in real time. This control may be active or passive. This control may be enabled by at least mechanical linkages, hydraulics, pneumatics, electronics, and other means for regulating the travel both above and below the vehicle.

In some embodiments, a signal may be generated that measures a shift in the CG or CM of a vehicle rider and/or a vehicle payload being ferried by the vehicle. For a bicycle, such a signal may be based on the rider's contact with the saddle, handlebars, foot pegs or pedals, or any other structure that the rider contacts the vehicle. The generated signal may be used to adapt, in real time, one or more vehicle components to influence the rider's comfort and safety. Such affected vehicle components may be adjusted and included in and of the front or rear-above, middle, and below suspensions. The systems may also include any of vehicle geometry adjusting devices, braking elements, drive train, instantaneous power output devices, and such.

Although the various embodiments are not limited to the application of a bicycle, many of the embodiments discussed herein are directed towards a bicycle as the vehicle. The use of a bicycle is for illustrative purposes only, and it understood that the invention is not limited to a bicycle, but may be practiced with practically any vehicle that engages the ground, including but not limited to motorcycles, scooters, electric bicycles, and such.

It should be noted that any vehicle suspension sub-system may be combined with other vehicle suspension subsystems to form the overall suspension system. For instance, any embodiment or type of a rear middle suspension may be combined with any type of rear-above and/or below suspension to forma a rear suspension. Both U.S. patent application Ser. No. 13/940,754, entitled BICYCLE REAR SUSPENSION, filed on Mar. 15, 2013 and PCT/US Application Serial No. 14/26847, entitled BICYCLE REAR SUSPENSION, filed on Mar. 13, 2014, disclose various embodiments of rear middle suspension systems and/or subsystems for vehicles. The contents of both U.S. patent application Ser. No. 13/940,754 and PCT/US Application Serial No. 14/26847 are hereby incorporated by reference. Any of the rear middle suspension systems disclosed in these incorporated references may be combined with any of suspension system disclosed herein. Likewise, U.S. Provisional Patent Application Ser. No. 61/947,328 discloses various embodiments of a front-middle and front-above suspensions, of which any are combinable with the various embodiments disclosed herein. Furthermore, U.S. Pat. No. 7,350,787, entitled VEHICLES AND METHODS USING CENTER OF GRAVITY AND MASS SHIFT CONTROL SYSTEM, issued on Apr. 1, 2008 discusses various advantages of vehicles that include multiple coupled and actively terrain-tracking systems, the contents of which are hereby incorporated by reference.

FIG. 1 illustrates various embodiments of a rear middle suspension 130 for a two-wheeled vehicle illustrated as a bicycle 100 that includes a slide link 132 or sliding collar. As shown, the rear portion of bicycle 100 includes a saddle 102 and a rear wheel 192, which is coupled to a rear swingarm 122. Force arrow 154 represents a typical terrain load applied to bicycle 100 as rear wheel 192 rolls over uneven or non-uniform terrain. As such, force arrow 154 represents a bottom-up vehicle load.

The saddle 102 is a rear-above or upper point of contact between the vehicle and the rider and supports at least a portion of the rider's mass. The force arrow 152 shows a typical downward force or load on the vehicle provided by the rider. Although shown the saddle 102 in FIG. 1 is shown as a bicycle saddle, the term saddle, as used herein, includes any vehicle structure or member that provides a point of contact between the rider and the vehicle in the rear upper portion of the vehicle and is configured and arranged to support at least a portion of the rider's mass. The frame of bicycle 100 includes a seat tube 104, which at least partially supports the saddle 102.

Bicycle 100 also includes pedals 114 and cranks 116, which are coupled to the bicycle 100 via bottom bracket 112. The pedals 114 provide a rear lower or below point of contact between the vehicle and the rider and support at least a portion of the rider's mass. The cranks 116 transmit power supplied by the rider to bicycle's 100 drivetrain 160. The force arrow 156 shows a typical downward force or load on the vehicle, via the bottom bracket 112, provided by the rider. Force arrow 156 represents forces due to supporting the rider and also due to the load generated by the rider pedaling the bicycle 100. As such, force arrows 152 and 156 represent top-down forces on bicycle 100.

When a rider pedals a bicycle, the rider provides and/or generates a load on the frame via the drivetrain 160. These drive loads are also top-down forces and are shown in FIG. 1. In various embodiments, a drivetrain 160 includes at least one of a chain 162, front chain ring 166, rear cassette 164, rear derailleur/pulleys 168, front derailleur (not shown), cranks 116, pedals 114, and the like. Other exemplary drivetrains may include motorized or externally powered components.

Bicycle 100 includes an embodiment of a rear middle suspension 130, which is shown in an exploded view 170 in the right-upper hand of FIG. 1. The rear middle suspension 130 of FIG. 1 is a slide link suspension and incldues a slide link 132, or sliding collar, that slides or translates along seat tube 104. The slide link 132 includes an aperture to receive seat tube 104 and a bushing 138 is positioned between slide link 132 and seat tube 104. A biasing member 136 is included to provide at least one of a spring or a damper means. The biasing member 136 may be an elastomeric element, such as a coil spring, an air/pneumatic spring, and any other such elastomeric element. The rear swingarm 122 is pivotally coupled to the collar or slide link 132. A control link 134 is pivotally coupled to each of the frame of bicycle 100 and the rear swingarm 122. The control link guides the rear swingarm 122 throughout the travel. Washer member 153 and inner tube member 155 enable the construction of the rear middle suspension.

Rear middle suspension 130 provides a relative travel between rear wheel 192 and the frame of bicycle 100 in response vehicle loads, including but not limited to the loads represented by at least one of force arrows 152, 154, 156, and the drive loads. The kinematics and advantages of such a middle suspension are discussed further below.

It should be noted that the angle of the tube, with respect to the vertical, that the slide link 132 translates along is not constrained as shown in FIG. 1. Rather, the angle of the seat tube 104 may vary, or the slide link 132 may translate along another frame member oriented at a different angle. Furthermore, as discussed below, the angle of the tube may vary in real time in response to riding conditions. View 190 demonstrates have how the squat characteristics of bicycle 100 vary with the angle of the member along which slide link 132 translates. For instance, bicycle 100 may include pro-squat or anti-squat characteristics, depending upon the sliding angle of the slide link 132.

View 180 introduces a rear-under suspension coupled with the rear middle suspension 130. In the embodiment shown in view 180, bottom bracket 142 is enabled to travel with respect to the frame of bicycle 100, such that the point of contact between the bicycle 100 and the rider in the rear below portion of the vehicle is suspended. Bottom bracket 142 is integrated with a cantilever link 144. The cantilever link 144 play a similar role to control link 134, in that cantilever link 144 is pivotally coupled to both the frame of bicycle 100 and the sliding link or slide link 132. Thus, cantilever link 144 provides a coupling between the rear middle suspension 130 and the rear below suspension. Travel in the rear middle suspension 130 generates a feedback signal, via the cantilever link 144, that generates corresponding travel in the rear below suspension of bottom bracket 142, and vice versa. It should be noted that the geometry of cantilever link 144 is variable to generate travel ratios and coupling strength of various values. The combination of rear middle suspensions with below (and rear-above suspensions) is discussed throughout, such as the discussion in regards to FIG. 2.

Figure 2:
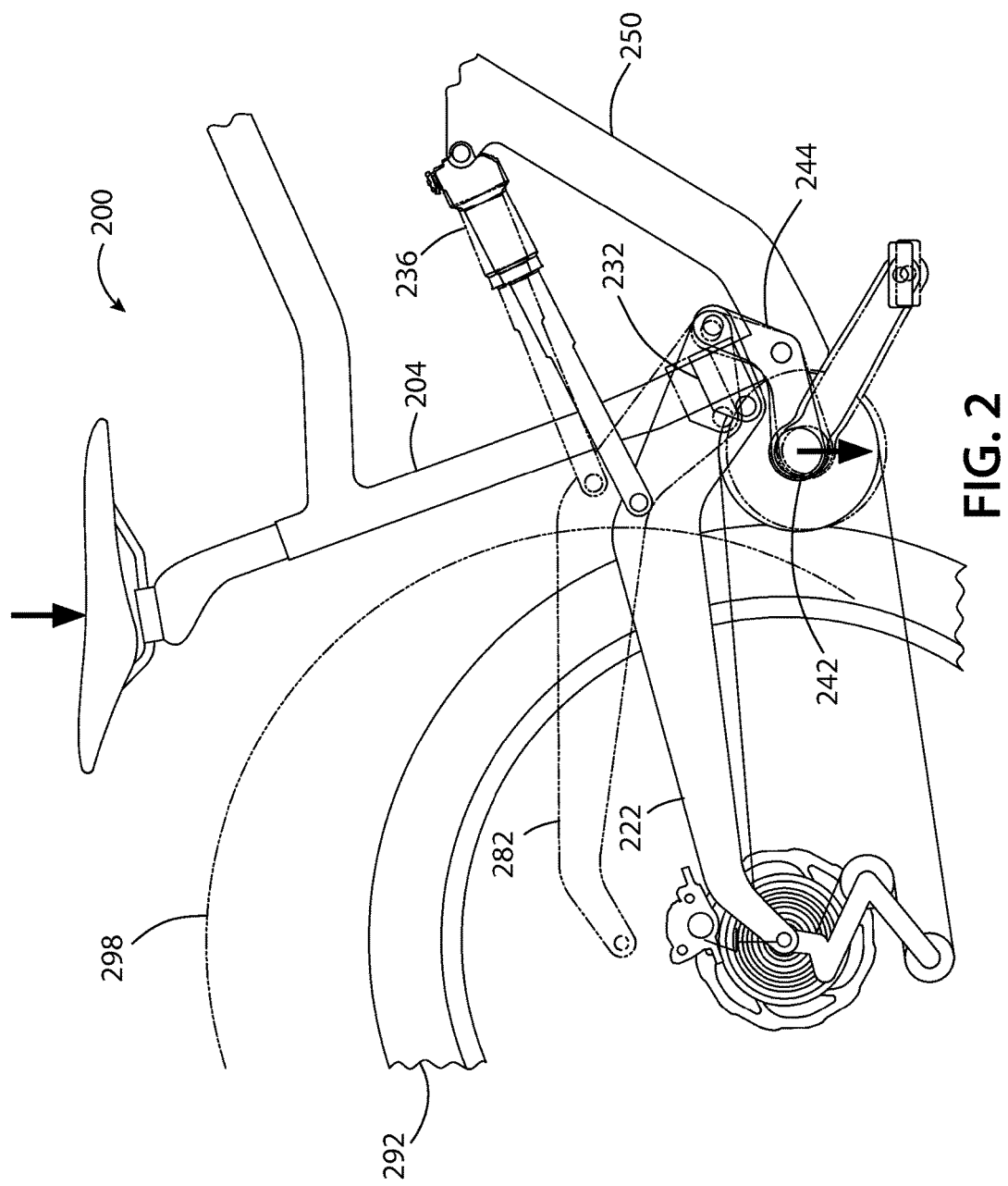
FIG. 2 shows the kinematic behavior of a slide-link type rear middle suspension coupled to a rear-under or below suspension via cantilever link.

FIG. 2 shows the kinematic behavior of a slide-link type rear-middle suspension coupled to a rear-under or below suspension via cantilever link 244. A bicycle 200 includes frame 250, which includes seat tube 204. The slide link 232 translates along seat tube 204. Rather than employing an elastomeric element along the seat tube 204, the embodiment of the rear suspension on the bicycle 200 employs a shock assembly 236 coupled between the rear swingarm 222 and the frame of bicycle 200. The travel of the rear swingarm 222, rear wheel 292, bottom bracket 242, cantilever link 244, slide link 232, relative to the frame 250 is shown by the hashed outlines. For instance, the position and/or orientation of the rear wheel 292 and rear swingarm 222, relative to the frame, during a full compression of the rear suspension system is shown by hashed outlines 298 and 282 respectively.

As shown, the combination of the top-down forces and the bottom up forces induce a generally upward travel of rear wheel 292, articulated by the clockwise rotation of rear swingarm 222 and the upward translation of slide link 232. Furthermore, the bottom bracket 242 travels generally downward, relative to the frame, as shown by hashed outlines indicated suspension compression. The relative travel ratio between the rear middle and the rear-under suspensions is controlled by the geometry of coupling the cantilever link 244.

Figure 3:
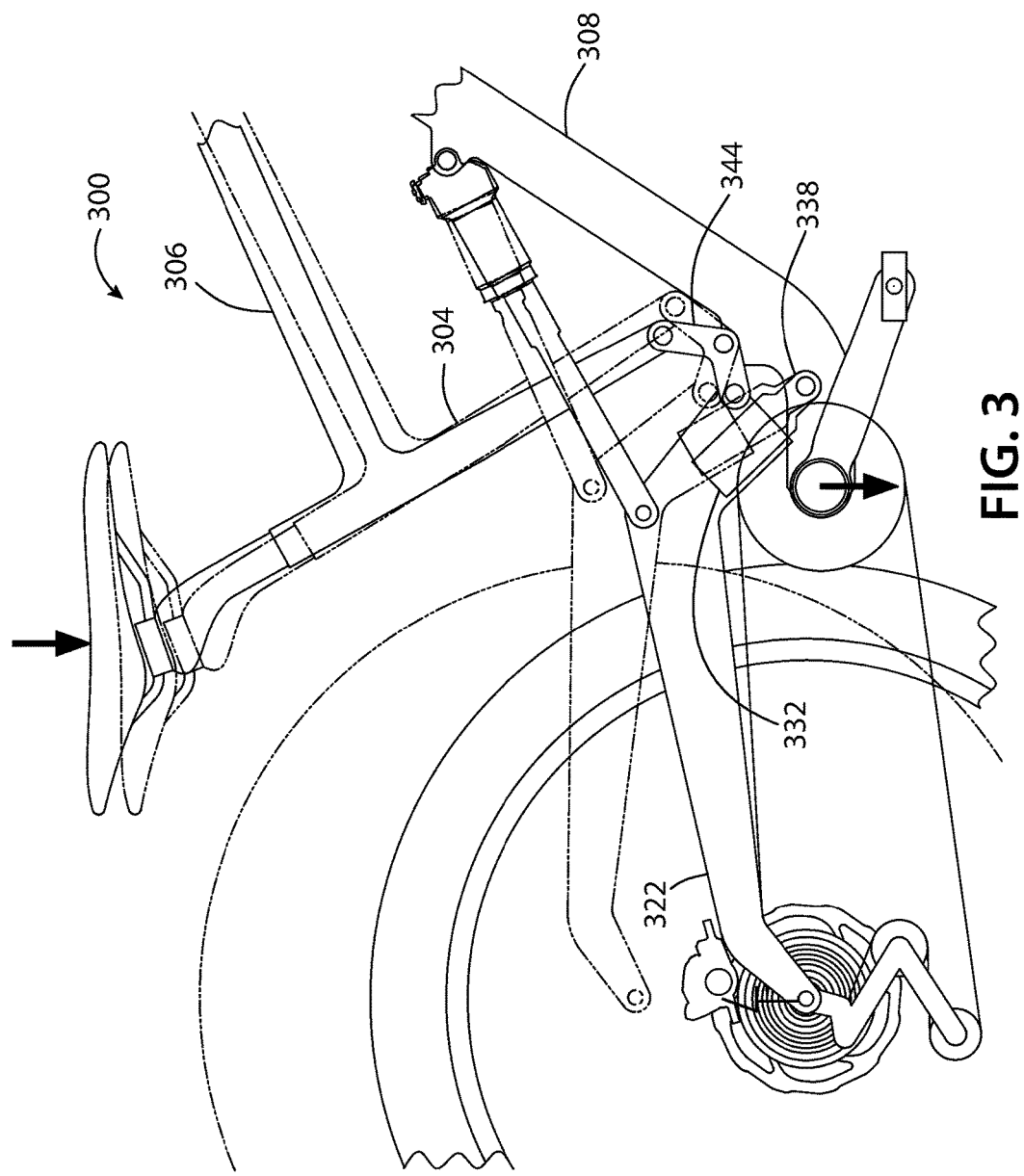
FIG. 3 shows a bicycle that includes a combination of a rear middle and a rear-above suspension.

FIG. 3 shows a bicycle 300 that includes a combination of a rear-middle and a rear-above suspension. The frame of bicycle 300 includes top tube 306 and down tube 308. Top tube 306 is a flexible member such that the angle between the top tube 306 and down tube 308 at bicycle's 300 stem (not shown in FIG. 3) varies in response to a vehicle load, such as the top-down load on the saddle. The top tube 306 is flexible enabling a relative travel between the saddle and the frame. The travel of the saddle, top tube 306 and seat tube 304 is indicated by the hashed lines.

The rear-above suspension is coupled to the rear middle suspension through the coupling link 344, which is pivotally attached to the frame, the seat tube 304, and the rear swingarm 322. The rear suspension is also includes a slide link. However, in comparison to FIGS. 1 and 2, the slide link configuration of the embodiment shown in FIG. 3 includes a pivoting member 338 (stanchion-type pivoting member) that is pivotally coupled to the frame of bicycle 300.

The pivoting member 338 (stanchion) mates with a corresponding aperture, cylinder, groove, or some other similar structure to the slide link 332 included with the rear swingarm 322, such that pivoting member 338 (stanchion) and similar structure to the slide link 332 form piston and cylinder type slide link. Note that in this embodiment, during travel of the rear wheel, the angle of pivoting member 338 (stanchion) varies with respect to the frame, but is held constant with respect to the rear swingarm 322.

The slide link 332 pivoting member 338 assembly maybe a cylinder and piston sliding link assembly. In other embodiments, the pivoting member 338 is a trunnion or a pivoting stanchion. The geometry of coupling link 344 determines the coupling characteristics between the rear upper and rear middle suspensions. Note that in the embodiment shown in FIG. 3, the seat tube 304 is forward of the slide link 332.

Figure 4:
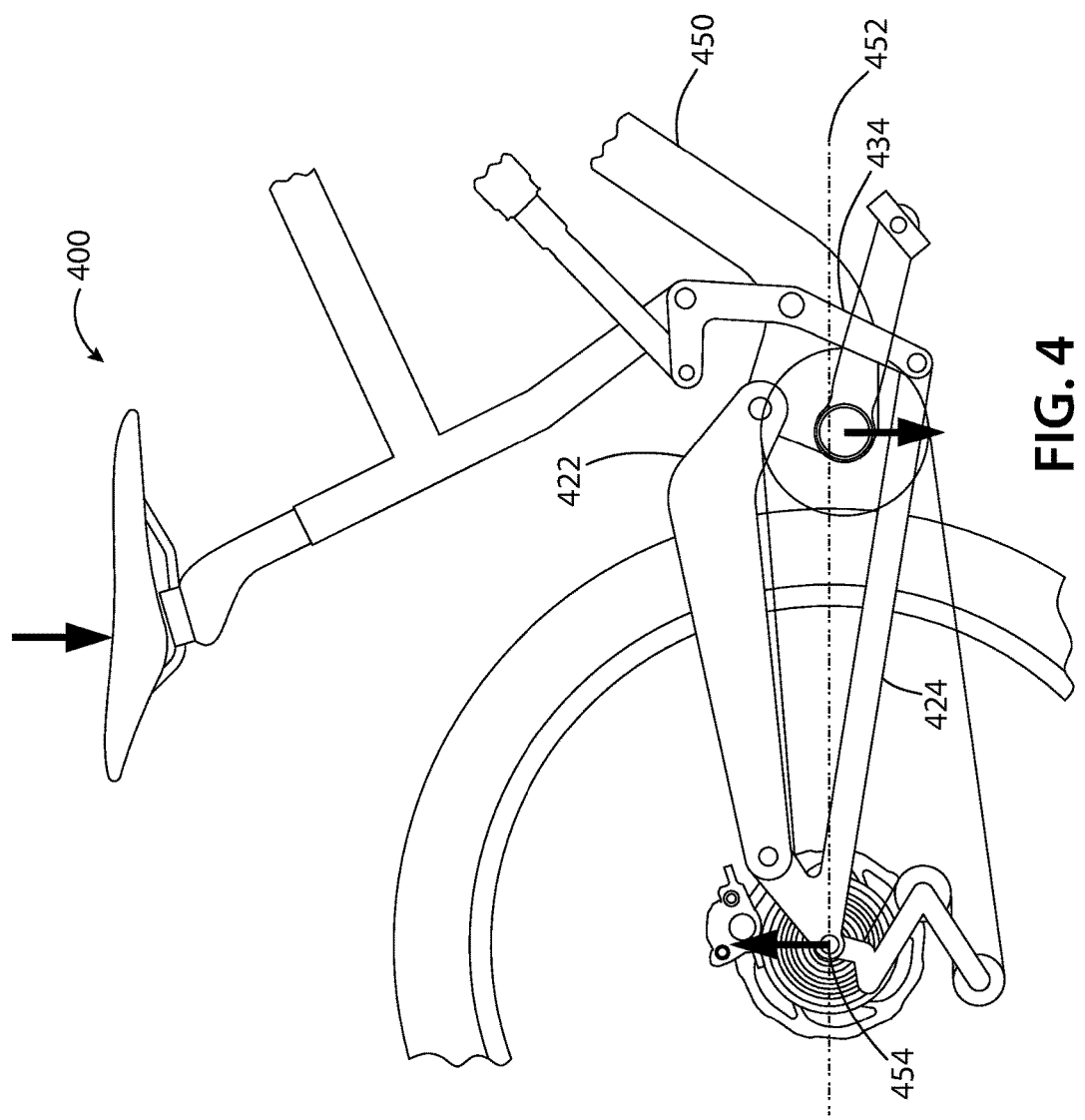
FIG. 4 illustrates a bicycle that includes another combination of a rear middle and a rear-above suspension.

FIG. 4 illustrates a bicycle 400 that includes another combination of a rear-middle and a rear-above suspension. Specifically, FIG. 4 shows a relationship between a rear over, middle, and above suspension for bicycle 400. Bicycle frame 450, rear swingarm 422, coupling link 434, and rear stay member 424 form a four bar linkage, where the rear stay member 424 is essentially the floating member of the four bar linkage. The hashed horizontal line 452 indicates the vertical height of the rear axle 454. The coupling link 434 couples the rear-above suspension to the middle suspension. Note in the embodiment that the floating member or link (rear stay member 424) is below the connecting link (rear swingarm 422).

Figure 5:
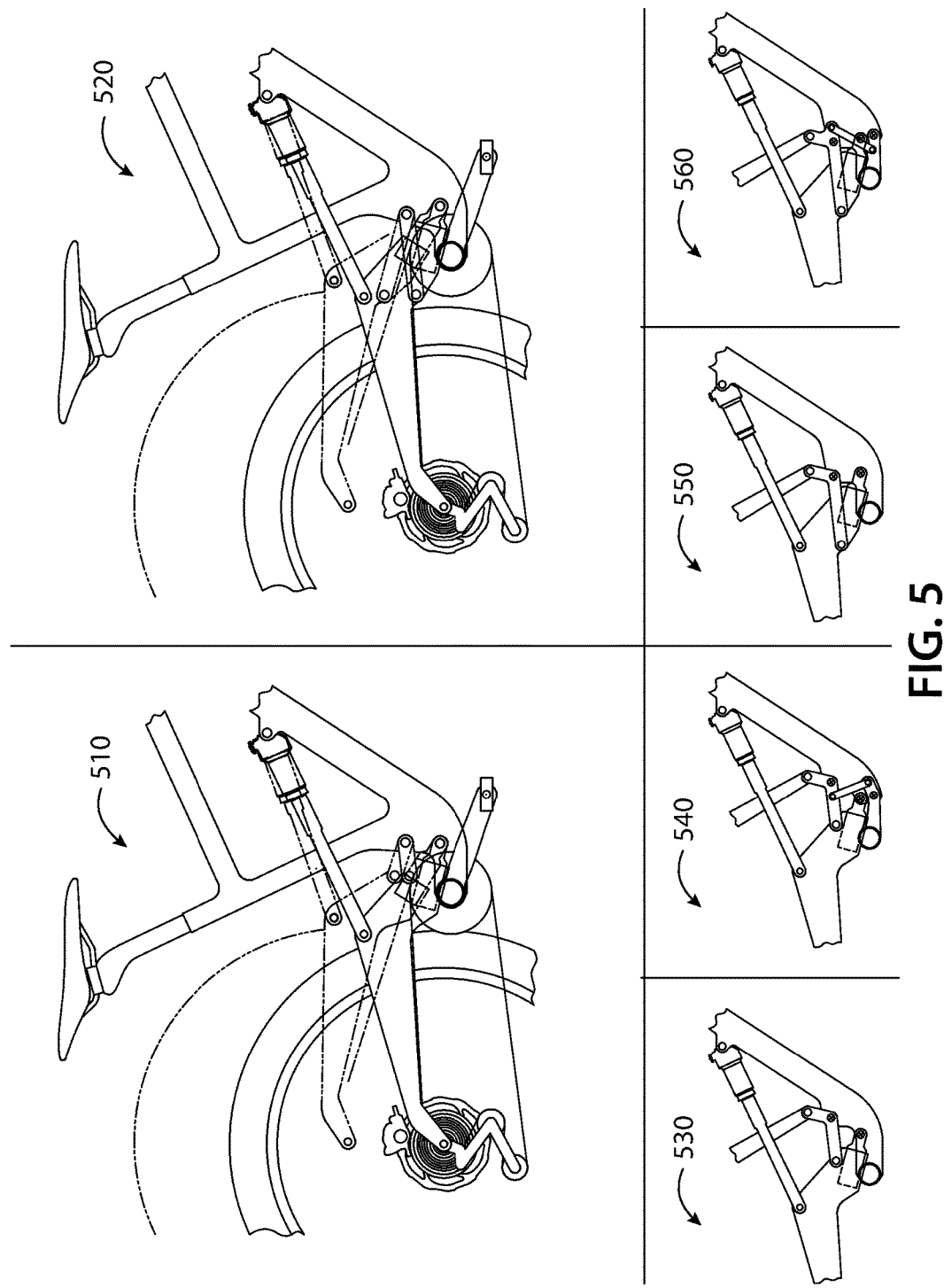
FIG. 5 provides various embodiments of rear suspension systems for a bicycle.

FIG. 5 provides various embodiments of rear suspension systems for a bicycle. In each embodiment shown in FIG. 5, the rear middle suspension includes a slide or sliding linkage that includes a stanchion that is pivotally coupled to the frame and at a fixed angle relative to the swingarm. The mating cylinder or barrel in included in the rear swingarm. In each embodiment, the slide linkage couples the rear swingarm to the frame. Furthermore, when the travel is not compressed, the stanchion is at an angle that is almost horizontal with respect to the riding surface.

View 510 shows the kinematics of a rear middle suspension, where a control link pivotally couples the frame to the rear swingarm. The control link is pivotally coupled to a forward portion of the swingarm. Thus, the control link may be a forward control link.

View 520 shows the kinematics of a rear middle suspension, where the control link is pivotally coupled to the swingarm at a more rearward portion of the swingarm, such that the control link crosses over the stanchion. Thus, the control link (that also may couple above or under suspensions to the middle suspension) is a crossover link.

View 530 shows an embodiment of a rear middle suspension coupled to a rear-above suspension. The control link of the rear middle suspension also serves to couple the middle suspension to the above suspension. Furthermore, the control link is a forward control link. View 540 shows an embodiment similar to the embodiment of view 530, except that a below suspension (cantilevered bottom bracket) has been integrated and coupled, via the near vertical link, to the middle and above rear suspensions.

View 550 shows an embodiment where a crossover control link is used in the middle suspension and to couple the middle to the above suspensions. The longer lever arm associated with the cross over link provides a different travel ration between the above and the middle suspensions than the shorter lever arm associated with the forward link of view 530. View 560 shows a below suspension incorporated into a middle and above suspension that includes a crossover link.

Figure 6:
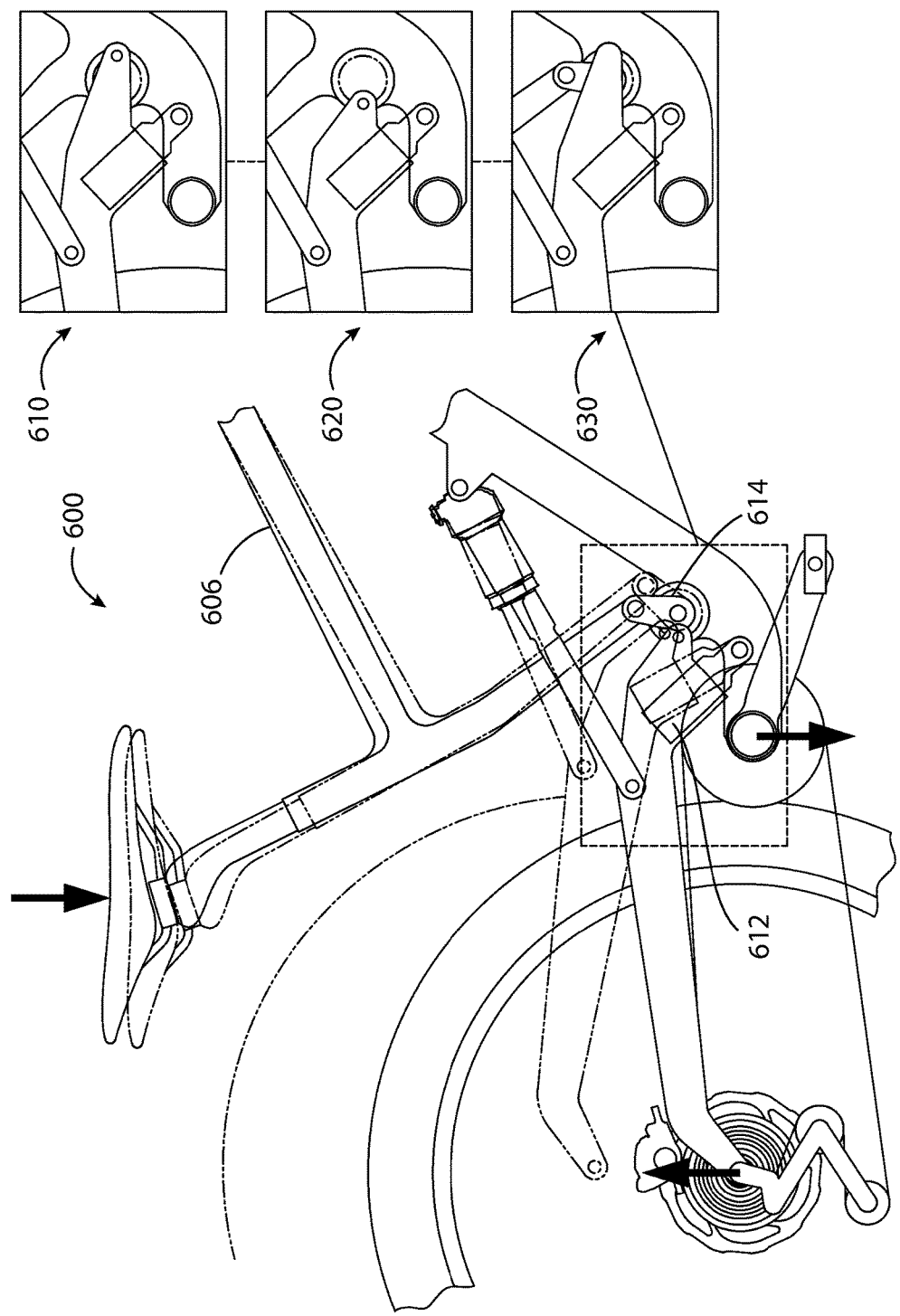
FIG. 6 provides various embodiments of a rear suspension that employs a sliding linkage and an eccentric link as a guide link.

FIG. 6 provides various embodiments of a rear suspension that employs a sliding linkage and an eccentric link as the guide link. Similar to other embodiments, when a rear-above suspension is included, the eccentric link couples the middle and the above suspensions. Bicycle 600 includes a rear stanchion-style slide link 612 middle suspension and a rear-above suspension enabled with a flexible top tube 606. The kinematics of the travel is shown by the hashed outlines. An eccentric link 614 couples the above and middle suspensions. Furthermore, the eccentric link 614 pivotally couples the rear swingarm to the frame.

View 610 shows an embodiment that includes only a middle rear suspension where an eccentric link couples the rear swingarm to the frame. View 620 shows another embodiment that employs an eccentric link to couple the swingarm to the frame. Note the different pivotal mounting and geometry of the mounting flange of the rear swingarms in views 610 and 620. View 610 shows a longer mounting flange, while view 620 shows a shorter mounting flange. The differing mounting flanges give rise to various eccentric orbits associated with the travel. Accordingly, the desired travel to the rear wheel may be tuned via choice of eccentric links and mounting flanges on the rear swingarm. View 630 shows a middle- and above-rear suspension with an eccentric link and mounting flange similar to the one shown in view 610.

Figure 7:
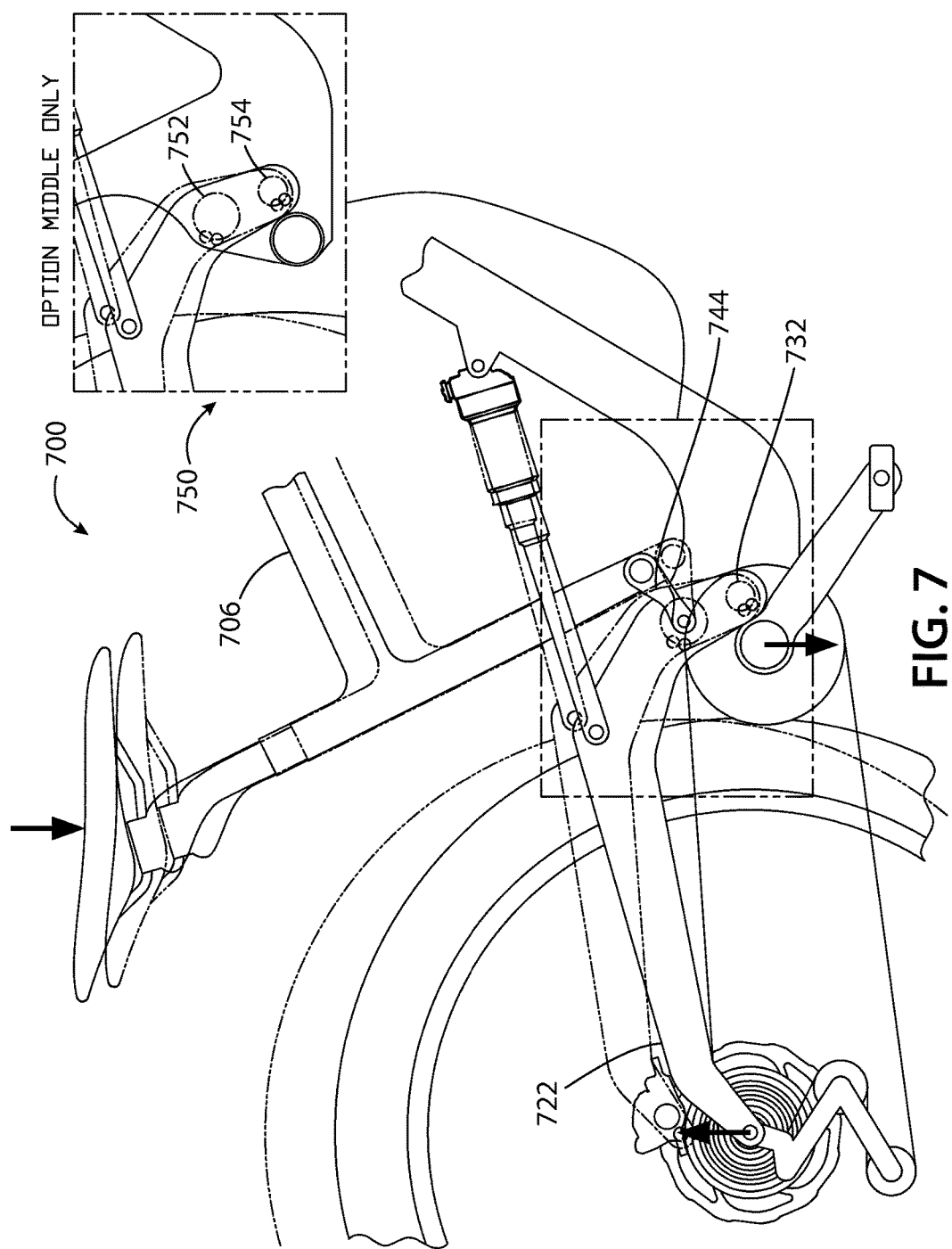
FIG. 7 shows various embodiments of a rear suspension that employ multiple eccentric links.

FIG. 7 illustrates various embodiments of a rear suspension that employ two eccentric links. Bicycle 700 includes a rear middle suspensions and a rear-above suspension coupled by a first eccentric link 744. Note that the above rear-above suspension is at least partially enabled by a flexible top tube member 706. The rear swingarm 722 is coupled to the frame of bicycle 700 via a second eccentric link 732. The relaxed and compressed states of the coupled rear-middle and above suspension of the bicycle 700 are shown.

View 750 shows another embodiment of a rear suspension that includes only a middle suspension. The rear swingarm is coupled to the frame via two eccentric links 752 and 754 to form a sliding four-bar configuration.

Figure 8:
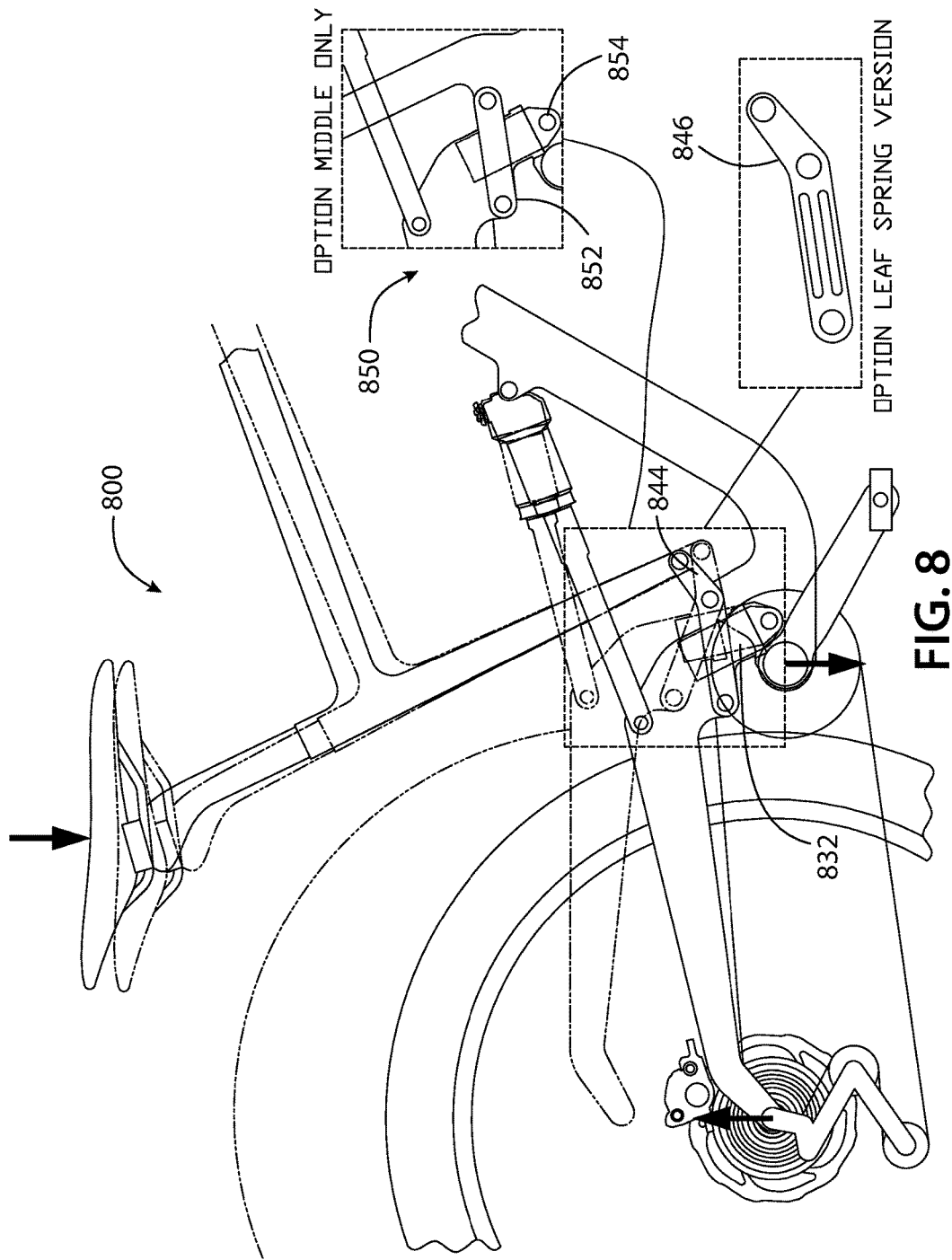
FIG. 8 illustrates various embodiments of a rear suspension that employs a cross over link to couple the above suspension with the middle suspension.

FIG. 8 illustrates various embodiments of a rear suspension that employs a cross over link to couple the above suspension with the middle suspension. The rear middle suspension of bicycle 800 includes a stanchion 832 or piston that is pivotally attached to the frame of bicycle 800. The stanchion 832 slides within or along a mating cylinder included in the rear swingarm. Thus, stanchion 832 and cylinder form a slide link that pivotally couples the rear swingarm to the frame.

The rear swingarm is further pivotally coupled to the frame via crossover link 844. Note that crossover link 844 passes over or pass the stanchion 832 when coupled to the rear swingarm. Crossover link 844 also couples the rear middle suspension to the rear-above suspension of bicycle 800. In at least one embodiment, a leaf spring 846 is employed as crossover link 844. Leaf spring 846 at least partially isolates the travel of the middle suspension from the travel of the above suspension. In other embodiments, other isolating means may be employed to isolate the travel between two or more suspensions.

View 850 shows a rear suspension that includes only a middle rear suspension. A crossover link 852 crosses over the stanchion 854 that is pivotally coupled to the frame and slides within the mating cylinder in the rear swingarm.

Figure 9A:
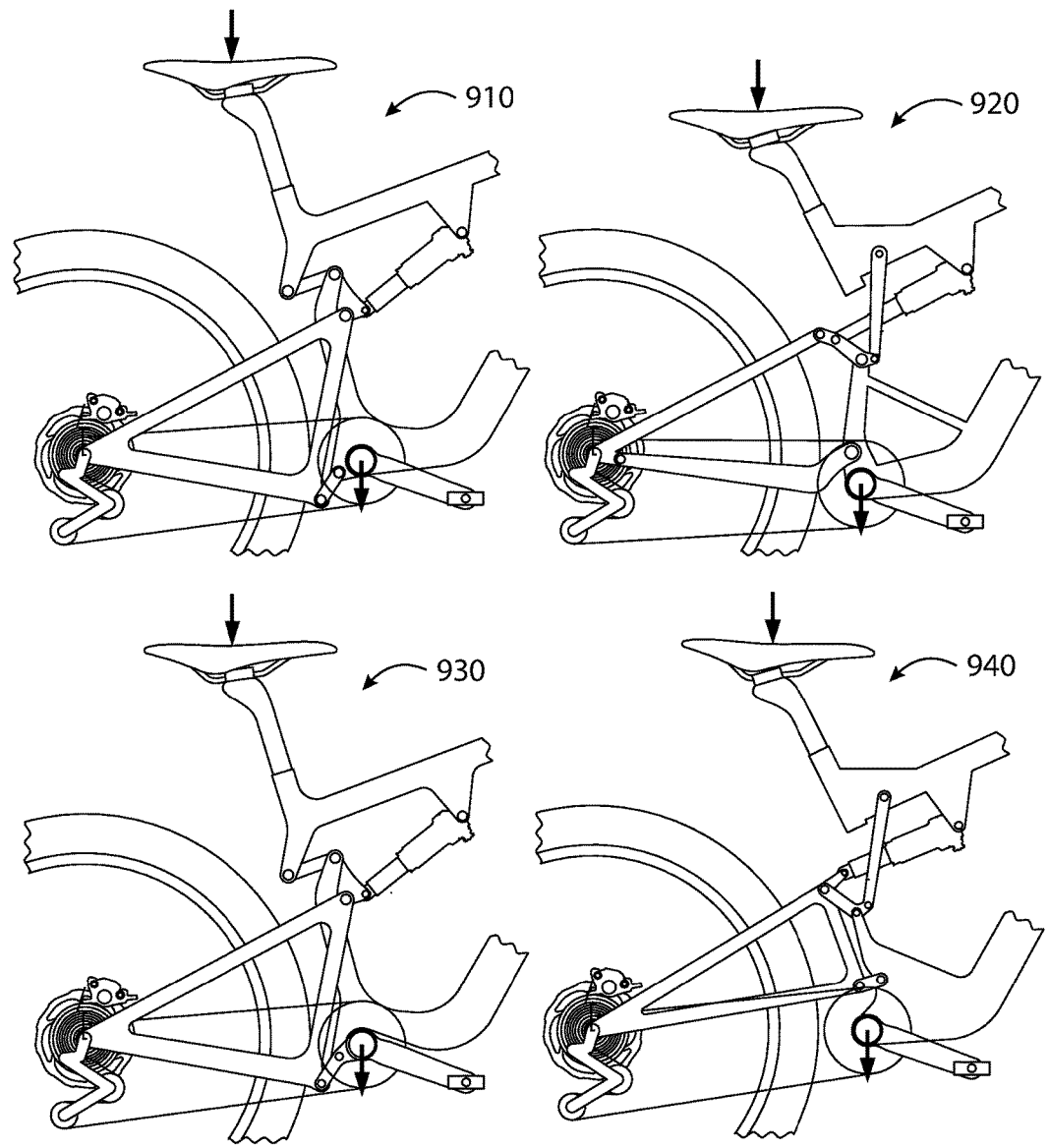
FIGS. 9A-9B show a variety of rear middle suspensions that are combinable with rear-above and below suspensions.
Figure 9B:
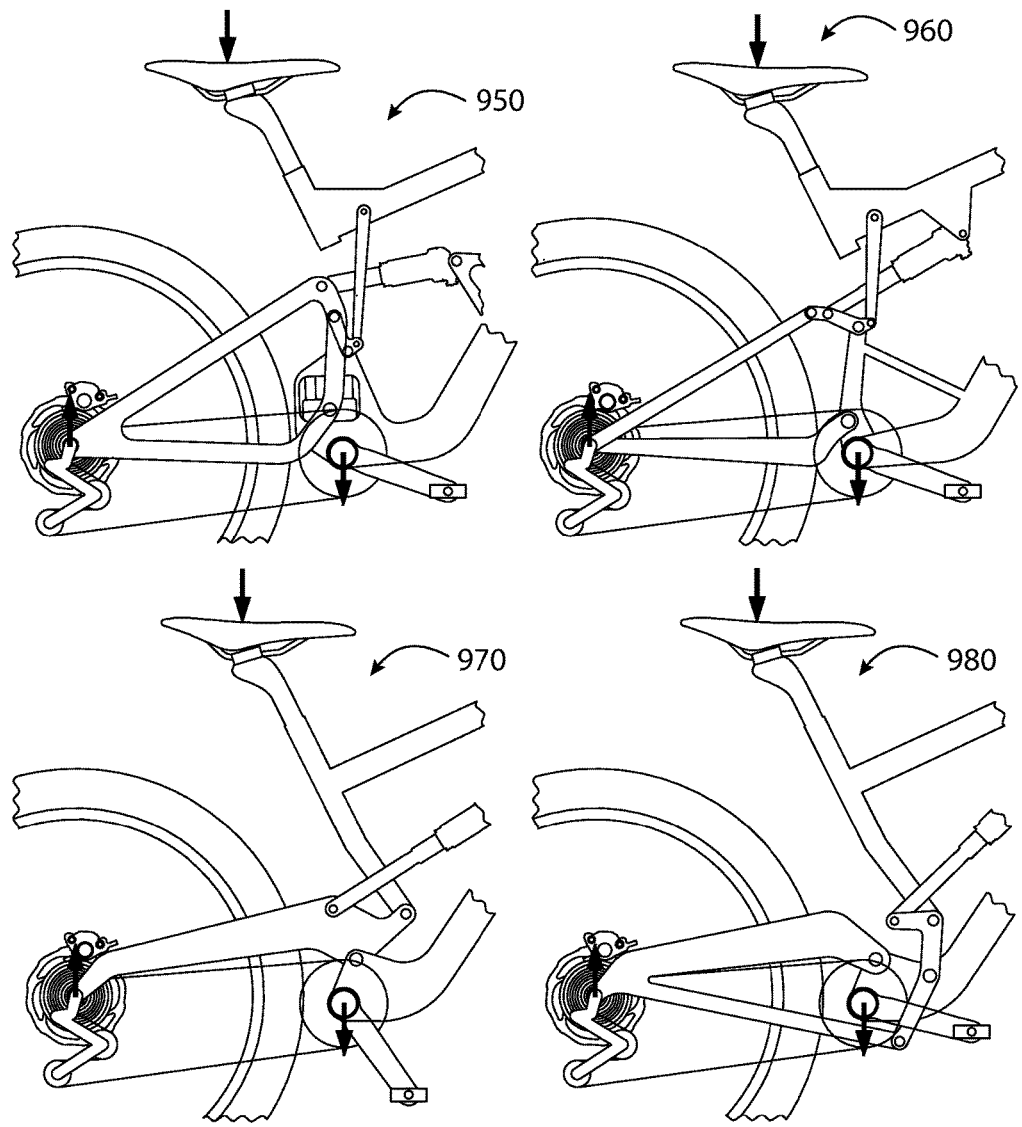

FIGS. 9A-9B show a variety of rear middle suspensions that are combinable with rear-above and below suspensions. Bicycle 910 includes a rear-above suspension that is at least partially enabled by a flexible top tube member. The rear middle suspension is essentially a four bar linkage where the rear triangle is the floating member of the four bar linkage. The upper link that pivotally couples the rear triangle to the frame also couples the middle and above suspension. The four bar linkage includes a virtual pivot point (VPP).

Bicycle 920 includes another four bar linkage for the middle suspension that is coupled to the above suspension. Note that the rear axle is positioned higher than the pivot connecting to floating link to the lower link. Bicycle 930 is similar to bicycle 910; however, bicycle 930 additionally includes a bottom bracket that is cantilevered to the rear triangle that is also coupled to the above suspension. Accordingly, bicycle 930 includes coupled rear middle, above (or over) and below suspensions.

Bicycle 940 also includes a four bar linkage that is linked to the above suspension. Note that the two connecting links between the rear triangle (floating link) and the frame are relatively short links and that the upper connecting links couples the middle and above suspensions. Bicycle 950 includes a rear triangle that is pivotally connected to a collar that slides along a pair of vertical columns and is also pivotally linked to the frame. The middle suspension is coupled to the above suspension. On the four bar linkage of bicycle 960, the pivot that connects floating link to the lower link is coaxial with the axle of the rear wheel.

The rear middle suspension of bicycle 970 includes a single pivot at the frame. The rear swingarm is also pivotally coupled to the traveling seat tube to link the middle and above suspensions. Bicycle 980 includes a flexible rear structure that pivotally couples the rear wheel to the frame. The rear structure is flexible such that the angle between the chain stay member and the rear swingarm is variable. Accordingly, the flexible rear structure enables further suspension of the rear wheel. The flexible rear structure is coupled to the above suspension.

FIG. 10 illustrates the path of the instant center of rotation (IC), as well as the anti-squat and anti-rise behavior of several embodiments of a rear middle suspension. Embodiment one 1010 includes a slide link and a forward control link. The slide link includes a stanchion that is pivotally coupled to the frame and the angle of the mating cylinder on the swingarm is approximately 45°. The IC path (between the compression (comp) and extension (ext) of the travel) is a relatively vertical path and forward of the control link.

Note a property inherent to embodiment one, as well as many other embodiments disclosed herein. As the middle suspension compresses, the angle between the pivoting stanchion and the control link becomes more acute. Accordingly, this travel provides a progressive response between the stanchion and guide link. Using other configurations, a digressive response can be tuned. Thus, a progressive or digressive travel, along with progressive/digressive parameters such as spring rate, rebound, etc are achieved via linkage configurations. This may alleviate the need for other progressive/digressive elements, such as progressive/digressive shock assemblies.

Embodiment two 1020 includes a slide link that slides along the frame's seat tube. The IC path is relatively vertical and located approximately at the forward end of the control link. Embodiment three 1030 includes a slide link that slides along or within a mating member on the swingarm, where the mating member is much more horizontal to than that of embodiment one. Note that the IC path is a much more horizontal path than that of embodiments one and two. The curves on the below portion of FIG. 10 show the anti-squat 1040 and anti-rise 1050 behavior of the three embodiments as a function of percentage of rear wheel travel.

Figure 11B:
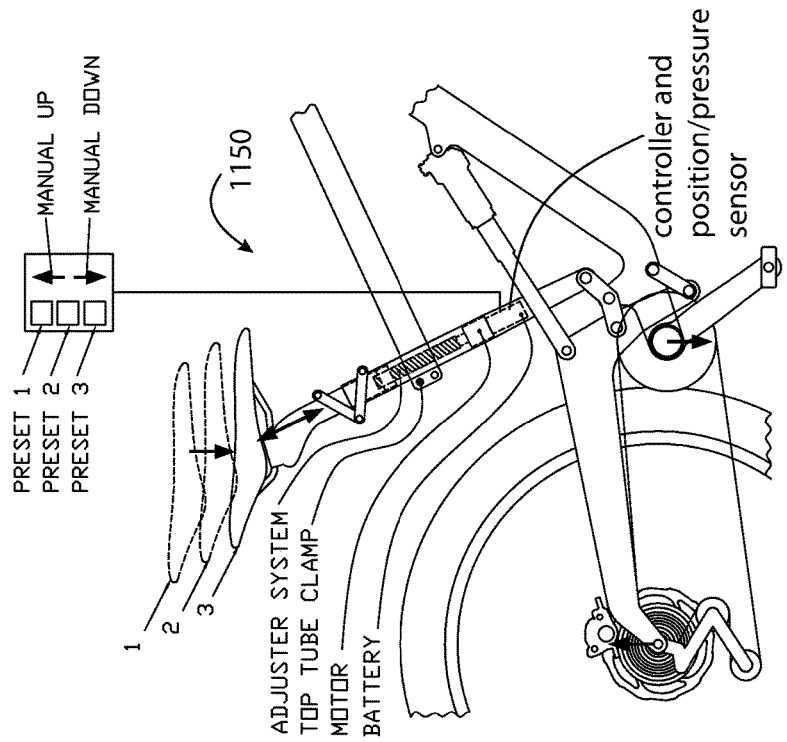
FIG. 11B illustrates an automated saddle adjusting system in combinations with a rear middle and above suspension.
Figure 11A:
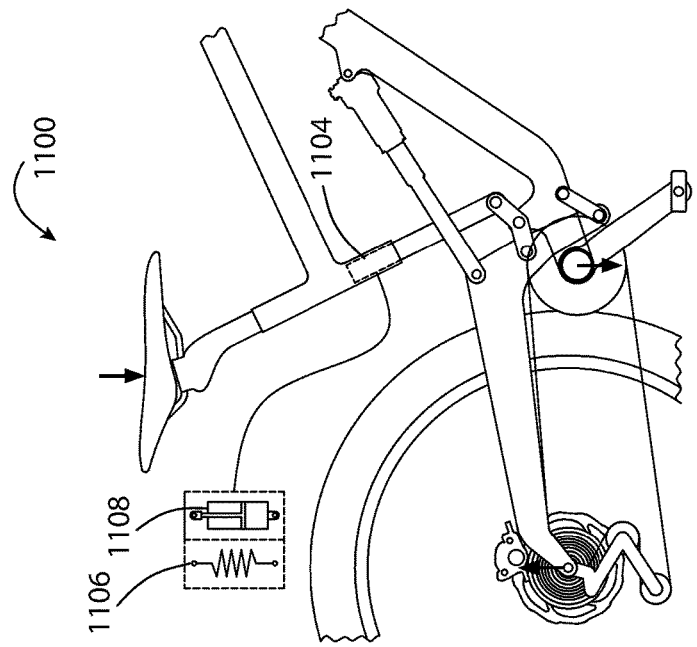
FIG. 11A shows a biasing member and an energy-dissipating member employed to partially isolate a travel associated with a rear middle suspension from a travel associated with a rear-above suspension.

FIG. 11A shows a biasing member 1106 and an energy-dissipating member 1108 employed to partially isolate a travel associated with a rear middle suspension from a travel associated with a rear-above suspension. The frame of bicycle 1100 includes a telescoping seat tube 1104. In a preferred embodiment, at least one of the biasing member 1106 or the energy-dissipating member 1108 may be positioned within the telescoping seat tube 1104. In other embodiments, at least one of the biasing member 1106 or energy-dissipating member 1108 may be positioned external to the telescoping seat tube 1104.

Biasing member 1106 may include a spring or other elastomeric member such as a microcellular urethane spring (MCU), an air spring, or the like. The energy-dissipating member 1108 may be a damper, such as an oil damper. The biasing member 1106 and energy-dissipating member 1108 may be integrated into a shock assembly. At least one of the biasing member 1106 or the energy-dissipating member 1108 enables a rider to tune or otherwise adjust a decoupling strength or other characteristic between the above and middle rear suspensions.

FIG. 11B illustrates an automated saddle adjusting system 1150 in combinations with a rear-middle and above suspension. As shown in FIG. 11B, in preferred embodiments, at least a portion of the components of the automated saddle adjusting system 1150 are positioned internally to the seat tube. The system may be employed to actively adjust a saddle height during a ride. The automated saddle adjusting system 1150 includes top tube clamp, a motor, and a battery to power the automated saddle adjusting system 1150. In other embodiments, the system may include hydraulics and/or pneumatics. The automated saddle adjusting system 1150 may also include at least one of a controller or a sensor, such as a pressure and/or position sensor. The sensor, or any other sensor discussed herein may actively monitor the position or a shift in position of the CM of a vehicle payload, including the rider. The sensor may monitor a current height of the saddle. The controller may be a processor device, such as a microcontroller. The automated saddle adjusting 1150 manually translates the saddle or seat up and down. The system may include multiple presets specific to a rider. The rider may manually control the automated saddle adjusting 1150, or the sensor/controller combination may monitor real time riding conditions and/or CM shifts to actively and in real time adjust the saddle height.

As with the rear of the vehicle, the front on the vehicle may be suspended above, below, and in the middle of the vehicle. A front-middle suspension enables a travel of or within the head tube, relative to the rest of the frame. Because the head tube is situated approximately in the middle of the vehicle, such a movement may be loosely classified as a middle travel or middle suspension. When the travel elements are coupled to the fork, the middle travel may result in a translation of the front wheel along an arm of a wheel mounting assembly, such as a fork. The term fork as used herein includes both dual armed (or legged) forks, as well as single arm front wheel mounting assemblies. Front-above suspensions enable a relative travel between the frame and a vehicle member that contacts the hands of a rider, such as handlebars. As shown below, front-below suspensions enable further additional travel of the fork, resulting in additional travel of the front wheel.

Figure 12:
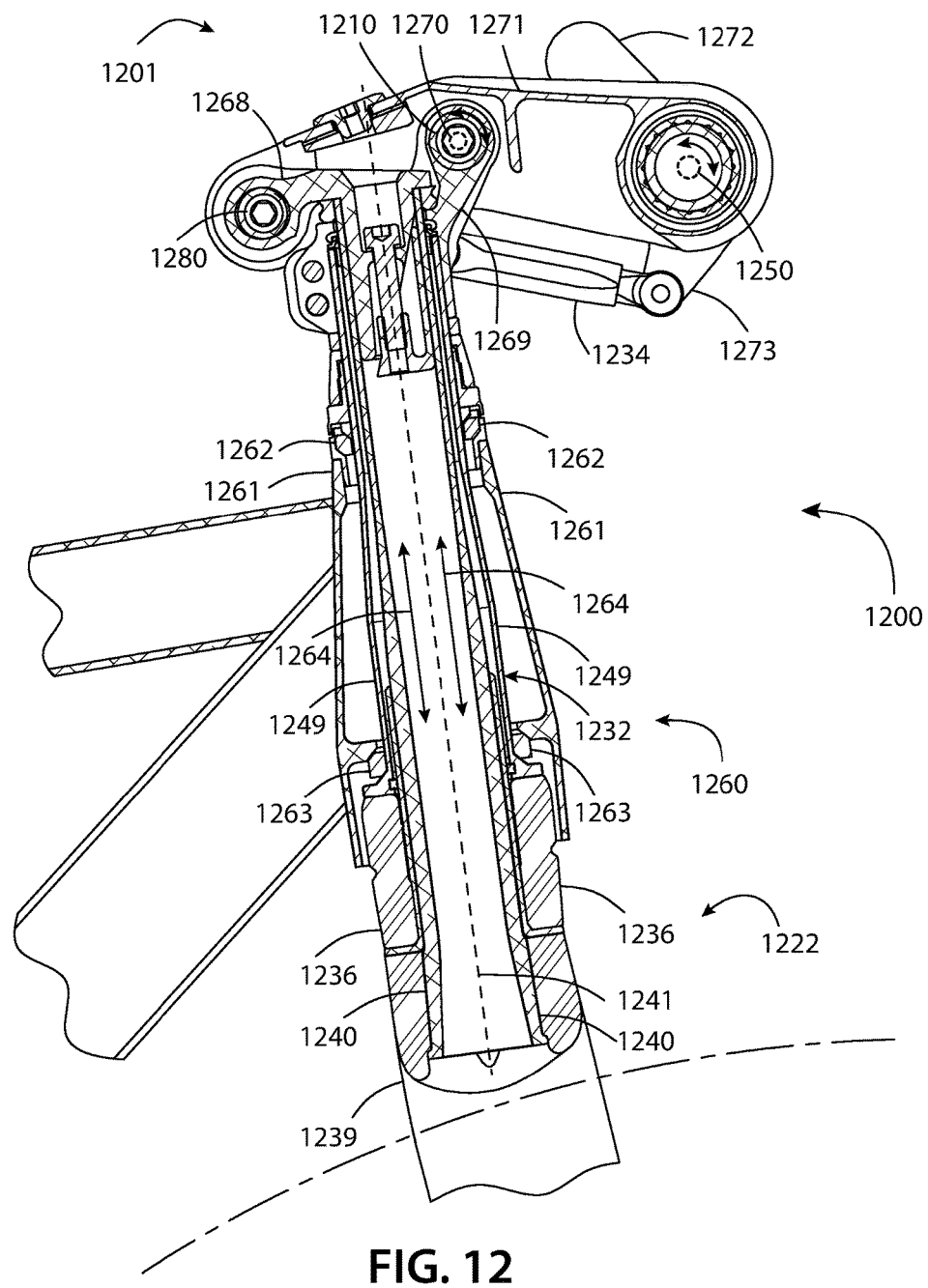
FIG. 12 shows a coupled front-middle, above, and below suspension on a bicycle.
Figure 13:
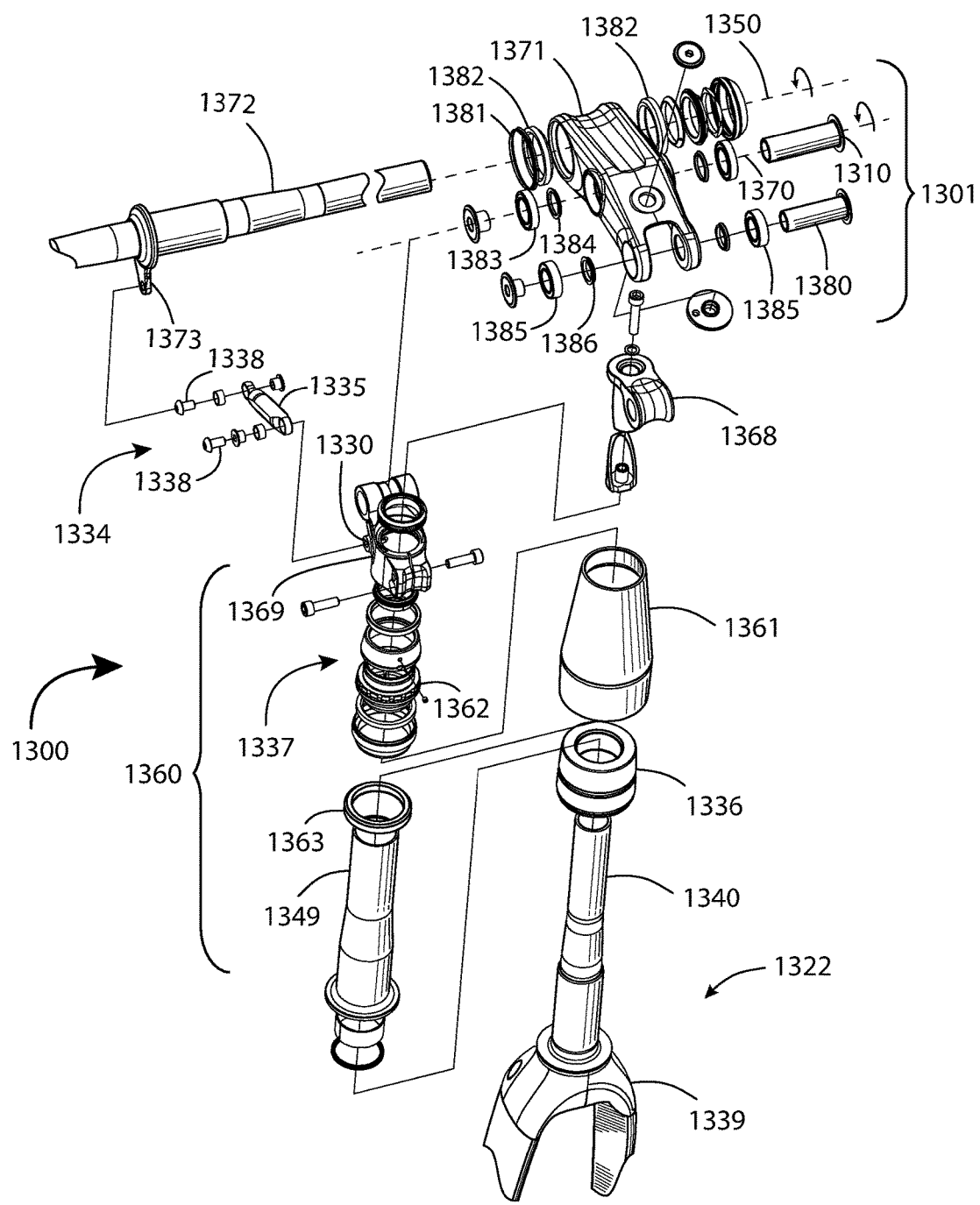
FIG. 13 provides an exploded view of the coupled front-middle, above, and below suspension of FIG. 12.

FIGS. 12 and 13 show a coupled front-middle, above, and below suspension on vehicle such as a bicycle. For brevity, FIG. 12 will refer to this as front suspension system 1200, and FIG. 13 as front suspension system 1300. FIG. 12 shows a cross section of a front suspension system 1200. FIG. 13 provides an exploded perspective view of the front suspension system 1200 of FIG. 12. Like number-series in FIGS. 12 and 13 indicate like elements. For example, handlebar 1272 is equivalent to handlebar 1372; stem assembly 1201 is equivalent to stem assembly 1301, and so on.

The inventor observed that bicycles are very efficient. Generally, about 90% of rider's energy gets transferred to the ground. However, this energy is relatively small, typically under 5 watts/kg. When one or more wheels lose contact with the ground, or the wheels are under compressive loads, there are losses that require additional energy to overcome them. These losses can include loss of control, braking ability, and speed. Over time, this loss of energy can become significant, because of the relatively small energy output of the rider. This loss of energy can cause rider fatigue and loss of performance. The wheel can typically lose contact with the ground from uneven terrain, rocks, or bumps. The inventor discovered that he could develop a suspension system, such as the front suspension system 1200, 1300 of FIGS. 12 and 13 that allowed the wheel to trace the ground. This would help reduce the loss of energy caused by preventing the wheel from lifting off the ground. This is quite different then the design focus of most bicycle and vehicle suspension systems that attempt to isolate the rider from the shock of uneven terrain. While this observation was made for bicycles, the principle can apply to other similar vehicles such as motorcycles and the like.

Referring to FIGS. 12 and 13, the front suspension system 1200, 1300 includes a stem assembly 1201, 1301 a head tube assembly 1260, 1360, and a front wheel mounting assembly 1222, 1322. The head tube assembly 1260, 1360 includes a head tube 1261, 1361 and a slide link assembly 1232 (FIG. 12) inside the head tube 1261, 1361. The slide link assembly 1232 includes a fork steer tube 1240, 1340 slidably coupled within a head steer tube 1249, 1349. Note that the terms steer tube, and "steerer tube," used in the art, are equivalent for the purpose of this disclosure. The fork steer tube 1240, 1340 and the head steer tube 1249, 1349 are concentric and coupled for translational movement along the inside of the head tube 1261, 1361. The head tube 1261 being the outermost tube and the fork steer tube 1240 being the inner most tube. The fork steer tube 1240, 1340 couples with the forks 1239, 1339 causing the front wheel to translate along the head tube centerline 1241 of FIG. 12. The arrowed lines 1264 in FIG. 12 represent the sliding translational movement between the fork steer tube 1240, 1340 and head steer tube 1249, 1349. A head steer tube clamp 1269, 1369 and a fork steer tube clamp 1268, 1368 couples the fork steer tube 1240, 1340 and the head steer tube 1249, 1349 to the stem 1271, 1371 and couples the plane of rotation between the forks 1239, 1339 and handlebar 1272, 1372.

The head steer tube 1249, 1349 is clamped with a head steer tube clamp 1369 and coupled movably with fork steer tube 1240, 1340 by fork steer tube clamp 1268, 1368. Motion is restricted such that the front wheel mounting assembly 1222, 1322 and the fork steer tube 1240, 1340 remain aligned in an axial plane to one another.

The front suspension system 1200, 1300 is a sliding four-bar system. The front suspension system keeps handlebar 1272, 1372 level as the front suspension system 1200, 1300 moves through its travel. The front suspension system 1200, 1300 constrains the rotation of the handlebar 1272, 1372 and mating components of the stem 1271, 1371, head steer tube clamp 1269, 1369, and primary axle 1210, 1310 to the fork steer tube clamp 1268, 1368, bearing, and secondary axle 1280, 1380. The head tube 1261, 1361 is constrained to rotate about one plane of rotation about the upper head tube bearing 1262, 1362 and lower head tube bearing 1263, 1363. Referring to FIG. 13, the mating components of the handlebar 1372 with the stem 1371 include seals 1381 and bearings 1382. The mating components of the primary axle 1310 include bearings 1383 and seals 1384. The mating components of the secondary axle 1380 include bearings 1385 and seals 1386.

Figure 16:
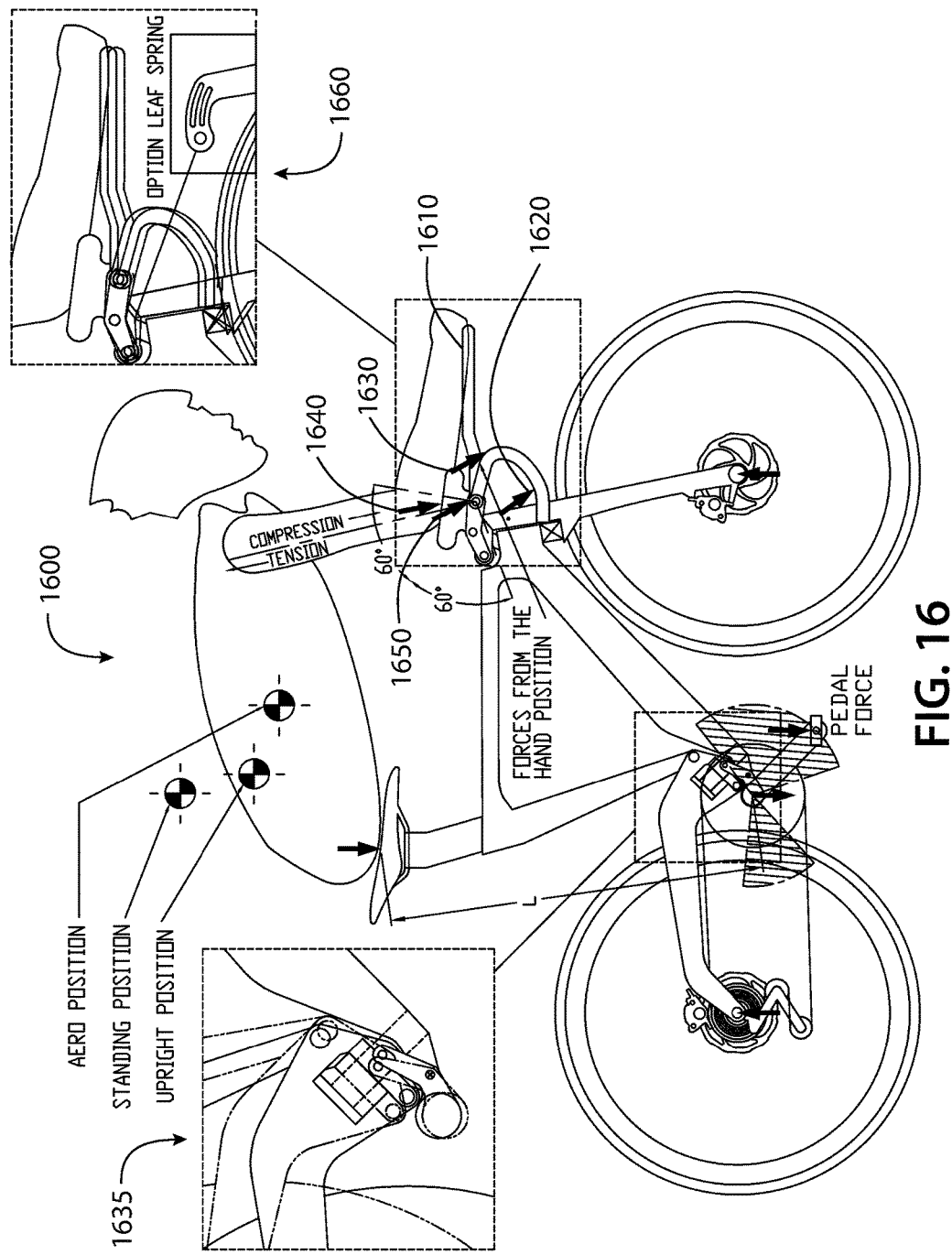
FIG. 16 illustrates a bicycle that includes an above, middle and below rear suspension as well as an above, middle, and below front suspension and an aerobar.

In FIGS. 12 and 13, the fork steer tube 1240, 1340 moves generally along the head tube centerline 1241. While the fork steer tube 1240, 1340 in FIGS. 12 and 13 are internally concentric to the head steer tube 1249, 1349, it is also possible to configure the fork steer tube 1240, 1340 external to the head steer tube 1249, 1349 as long as they translate along a general axis such as the head tube centerline 1241 (FIG. 12). FIG. 16 shows an example of these elements externally and non-concentrically arranged.

Referring again to FIGS. 12 and 13, stem 1271, 1371 is configured and arranged to move about a first axis 1270 (FIG. 12). The first axis 1270, 1370 may be a horizontal rotational axis about the stem 1271, 1371 as illustrated, but is not limited to being horizontal or rotational. The first axis 1270 is indicated by a broken lined circle (FIG. 12). The exact location of the first axis 1270 will vary from embodiment to embodiment and will depend on details of the various components employed.

The handlebars 1272, 1372 are configured and arranged to rotate about a second axis 1250, 1350. The second axis 1250, 1350 may be a horizontal rotation access about the handlebar, but is not limited to horizontal axis. The second axis 1250 is indicated by the dashed line disk (FIG. 12) positioned where the handlebars 1272, 1372 are coupled to the stem 1271, 1371.

Rotations about the first axis 1270, 1370 and the second axis 1250, 1350 may be coupled by a mechanical linkage or other means of flexing. For example, in some embodiments, the other means of flexing may include a cylinder and piston and some type of sliding device. In FIG. 12, the mechanical linkage includes a guide link assembly 1234, 1334. The guide link assembly 1234, 1334 is length adjustable and may rotatable and/or flexible pivot to accommodate the variance in angles between a point fixed relative to the fork steer tube 1240, 1340 and a point fixed relative to the handlebars 1272, 1372. One end of the guide link assembly 1234, 1334 is coupled to a guide link support 1273, 1273 that is at a fixed angle relative to the handlebars 1272, 1372 and/or upper front assembly of the handlebar 1272, 1372. As best seen in FIG. 13, the end of the guide link assembly 1334 is coupled with the head steer tube clamp 1369 on control link mounting hole 1330. Threaded fasteners 1338 secure the guide link 1335 of the guide link assembly 1334 to the guide link support 1373 and the control link mounting hole 1330. Referring back to FIGS. 12 and 13, in general, the guide link assembly 1234, 1334, can be coupled to at least a fixed point relative to a portion of the head steer tube 1249, 1349 and the fork steer tube 1240, 1340.

By coupling the two elements associated with the first axis 1270, 1370 and the second axis 1250, 1350 together, the handlebars 1272, 1372 are configured and arranged for constrained translational and rotational motion within a front wheel plane. In some embodiments, the length of the guide link assembly 1234, 1334 can be held constant. For these embodiments, the angle between the fixed point relative to the fork steer tube 1240, 1340 and the fixed point relative to the handlebars may vary, however the distance between the two points remains constant and is constrained by the length of the guide link assembly 1234, 1334.

In FIGS. 12 and 13, the primary axle 1210, 1310 through the stem 1271, 1371 is coupled to the fork steer tube 1240, 1340 and the head steer tube 1249, 1349. The primary axle 1210, 1310 or primary link, can be co-aligned with the first axis 1270, 1370 with the stem 1271, 1371 rotatable about the primary axle 1210, 1310. The primary axle 1210, 1310 may be located through the stem 1271, 1371 and head steer tube clamp 1269, 1369. In FIG. 13, the primary axle 1310 is shown passing through the stem 1371 and head steer tube clamp 1369 with the guide link assembly 1334 also coupled to the head steer tube clamp 1369.

FIG. 12 show the rear or secondary axle 1280 that passing though the stem 1271 and behind the head tube centerline 1241. In FIGS. 12 and 13, the secondary axle 1280, 1380 is coupled to the head steer tube 1249, 1349 and the fork steer tube 1240, 1340. The head steer tube 1249, 1349 and the fork steer tube 1240, 1340, in combination, translate motion along the head tube 1261, 1361 in response to movement of the stem 1271, 1371. In some embodiments, this coupling may be enabled by an upper portion of the fork 1239, 1339. Such coupling enables a translational motion relative to the head tube 1261, 1361 as shown by the arrowed lines 1264 in FIG. 12 and in response to activation of the upper suspension. In some embodiments, the coupling between the secondary axle 1280, 1380 and the fork steer tube 1240, 1340 may enable translational motion of the fork steer tube 1240, 1340 within or from outside the head tube 1261, 1361.

Inflection load on the handlebar 1272, 1372 may provide feedback to the suspension coupling the fork steer tube 1240, 1340. For instance, the fork 1239, 1339 may be responsive to such translational motion within the head tube 1261, 1361. Feedback between the upper and middle suspensions may be enabled by the translational motion to the fork steer tube 1240, 1340 and head steer tube 1249, 1249 in combination.

The translational movement of the fork 1239 may be constrained by an opposing spring or biasing force and an energy-dissipating force, such as a dampening force. The opposing spring force and dampening force may be enabled by a spring or dampener such as dampener 1236, 1336 of FIGS. 12 and 13. The dampener 1336 is positioned to support the head tube 1361 under load. The dampener 1236, 1336 depicted is a microcellular urethane spring, also known in the art as an MCU. The dampener 1236, 1336 can also be a spring/dampener or other elastomeric element, or even a gas or an oil-damping element. The front suspension system 1200, 1300 can employ two or more springs or dampeners, located throughout the front suspension system 1200, 1300. The biasing force and the energy-dissipating force may or may not be integrated into a single assembly, such as a shock assembly.

The dampener 1236, 1336 is shown positioned within the head tube 1261, 1361 so that is not visible when assembled. Positioning the dampener 1236, 1336 inside the head tube 1261, 1361 has several advantages. The front suspension system 1200, 1300 can be adapted for use in currently manufactured bicycle frames. Most of the suspension components are hidden, so they appear integrated with the rest of the bicycle. This is especially desirable for road bicycles.

The translational movement of the fork 1239, 1339 may result in translational movement of fork steer tube 1240, 1340 with respect to head tube 1261, 1361 along the head tube centerline 1241, 1341. The upper suspension may be responsive or otherwise coupled, to translation of the fork steer tube 1240, 1340 with respect to head tube 1261, 1361. For instance, travel within the head tube 1261, 1361 and/or the fork 1239, 1339 may provide feedback to the upper suspension.

In FIG. 13, a plurality of fasteners is used to couple the stem assembly 1301 to the head tube assembly and the rest of the front suspension system 1300. A plurality of steerer tube fasteners 1337 coupled the concentric steer tube configuration to both the upper traveling and below traveling members. In addition, FIG. 14A shows a front and side profile of a front-middle, above, and below suspension system where spring and damper elements 1410 have been integrated into the head tube. The horizontal rotation, induced by a top down or a bottom up vehicle load, of the handlebars is shown. The travel of the front wheel axle associated with the middle and above suspensions is also shown. FIG. 14B shows another embodiment of a front-middle, below, and above suspension. The embodiment shown in FIG. 14B includes a telescoping fork 1420 to enable a greater range of travel associated with the middle and below suspensions. Accordingly, some embodiments may include travel internal to the head tube and/or additional travel external to the head tube via the telescoping fork.

Figure 14C:
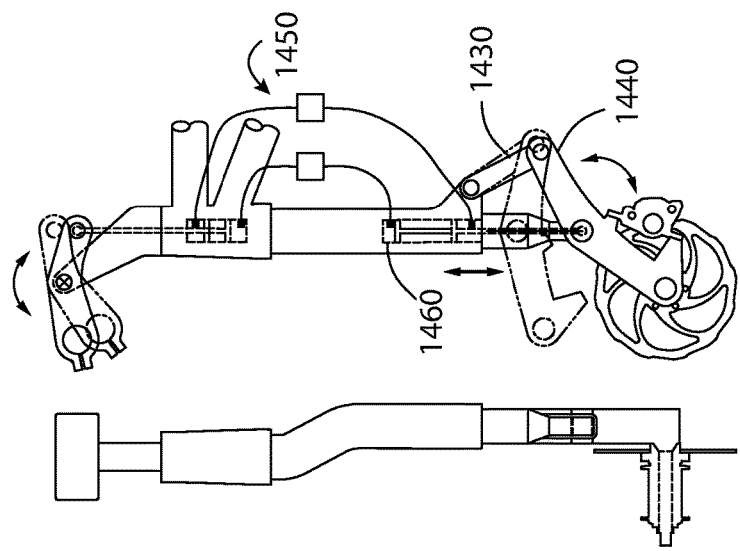
FIGS. 14A-C shows various embodiment of a front-middle, above, and below suspension.
Figure 14B:
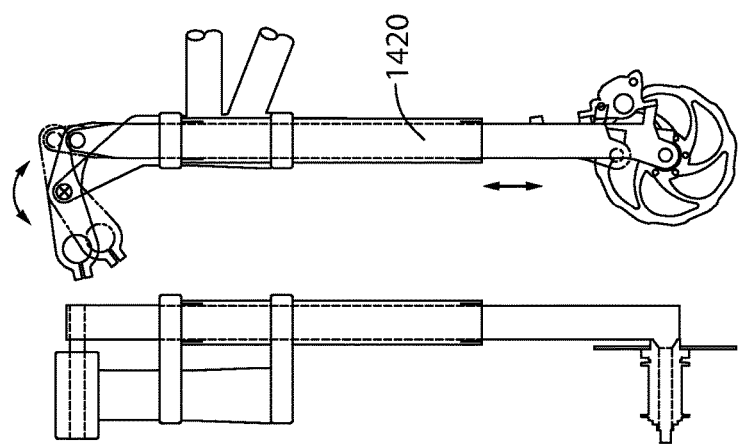
Figure 14A:
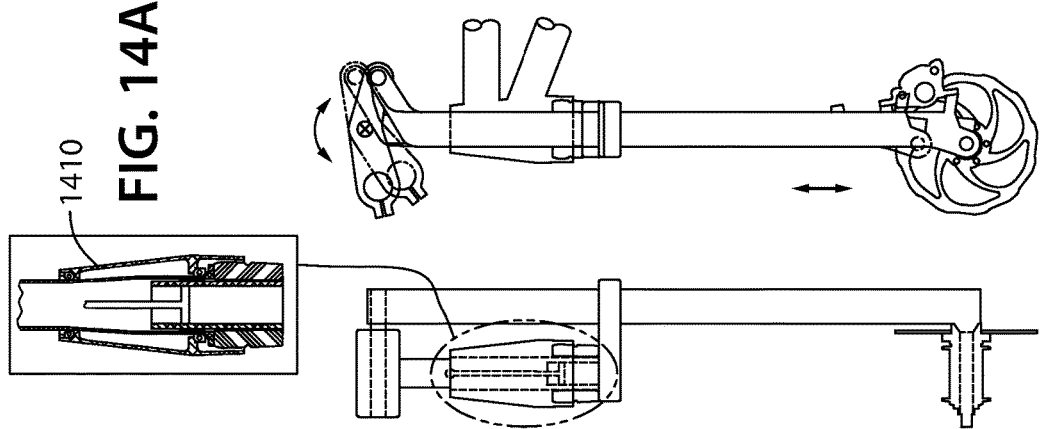

FIG. 14C shows yet another embodiment of a front-middle, above, and below suspension. The telescoping fork 1420 shown in FIG. 14 C includes another articulation of the front wheel that is enable by a telescoping fork 1420, as well as the linkages 1430, 1440 which introduce a fore and aft travel of the front wheel. A shock assembly 1460 had been integrated into at least one of the legs of the telescoping fork. Additional a system 1450 that includes at least one of a controller or a sensor actively adjusts and/control the front suspension system in response to real time ridging conditions.

FIG. 15A shows the kinematic behavior of the path of an IC of rotation for a front-middle, above, and below suspension. The above and lower links couple the rotating handlebars to the middle traveling components (internal to the head tube), as well as the translating forks. Note that the near horizontal path of the IC in this embodiment.

FIG. 15B shows an embodiment of a front-middle, above, and below suspension in both a compressed and an uncompressed state. The solid figure shows the front suspension system in an extended state. The hashed figure is in the compressed state. Note the differences in the stem angle, handlebar angle and position, as well as the position of the front wheel. FIG. 15B also demonstrates some of the advantageous of having a middle, an upper, and lower suspension that are coupled via feedback or a generated signal.

One effect associated with the multiple suspensions is that a portion of the energy that the rider inputs to the bicycle, such as power from the rider's pedal strokes, is lost due to travel in the lower suspension. This leads to inefficiencies as some of the rider's pedaling power is lost. This is especially true when a rider is climbing, and some of the energy of the pedal stroke is transferred into the translating fork. Thus, some suspension systems incorporate a "lockout" mode where the rider can switch between a more rigid mode of the suspension and a less rigid mode of the suspension, depending on the terrain and type of riding.

With various embodiments of the front suspension system, a natural "lockout" mode is inherent due to the feedback between the upper, middle, and lower suspensions. For instance, when a rider is climbing, the rider will naturally pull back of the handlebars to increase their leverage. As shown in FIG. 15A, a force pulling back on the handlebars will rotate the handlebars counterclockwise, translating the fork in a generally downwards direction. Thus pulling back on the fork creates a lockout effect because the upper suspension is coupled to the lower suspension. When the rider pulls back on the handlebars, a spring rate may increase stiffening the lower suspension. As shown by the opposing gray-scaled arrows, the harder the rider pulls back on the handlebars, the greater the lockout effect is.

The opposing solid arrows demonstrate more advantages of coupling the upper and lower suspensions. For similar reasons, when a rider pushes down on the handlebars, a signal is generated and the lower suspension becomes more responsive. For instance, when a rider's CG shifts, such as when the rider applies the front brake, more of the rider's weight shifts onto the handlebars. The clockwise horizontal rotation of the stem and/or handlebars may lessen a spring constant, resulting in a more responsive lower suspension. The more downward force a rider inputs into the handlebars, the less force that is required to compress the fork. The downward arrow on the vehicle structure shows the effect of a vehicle load of the front-middle vehicle structure.

FIG. 15C in combination with 15B show various methods providing a controlling means for the front-middle, upper, and lower suspensions. Note that any of these means may be applied to the rear suspensions as well. Box 1510 shows using a controller, such as a microcontroller, and multiple hydraulic chambers to regulate a travel, or compression, ratio between the upper and lower suspensions. In this particular embodiment, the upper suspension includes a single hydraulic chamber and the lower suspension includes two hydraulic chambers. The volumes and/or cross sectional area of each cylinder may be different, but need not be. The controller may adjust each cylinder during operation of the front suspension system. In this embodiment, each cylinder may provide a signal to the controller directly, and the controller can process the signal, and in response, send signals to the other chambers. Such adjustments may include opening or closing the cylinder. For instance, a cylinder may move fluid into either one or two cylinders based on the corresponding travel and suspension needs.

Box 1520 demonstrates that the upper and lower suspensions may provide direct feedback, or control signals, to the other cylinder without the intervention of a controller. Box 1530 shows a controller configuration employing a hydropneumatic suspension. In such a configuration, the spring force may be varied. Box 1540 shows yet another configuration to control the dynamics of the suspensions.

FIG. 16 illustrates a bicycle that includes a rear middle, above, and below suspension as well as a front above, middle, and below suspension and an aerobar 1610. A close-up of the rear below and middle suspension is shown in box 1635. The push-down and pull-up zones on the pedaling motion are shown, as well as the resulting top-down loads on the bottom bracket. Note these zones may vary per rider. For instance, a more novice rider, or a bicycle where the rider's shoes are not coupled to the pedals may not generate a pull-up zone, or generate a substantially smaller pull-up zone. The coupling of the rear-above, middle, and below travel adjusts the responsiveness of the suspension to account for the various loads on the bottom bracket due to rider variations and other such influences.

Furthermore, the vehicle loads on the front-middle portion of the vehicle, due to the rider's contact with the various portions of the front structure of the bicycle 1600, are shown via arrows 1620, 1630, 1640, and 1650. Arrow 1620 shows a typical load when the rider is engaging with the drop bars. Arrow 1630 shows the loads associated with rider engaging with the hoods of the handlebars. Likewise, arrow 1650 shows the loads when the rider is in a standing position or upright position. Arrow 1640 shows the typical loads when the rider is using the aerobar. Note that the front suspension is responsive to the force vectors and is actively adjusted and/or controlled based on the direction and magnitude of the vehicle load on both the front and the rear vehicle structures.

For instance, both the magnitude and direction of the front portion force vector varies greatly from when the rider is in a standing position, as compared to when the rider is resting a large portion of their mass on the aerobar 1610. The rider's CM/CG for three riding positions (aero, standing, and upright) are also shown. View 1660 shows that an optional leaf spring may be used to at least partially isolate the above, middle, and below travel.

Figure 17:
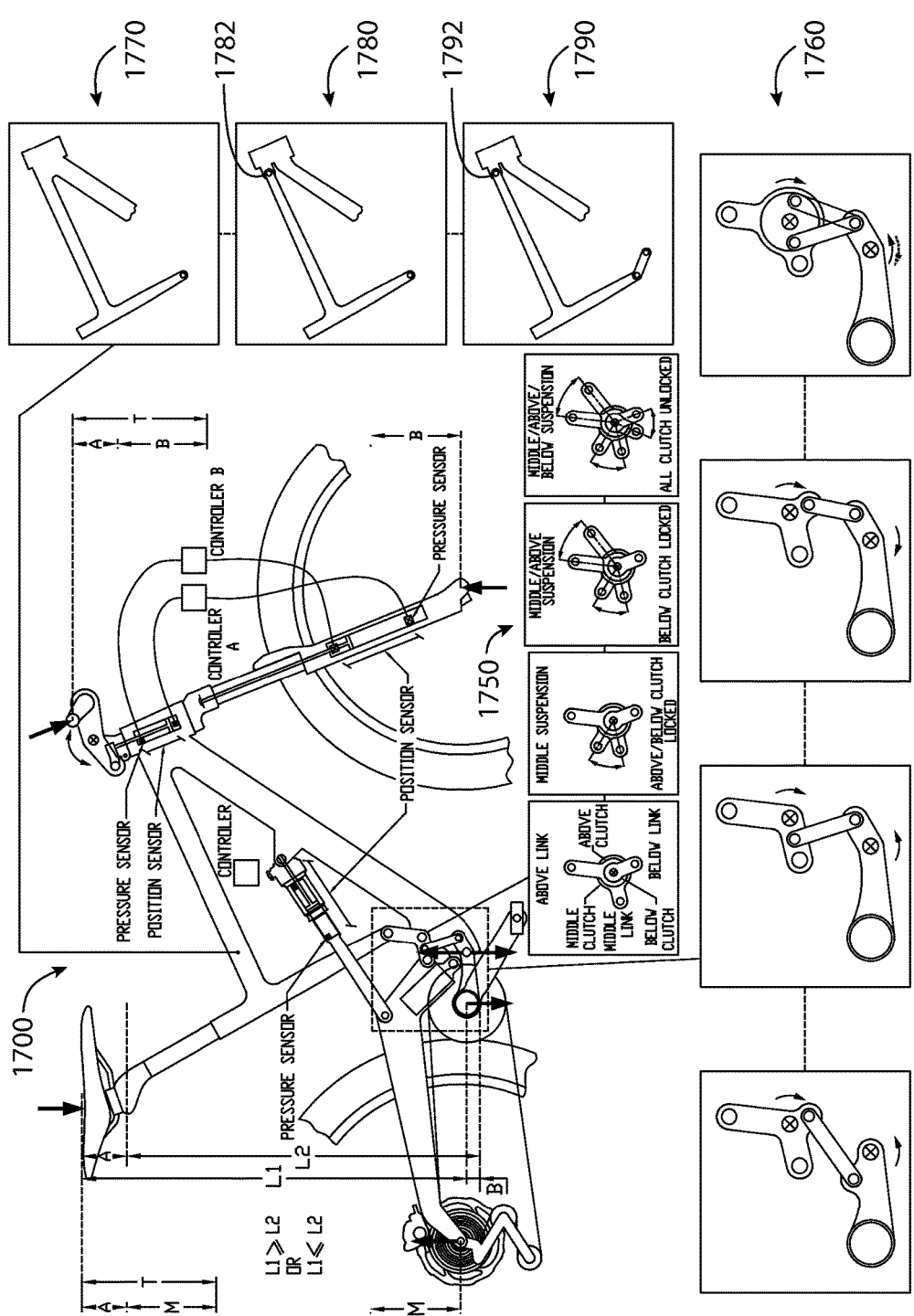
FIG. 17 shows various embodiments of rear and front suspension systems for a bicycle.

FIG. 17 shows various embodiments of rear and front suspension systems for a bicycle. Bicycle 1700 includes a rear over, middle, and below suspension and a front over, middle, and below suspension. Various sensors (pressure and/or position and other sensors), as well as controller units are employed to actively adjust vehicle operational parameters, including, but not limited to suspension, frame geometry, braking, and drivetrain parameters. Although pressure and position sensors are shown, it should be noted that any general type of sensor may be employed, depending upon the application.

The front suspension includes a telescoping fork that enables the below travel. The middle travel is shown within the head tube, as well as the above travel via the rotating (and translating) handlebars. The sensors can additionally sense parameters corresponding to damping elements embedded in the head tube and/or telescoping fork legs. The responsiveness of each travel may be adjusted independent via a controller based on sensor, or input data from at least one of the other suspensions/travel, such as when one suspension acts as a tracer suspension For instance, the energy-dissipating/energy-storage parameters (rebound, spring rate, etc) may be actively adjusted in real time. Furthermore, the various travel ratios, travel length, and frame geometry parameters (such as L1, L2, M, A, T, B, and the like) may be held constant or adjusted depending upon the current riding and/or terrain conditions. The geometry parameters can be used to define various travel and geometry ratios Views 1770, 1780, and 1790 show various embodiments of bicycle frames. View 1770 shows a frame with a flexible top tube member that provides the saddle travel corresponding to the rear above suspension. In other embodiments, the top tube member can be articulated as a pivoting member via a pivot joint positioned near the head tube, such as pivot joints 1782 and 1792 of views 1780 and 1790 respectively.

Figure 17A:
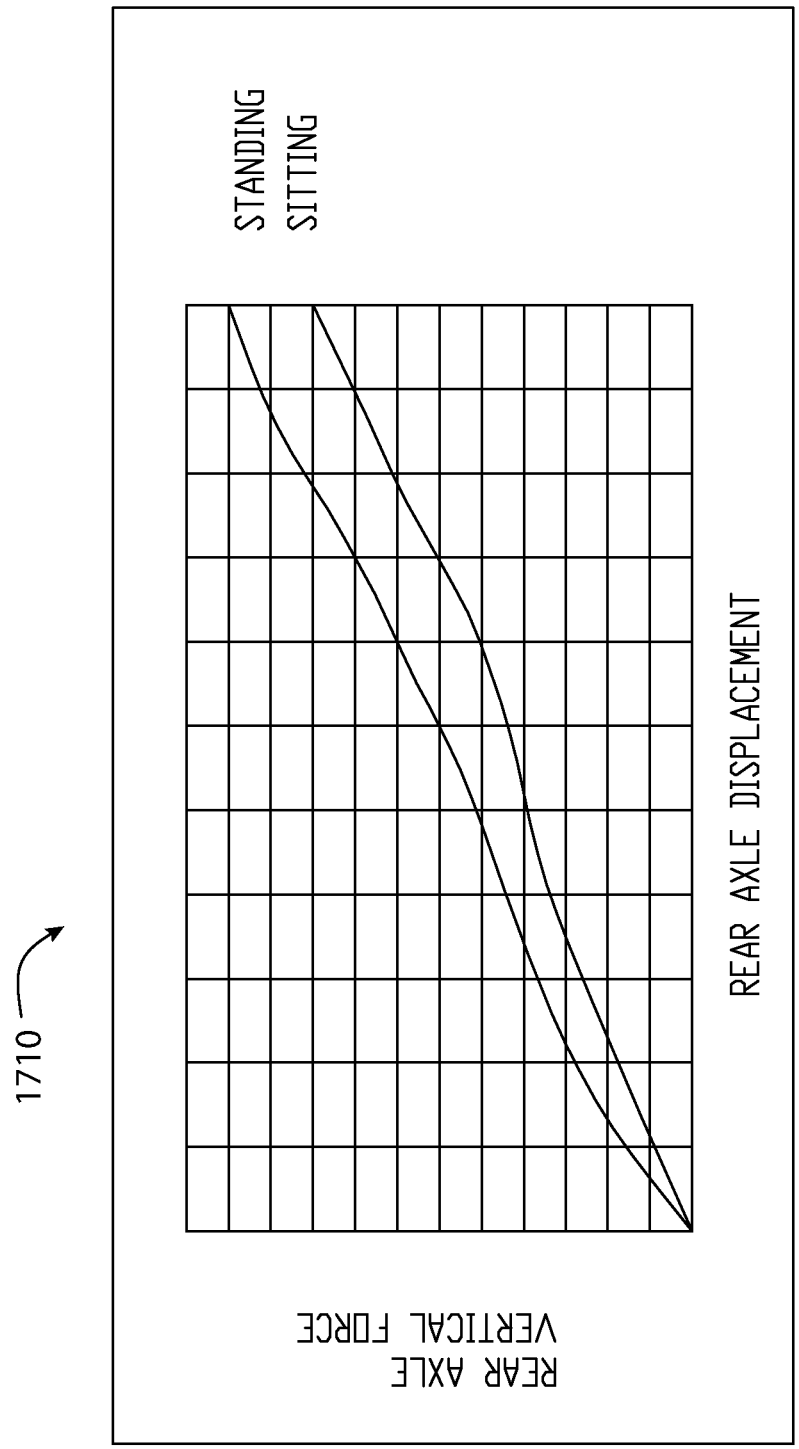
FIG. 17A shows exemplary curves for a vertical force vs axle displacement for the rear wheel with the rider in a standing and sitting position for FIG. 17.

Referring to FIG. 17A, plot 1710 shows exemplary curves for a vertical force v. axle displacement for the rear wheel with the rider in a standing and sitting position. Notice that the various embodiments detect the rider's CM/CG shift and adjust the suspensions responsiveness automatically. The standing curve is different than the sitting curve because the vehicle's payload mass is shifted and because the top-down forces are different.

Referring back to FIG. 17, breakout boxes 1760 show various relationships between the lower rear suspension and the coupling between the above and middle rear suspensions. The rightmost box of 1760 shows an eccentric link used to couple the above, middle, and rear. As used throughout, eccentric links may be employed as a switch. In this case, the eccentric may switch between anti-squat and pro-squat behavior. The breakout boxes 1760 further show how the travel ratio between the over/middle and the lower suspensions may be varied by varying the angle of the coupling link between the over/middle control link and the cantilevered bottom bracket. The eccentric of the rightmost box may act as a switch between two or more selected orientations of such a link to vary the travel ration.

Additionally, the breakout boxes 1750 shows various embodiments of clutch assemblies that may be used to engage/disengage the suspensions, or the coupling between the suspensions. Notice that independent clutches may be used for each of the above, middle, and below travel. In addition, the clutches may be employed to vary the travel ratios in real time. The clutches may be activated manually by the rider or automatically by a clutch controller. Clutch assemblies, employed in various combinations enable further real-time control of various vehicle parameters.

Figure 18:
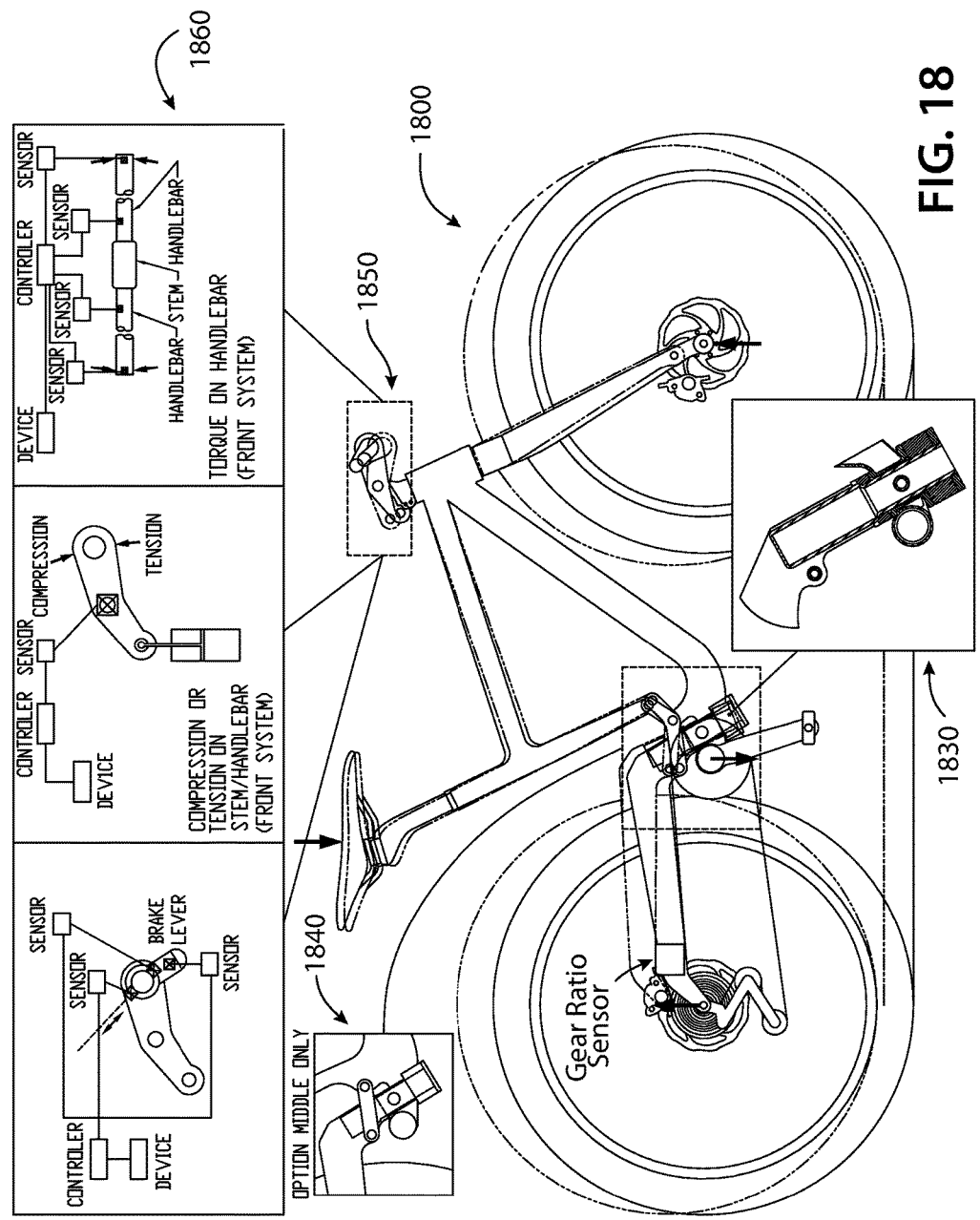
FIG. 18 illustrates various embodiments of a rear and front suspension that includes a plurality of controller and sensor devices.

FIG. 18 illustrates various embodiments of a rear and front suspension that includes a plurality of controller and sensor devices. Bicycle 1800 shows a front above, middle, and below suspension 1850 as well a rear middle and above suspension 1830 with the close-up view showing that the elastomer element is positioned underneath the sliding linkage, rather than on top as shown in FIG. 1. Positioning the elastomeric element underneath enables easy installation and maintenance of the elastomeric element. Also, a different elastomeric member, such as an MCU can easily be installed in response to a rider. For instance, a stiffer MCU could be installed easily for a more massive rider. When a lighter rider takes possession of bicycle 1800, a less stiff MCU can easily be installed. Breakout box 1840 shows such a configuration for a middle suspension only. Note the crossover guide or control link.

A gear ratio sensor can be used to detect a current gear ratio and adjust the responsiveness of the suspensions, or other operational parameters, based on the detected gear ratio. Breakout boxes 1860 show other configurations of sensors and controllers. For instance, the left breakout box of 1860 shows at least an upper and a lower sensor positioned on a handle grip of the handlebars. The lower sensor may sense an upward pull on the handlebars and via the controller initiate at least a partial lockout signal for at least the front suspension. Likewise, the upper sensor may sense a downward force on the handlebars, such as when landing a jump to automatically adjust, in real time, a more responsive front and/or rear suspension. Thus a suspension may act as a tracer or an input suspension to adjust other suspension in response to varying terrain and riding conditions. The other breakout boxes show other sensor/controller configurations.

Figure 19:
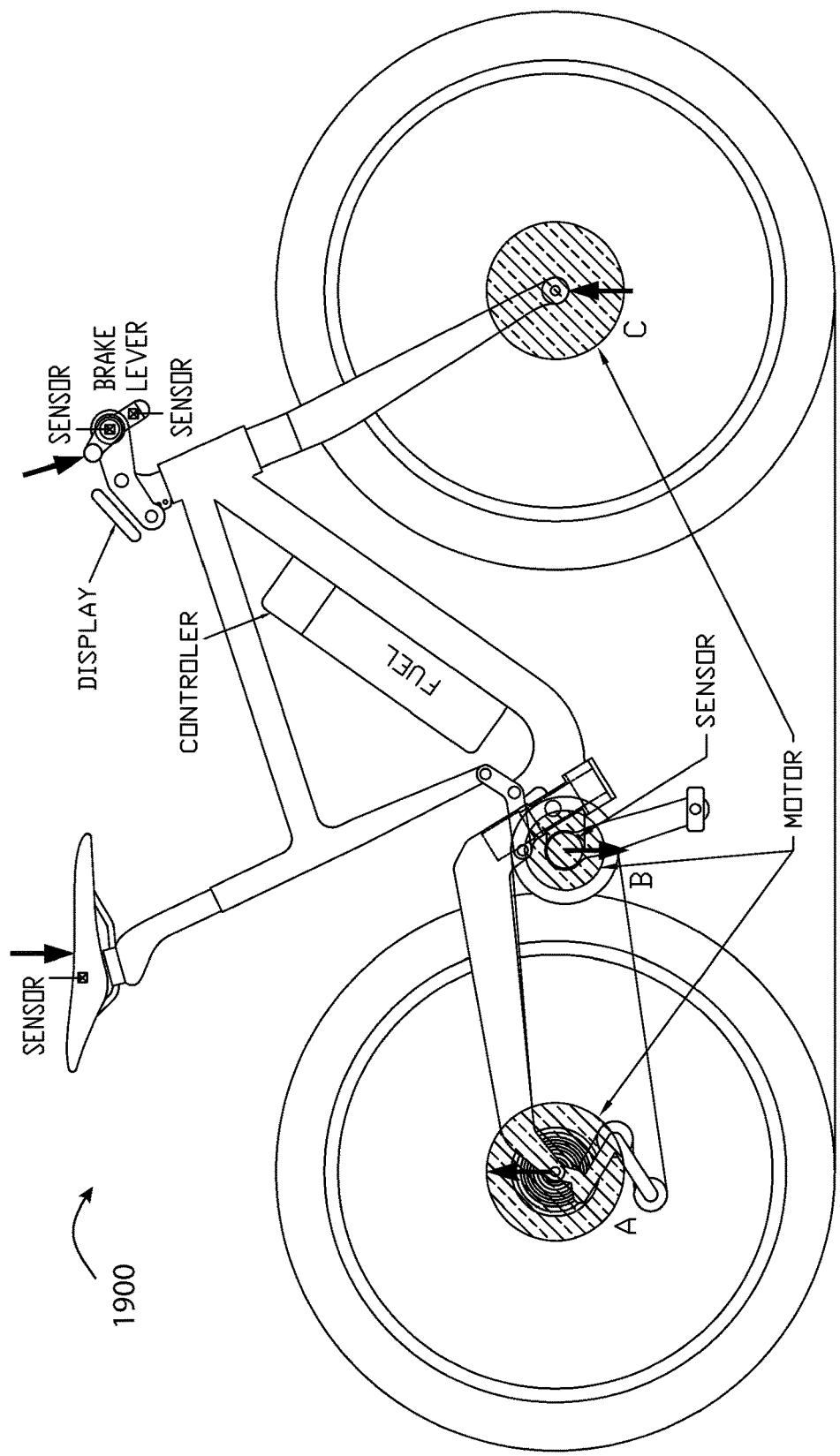
FIG. 19 shows an electric bicycle that includes an embodiment of an actively controlled front and rear suspension system that is consistent with the various embodiments disclosed herein.

FIG. 19 shows an electric bicycle 1900 that includes an embodiment of an actively controlled front and rear suspension system that is consistent with the various embodiments disclosed herein. Note that the electric bicycle 1900 includes many of the elements or components discussed throughout, includes a rear middle and upper suspension and a front-middle, above, and under suspension. Various controllers, sensors (positions and/or pressure), and controllers are also employed.

Figure 20:
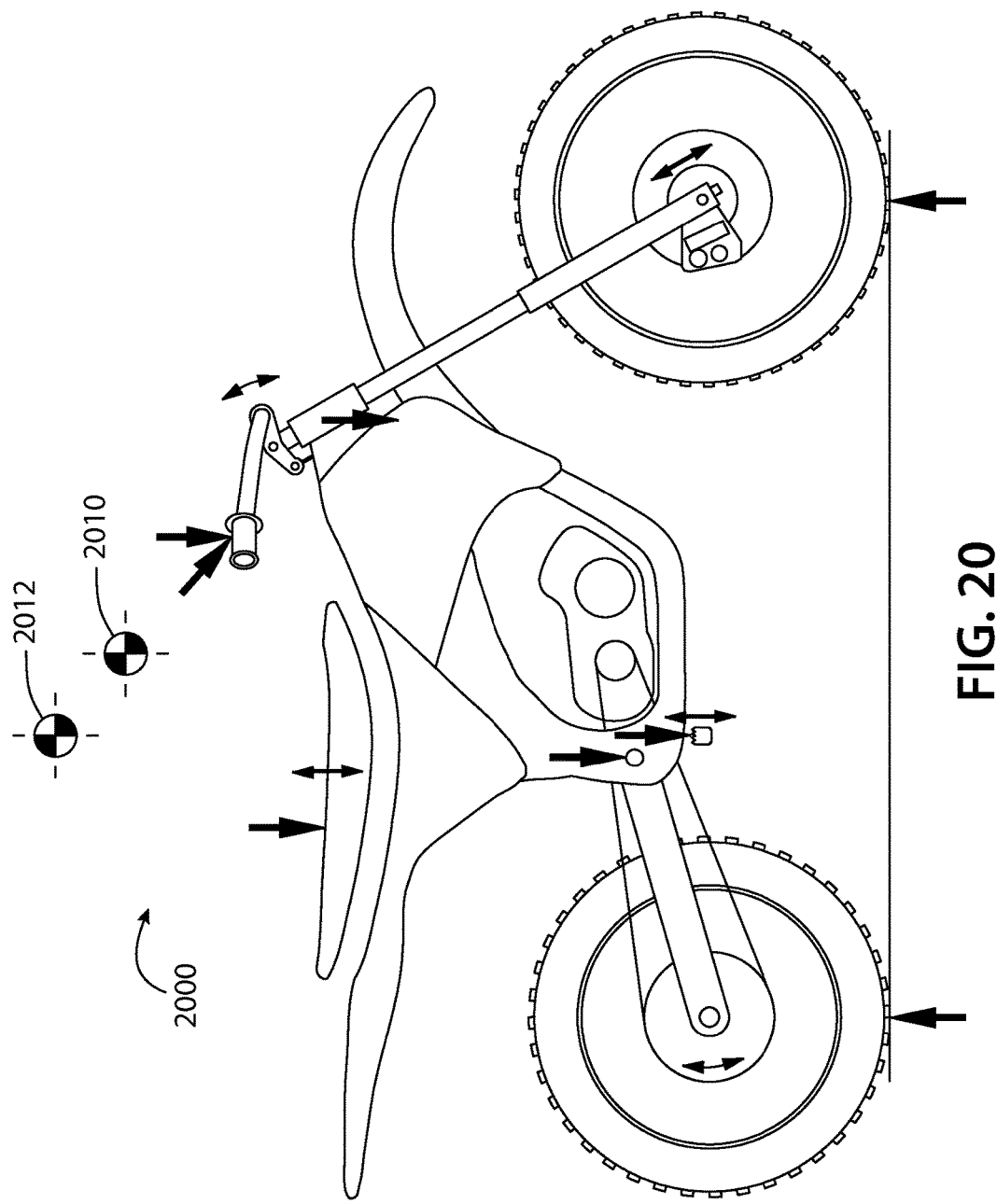
FIG. 20 shows a motorcycle that includes an embodiment of a front and rear suspension system that is consistent with the various embodiments disclosed herein.

FIG. 20 shows a motorcycle 2000 that includes an embodiment of a front and rear suspension system that is consistent with the various embodiments disclosed herein. The force arrows show the various vehicle loads. The CM symbol 2012 represents the CM of the rider in an upright position, while CM symbol 2010 represents the CM of the rider is a more prone position.

Figure 21:
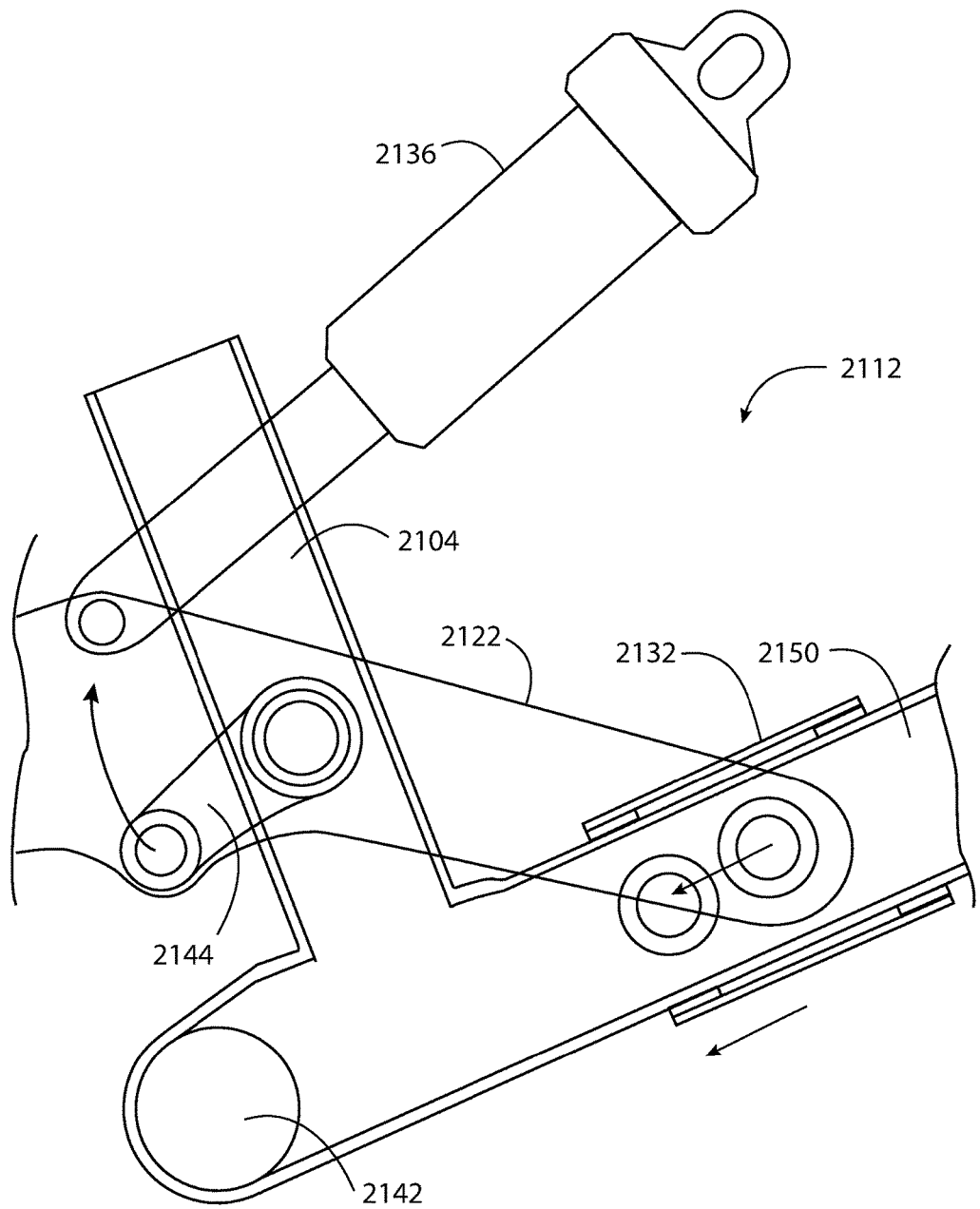
FIG. 21 shows a rear middle suspension that employs a slide link that slides along a frame's down tube.

FIG. 21 shows a rear middle suspension 2112 that employs a slide link 2132 that slides along a frame's down tube 2150, rather than the seat tube 2104. A shock 2136 is coupled to the bicycle's frame. The bottom bracket 2142 is also shown for reference. The slide link 2132 or collar is pivotally coupled to the rear swingarm 2122. A guide link 2144 also pivotally couples the rear swingarm 2122 to the frame.

Figure 22:
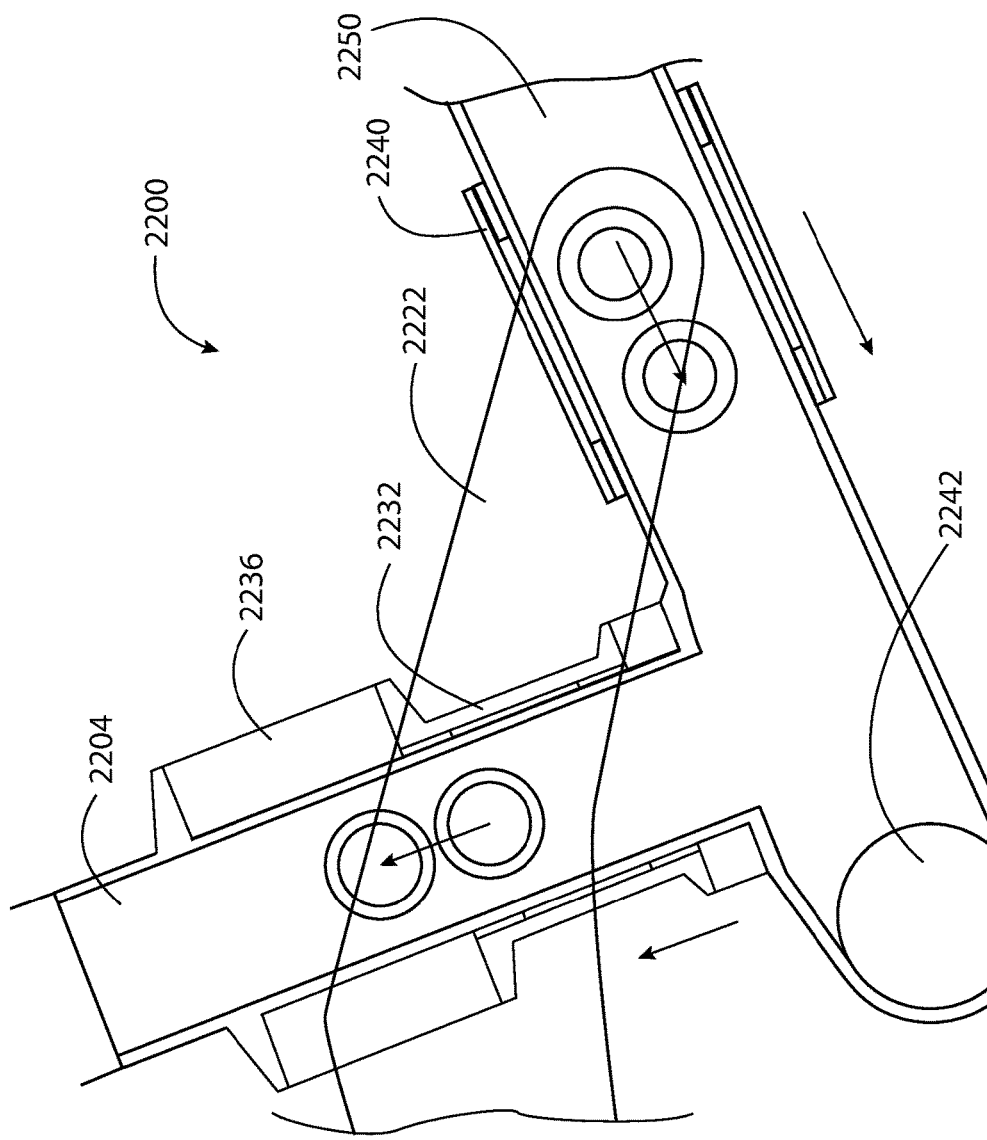
FIG. 22 shows a rear middle suspension that employs a first slide link that slides along a frame's down tube and a second slide link that slides along the frame's seat tube.

FIG. 22 shows a rear middle suspension 2200 that employs a first slide link 2240 that slides along a frame's down tube 2250 and a second slide link 2232 that slides along the seat tube 2204 of the frame. An elastomer 2236 is positioned on the seat tube 2204. Each of the slide links 2232/2240 pivotally connects the rear swingarm 2222 to the frame. The two slide links 2232/2240 work together to further constrain the travel of the rear wheel. The bottom bracket 2242 is shown for comparison.

Figure 23A:
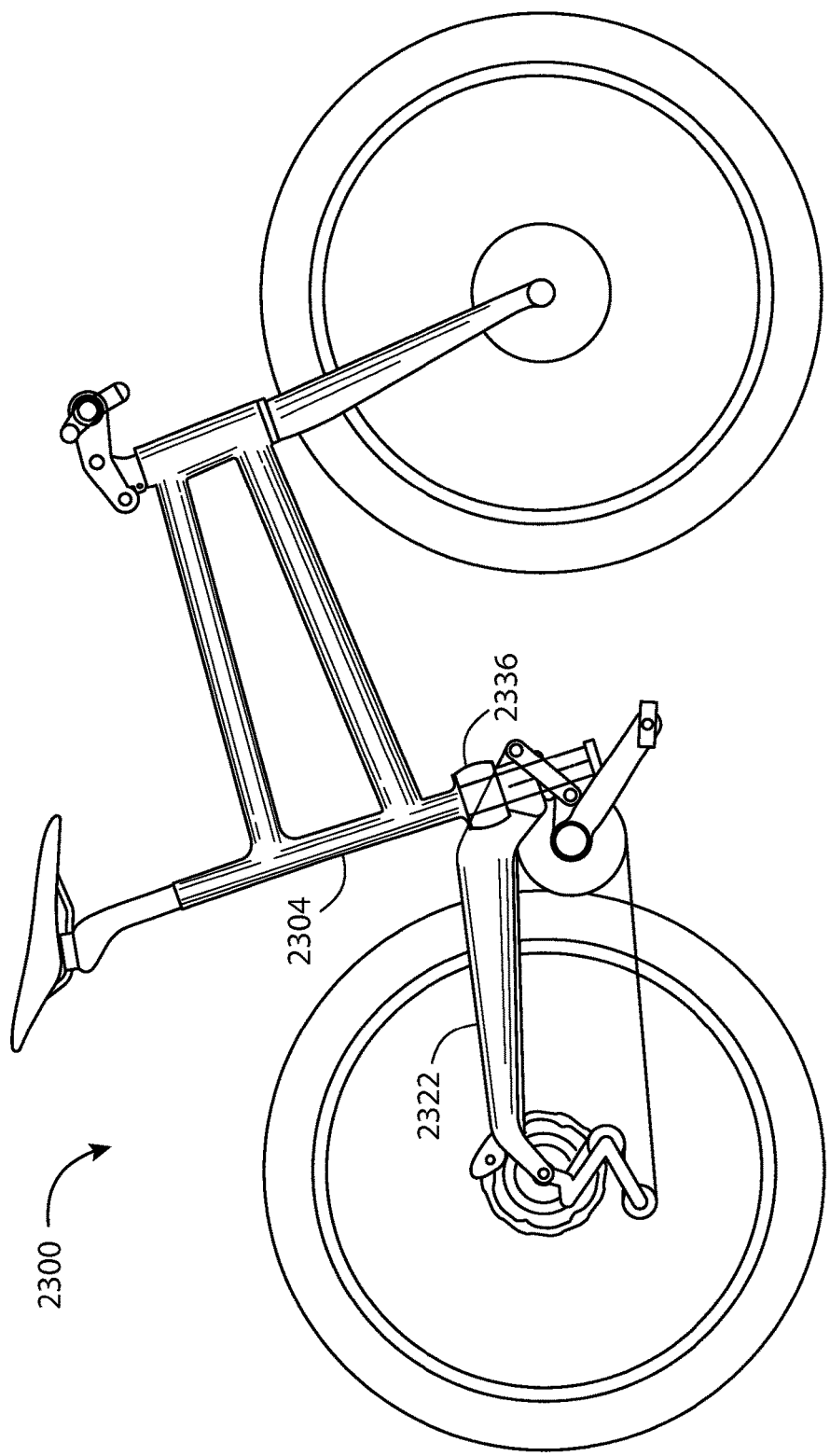
FIGS. 23A-B shown a folding bicycle that includes a rear middle and below suspension system as well as a front-middle, above, and below suspension that is consistent with the various embodiments disclosed here.
Figure 23B:
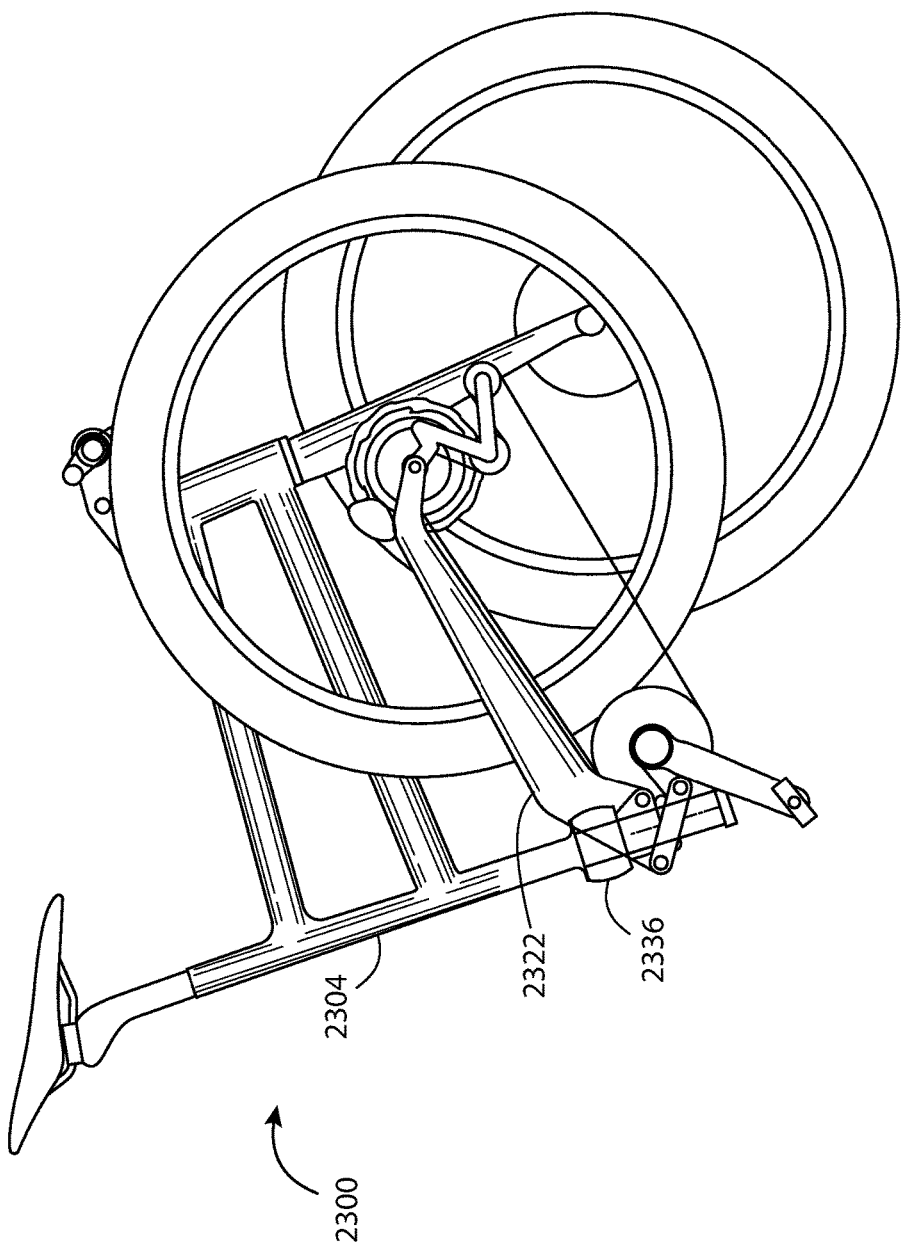

FIGS. 23A-B shown a folding bicycle 2300 that includes a rear middle and below suspension system as well as a front-middle, above, and below suspension that is consistent with the various embodiments disclosed herein. FIG. 23A shows bicycle in an unfolded or a riding state. The rear suspension includes a slide link 2231 that translates along the seat tube 2304 and a rear swingarm 2322.

The slide link 2332 is a splittable slide link that includes a clutch assembly 2336 that enables the slide link 2332 to be split into two halves. The clutch engages and disengages the two halves of slide link 2332.

FIG. 23B shows the folding bicycle 2300 in a folded state. The clutch assembly 2336 has disengaged the two halves of the slide link 2332 so that the rear swingarm 2322 can rotate about the seat tube 2304.

In other embodiments, the folding bicycle 2300 could flip in the opposite orientation, i.e. the rear swingarm and the control link could be either on the same lateral side of the folding bicycle 2300 or on opposite sides. In preferred embodiments, a locking mechanism may be engaged on slide link 2332 to prevent an accidental folding during operation of the bike. The locking mechanism may automatic. For instance, if a rider's mass is detected, via a mechanical, hydraulic, or other detecting means, the lock may be engaged.

The following additional embodiments, labeled Embodiment 1-93, are imported from the claims of the parent application to this disclosure, International Application No. PCT/US2015/018539.

Embodiment 1: A terrain-tracing system for a vehicle for traveling over terrain on a terrain-engaging member, the vehicle having a frame and the terrain-tracing system suspends the frame relative to the terrain, the system comprising: a terrain-engaging member mounting assembly having a first end and a second end, the mounting assembly coupled to the frame generally at the first end and coupled the terrain-engaging member generally at the second end; a slide link coupled to the frame and to the mounting assembly, wherein the slide link is configured and arranged to translate along a frame member of the frame; and a control link coupled to the frame and the terrain-engaging member mounting assembly.

Embodiment 2: The system of Embodiment 1, wherein the slide link includes an aperture that is configured and arranged to receive the frame member, such that when the slide link translates along the frame member, the slide link slides along the frame member that is received by the slide link aperture.

Embodiment 3: The system of Embodiment 1, wherein an angle between the frame member and the frame is fixed such that when the slide link translates along the frame member, an angular orientation of the slide link relative to the frame is fixed.

Embodiment 4. The system of Embodiment 1, wherein the frame member is rotationally coupled to the frame such that an angle between the frame member and the frame is variable and when the slide link translates along the frame member, an angular orientation of the slide link relative to the frame varies with the angle between the frame member and the frame.

Embodiment 5. The system of Embodiment 1, wherein an angle between the mounting assembly and the frame is variable and an angle between the mounting assembly and the frame member is fixed such that when the mounting assembly rotates relative to the frame, an angular orientation of the slide link relative to mounting assembly is fixed.

Embodiment 6. The system of Embodiment 5, wherein when the slide link translates along frame member, the angular orientation of the slide link relative to the mounting assembly is fixed and when the mounting assembly rotates relative to the frame, an angular orientation of the slide link relative to the frame varies with the between the mounting assembly and the frame.

Embodiment 7. The system of Embodiment 1, wherein the system is a front suspension, the terrain-engaging member is a front suspension, the terrain-engaging assembly is a fork, and the slide link and control link enables a relative translation between the fork and the frame.

Embodiment 8. The system of Embodiment 7, wherein the vehicle includes a handlebar and the slide link and the control link enables a relative rotation between the handlebar and the frame.

Embodiment 9. The system of Embodiment 8, wherein the system further includes a coupling between the relative translation between the fork and the frame and the relative rotation between the handlebar and the frame.

Embodiment 10. The system of Embodiment 1, wherein the slide link includes an aperture and the frame member is a stanchion and is pivotally coupled to the frame, the slide link aperture receives the stanchion such that the slide link slides along the barrel.

Embodiment 11. The system of Embodiment 1, wherein the control link includes at least one of a gearbox, transmission, or a power source.

Embodiment 12. The system of Embodiment 1, wherein the frame includes a seat tube and a bottom bracket, wherein a forward end of the control link is pivotally coupled to the mounting assembly and a rearward end of the control link is pivotally coupled to the frame forward of the bottom bracket.

Embodiment 13. The system of Embodiment 12, wherein the frame member includes at least a portion of the seat tube.

Embodiment 14. The system of Embodiment 1, further including at least one eccentric link that enables adjusting an angular orientation of the frame member relative to a vertical line.

Embodiment 15. The system of Embodiment 1, wherein at least one eccentric link that enables adjusting an angular orientation of the frame member relative to a vertical line.

Embodiment 16. The system of Embodiment 1, wherein the slide link is pivotally coupled to the arm.

Embodiment 17. The system of Embodiment 1, wherein the terrain engaging-engaging member is a rear wheel and the mounting assembly forms a swingarm for the vehicle.

Embodiment 18. The system of Embodiment 17, wherein the swingarm, the slide link, and the control link form a middle rear terrain-tracing sub-system that provides a middle travel of the rear wheel relative to the frame.

Embodiment 19. The system of Embodiment 18, wherein the vehicle further includes a saddle that is coupled to the frame and supports at least a first portion of a mass of a rider and the system further includes an above rear terrain-tracing sub-system that provides an above travel of the saddle relative to the frame.

Embodiment 20. The system of Embodiment 19, wherein the middle and above rear terrain-tracing subsystems are coupled such that a feedback signal is generated between the middle and above rear terrain-tracing subsystems in response to at least one of the rear middle travel or the rear-above travel.

Embodiment 21. The system of Embodiment 19, wherein the system further includes a middle front terrain-tracing sub-system and an above front terrain-tracing subsystem.

Embodiment 22. The system of Embodiment 21, wherein the middle and above front terrain-tracing subsystems are is coupled such that a front feedback signal is generated between the middle and above front terrain-tracing subsystems in response to at least one of the front-middle travel or the front-above travel.

Embodiment 23. The system of Embodiment 21, wherein at least one of the middle or the above rear terrain-tracing subsystems is coupled to at least one of the middle or the above front terrain-tracing subsystems.

Embodiment 24. The system of Embodiment 19, wherein the vehicle further includes a foot member that is coupled to the frame and supports at least a second portion of the mass of the rider and the system further includes a below rear terrain-tracing sub-system that provides a below travel of the foot member relative to the frame.

Embodiment 25. The system of Embodiment 24, wherein the middle, above, and below rear terrain-tracing subsystems are coupled such that a feedback signal is generated between the middle, above terrain-tracing subsystems in response to at least one of the middle travel or the above travel.

Embodiment 26. The system of Embodiment 18, wherein the vehicle further includes a foot member that is coupled to the frame and supports at least a second portion of the mass of the rider and the system further includes a below rear terrain-tracing sub-system that provides a below travel of the foot member relative to the frame.

Embodiment 27. The system of Embodiment 26, wherein the middle and below rear terrain-tracing subsystems are coupled such that a feedback signal is generated between the middle, above terrain-tracing subsystems in response to at least one of the middle travel or the above travel.

Embodiment 28. The system of Embodiment 1, wherein the system further includes a cantilevered bottom bracket.

Embodiment 29. The system of Embodiment 1, wherein the frame member is configurable in an anti-squat orientation and a pro-squat orientation.

Embodiment 30. The system of Embodiment 1, wherein the system further includes a sensor that actively adjusts a terrain-tracing system parameter in response to a current position of a center of mass of a vehicle payload.

Embodiment 31. A vehicle that includes: a frame member that includes an above-frame portion, a middle frame portion, and a below frame portion; a front ground-engaging member coupled to a front portion of the middle frame portion; a rear ground-engaging member coupled to a rear portion of the middle frame portion; a saddle coupled to a rear portion of the above-frame portion and configured and arranged to support a first portion of a mass of a rider when the rider is seated in the saddle; a hand member coupled to a front portion of the above-frame portion and configured and arranged to support a second portion of the rider's mass when at least one hand of the rider is in contact with the hand member; and a vehicle suspension system that includes a first above-suspension that provides a first above-vehicle travel in response to a vehicle load, wherein the first above-vehicle travel includes a relative travel between the frame member and at least one of the saddle or the hand member; a first middle-suspension that provides a first middle-vehicle travel in response to the vehicle load, wherein the first middle-vehicle travel includes a relative travel between the frame member and at least one of the front ground-engaging member or the rear ground-engaging member; and a first suspension coupling that provides a first feedback load based on at least one of the first above-vehicle travel or the first middle-vehicle travel and the first feedback load is included in the vehicle load.

Embodiment 32. The vehicle of Embodiment 31, wherein the first above-suspension is a rear-above suspension, the first above-vehicle travel is a relative travel between the frame member and the saddle, the first middle-suspension is a rear middle-suspension, and the first middle-vehicle travel is a relative travel between the frame member and the rear ground-engaging member.

Embodiment 33. The vehicle of Embodiment 32, wherein the vehicle suspension system further includes: a front-above suspension that provides a second above-vehicle travel in response to the vehicle load, wherein the second above-vehicle travel includes a relative travel between the frame member and the hand member; a front-middle suspension that provides a second middle-vehicle travel in response to the vehicle load, wherein the second middle-vehicle travel includes a relative travel between the frame member and the front ground-engaging member; and a second suspension coupling that provides a second feedback load based on at least one of the second above-vehicle travel or the second middle-vehicle travel and the second feedback load is included in the vehicle load.

Embodiment 34. The vehicle of Embodiment 32, wherein the vehicle further includes a foot member coupled to a rear portion of the below frame portion and configured and arranged to support a third portion of the rider's mass when at least one foot of the rider is in contact with the foot member; and the suspension system further includes a rear below-suspension that provides a first below-vehicle travel in response to the vehicle load, wherein the first below-vehicle travel includes a relative travel between the frame member and the foot member.

Embodiment 35. The vehicle of Embodiment 31, wherein the first above-suspension is a front-above suspension, the first above-vehicle travel is a relative travel between the frame member and the hand member, the first middle-suspension is a front-middle suspension, and the first middle-vehicle travel is a relative travel between the frame member and the front ground-engaging member.

Embodiment 36. The vehicle of Embodiment 35, wherein the suspension system further includes a front below-suspension that provides a first below-vehicle travel in response to the vehicle load, wherein the first below-vehicle travel includes another relative travel between the frame member and the front ground-engaging member.

Embodiment 37. The vehicle of Embodiment 31, wherein the first middle-suspension includes a slide link that couples the frame member and the at least one of the front ground-engaging member or the rear ground-engaging member.

Embodiment 38. The vehicle of Embodiment 37, wherein the first middle-suspension includes a slide link that couples the frame member and the at least one of the front ground-engaging member or the rear ground-engaging member.

Embodiment 39. The vehicle of Embodiment 38, wherein the slide link translates along a member that is pivotally coupled to the frame member.

Embodiment 40. The vehicle of Embodiment 38, wherein the slide link translates along a member that is rigidly coupled to the frame member.

Embodiment 41. The vehicle of Embodiment 38, wherein the first middle suspension further includes an eccentric link that pivotally couples a rear swingarm and the frame member.

Embodiment 42. The vehicle of Embodiment 37, wherein the first middle-suspension is a front-middle suspension and the first middle-vehicle travel is a relative travel between the frame member and the front ground-engaging member.

Embodiment 43. The vehicle of Embodiment 31, wherein the first middle-suspension includes an eccentric link that pivotally couples the frame member and the at least one of the front ground-engaging member or the rear ground-engaging member.

Embodiment 44. The vehicle of Embodiment 43, wherein the eccentric link provides the first suspension coupling.

Embodiment 45. The vehicle of Embodiment 31, wherein the frame member includes a flexible top tube member that flexibly couples the saddle to the frame member such that the first above-vehicle travel includes a relative travel between the frame member and the saddle.

Embodiment 46. The vehicle of Embodiment 31, wherein the frame member includes a top tube member that is pivotally couples the saddle to the frame member such that the first above-vehicle travel includes a relative travel between the frame member and the saddle.

Embodiment 47. The vehicle of Embodiment 31, wherein the first above-vehicle travel includes a relative rotation between the hand member and the frame member and the first middle-vehicle travel includes a relative translation between the front ground-engaging member and the frame member.

Embodiment 48. The vehicle of Embodiment 31, wherein the vehicle suspension system further includes a biasing member to at least partially inhibit the transmittance of the feedback load between the first above-suspension and the first middle suspension.

Embodiment 49. The vehicle of Embodiment 48, wherein the biasing member is a leaf spring.

Embodiment 50. The vehicle of Embodiment 31, wherein the vehicle suspension system includes a control link that pivotally couples a rear member to the frame member, wherein the rear member is coupled to the rear ground-engaging member.

Embodiment 51. The vehicle of Embodiment 50, wherein another link further couples the rear swingarm to the frame member.

Embodiment 52. The vehicle of Embodiment 51, wherein the other link is oriented in substantial alignment a drivetrain load of the vehicle, such that a majority of the drivetrain load is transmitted by the other link.

Embodiment 53. The vehicle of Embodiment 51, wherein the other link is a slide link that translates along a stanchion that is rigidly coupled to the rear swingarm.

Embodiment 54. The vehicle of Embodiment 53, wherein the control link is coupled to the rear swingarm such that the control link crosses the control link.

Embodiment 55. The vehicle of Embodiment 53, wherein the control link is coupled to the rear swingarm such that the control link does not cross completely above the control link.

Embodiment 56. The vehicle of Embodiment 51, wherein the control link is coupled to a foot member that is coupled to the frame member to enable a relative travel between the foot member and the frame member, such that a rotation of the control link relative to the frame member induces the relative travel between the foot member and the frame member.

Embodiment 57. The vehicle of Embodiment 31, wherein at least one of the first above-vehicle travel or the middle-vehicle travel is a digressive travel.

Embodiment 58. The vehicle of Embodiment 31, wherein at least one of the first above-vehicle travel or the middle-vehicle travel is a progressive travel.

Embodiment 59. The vehicle of Embodiment 31, wherein the first above-vehicle travel is a compensatory travel relative to the first middle-vehicle travel.

Embodiment 60. The vehicle of Embodiment 31, wherein a travel ratio between the first above-vehicle travel and the first middle-vehicle travel is based on at least the first suspension coupling.

Embodiment 61. A vehicle comprising: a plurality of ground-engaging members; a frame supported by the plurality of ground-engaging members; a saddle that supports at least a first portion of a mass of a rider; a handle member that supports at least a second portion of the mass of the rider; a drivetrain that provides energy to at least one of the plurality of ground-engaging members; a braking system that dissipates energy away from at least one of the ground-engaging members; a ground-tracing system that couples at least one of the ground-engaging members to the frame and suspends the frame relative to the at least one ground-engaging member; a sensing system that at least partially generates a CM-shift signal based on a CM-shift of a vehicle payload, wherein the vehicle payload includes at least the mass of the rider; and wherein at least one operational parameter of the vehicle is based on at least the generated CM-shift signal.

Embodiment 62. The vehicle of Embodiment 61, wherein the CM-shift signal is generated at the handle member.

Embodiment 63. The vehicle of Embodiment 61, wherein the ground-tracing system includes at least a middle suspension that provides a middle travel between the frame and at least one of the ground-engaging members and an above suspension that provides an above travel between the frame and at least one of the saddle or the handle member.

Embodiment 64. The vehicle of Embodiment 63, wherein the middle suspension is a rear middle suspension, the middle travel is between the frame and a rear ground-engaging member, the above suspension is a rear-above suspension, and the above travel is between the frame and the saddle member.

Embodiment 65. The vehicle of Embodiment 63, wherein the middle suspension is a front-middle suspension, the middle travel is between the frame and a front ground-engaging member, the above suspension is a front-above suspension, and the above travel is between the frame and the handle member.

Embodiment 66. The vehicle of Embodiment 61, wherein the ground-tracing system includes at least a middle suspension that provides a middle travel between the frame and at least one of the ground-engaging members and a below suspension that provides a below travel between the frame and at least one of a foot member or a front ground-engaging member.

Embodiment 67. The vehicle of Embodiment 66, wherein the middle suspension is a rear middle suspension, the middle travel is between the frame and a rear ground-engaging member, the below suspension is a rear below suspension, and the below travel is between the frame and the foot member.

Embodiment 68. The vehicle of Embodiment 66, wherein the middle suspension is a front-middle suspension, the middle travel is includes a translation between the frame and a front ground-engaging member, the below suspension is a front below suspension, and the below travel includes a rotation between the frame and the front ground-engaging member.

Embodiment 69. The vehicle of Embodiment 61, wherein the sensing system includes a coupling between a first relative travel of the ground-tracing system and a second relative travel of the ground-tracing system.

Embodiment 70. The vehicle of Embodiment 69, wherein the coupling between the first and the second relative travel includes at least a mechanical link.

Embodiment 71. The vehicle of Embodiment 69, wherein the coupling between the first and the second relative travel includes at least one of a pneumatic coupling or a hydraulic coupling.

Embodiment 72. The vehicle of Embodiment 69, wherein the coupling between the first and the second relative travel includes at least at least an electrical coupling.

Embodiment 73. The vehicle of Embodiment 69, wherein the coupling generates the CM-shift signal.

Embodiment 74. The vehicle of Embodiment 69, wherein the first and the second relative travels are compensating travels such that a geometry parameter of the vehicle remains substantially constant over a range associated with the first and the second relative travels.

Embodiment 75. The vehicle of Embodiment 69, wherein at least one of the first or second relative travels generates a progressive variance on the operation parameter.

Embodiment 76. The vehicle of Embodiment 69, wherein at least one of the first or second relative travels generates a digressive variance on the operation parameter.

Embodiment 77. The vehicle of Embodiment 69, wherein the sensing system further includes a clutch assembly to disengage and engage the coupling.

Embodiment 78. The vehicle of Embodiment 69, wherein a travel aspect ratio between the first and the second relative travels is based on the coupling.

Embodiment 79. The vehicle of Embodiment 69, wherein the sensing system further includes a controlling unit that controls a coupling strength of the coupling.

Embodiment 80. The vehicle of Embodiment 69, wherein the coupling includes at least one of a plurality of gears, a transmission assembly, or a power source.

Embodiment 81. The vehicle of Embodiment 69, wherein the operational parameters include a travel aspect ratio between the first and the second relative travels.

Embodiment 82. The vehicle of Embodiment 61, wherein the a frame geometry of the frame is based on a geometry parameter, the ground-tracing system is parameterized by a suspension parameter, the braking system is parameterized by a braking parameter, and the drivetrain is parameterized by a drivetrain parameter, and wherein the operational parameter includes at least one of geometry parameter, the suspension parameters, the braking parameter, or the drivetrain parameter.

Embodiment 83. The vehicle of Embodiment 61, wherein the operational parameter includes at least one of a spring rate, or damping strength associated with the ground-tracing system.

Embodiment 84. A portion of a vehicle, the portion including:
a frame; a front ground-engaging member; a front ground-tracking system that couples the front ground-engaging member to the frame and is configured and arranged to provide a relative movement between the front ground-engaging member and the frame in response to a vehicle load;
a handgrip that is coupled to the frame and configured and arranged to provide a point of contact between a hand of a rider and the vehicle; a sensor that is configured and arranged to sense a generally upward load on the hand grip, wherein in response to sensing the generally upward load on the hand grip generating an adjust signal that at least partially inhibits the relative movement between the front ground-engaging member and the frame.

Embodiment 85. A vehicle that includes: a frame;
a front wheel mounting assembly that is coupled to the frame and is configured and arranged to couple a front wheel to the vehicle; a handlebar member that is coupled to the frame and is configured and arranged to provide a point of contact between a hand of a rider and the vehicle; a front ground-tracking system that, in response to a vehicle load, provides a relative translation between the frame and the front wheel mounting assembly along a translation axis and a relative rotation between the handlebar member and the frame about a rotation axis, wherein the translation axis is substantially transverse to the rotation axis.

Embodiment 86. A vehicle that includes: a frame; a rear wheel mounting assembly configured and arranged to couple a rear wheel to the vehicle, wherein the rear wheel mounting assembly includes a drivetrain member that is substantially aligned with an axis of a drivetrain of the vehicle and a stay member that is oriented at an angle with respect to the drivetrain member and wherein each of the drivetrain member and the stay member is coupled to the frame, and wherein at least one of the drivetrain member or the stay member is a flexible member such that the angle between the drivetrain member and the stay member varies in response to a vehicle load.

Embodiment 87. A vehicle that includes: a frame that includes a head member; a front wheel mounting assembly configured and arranged to couple a front wheel to the vehicle and at least a portion of the front wheel mounting assembly is received by the head member of the frame such that the front wheel mounting assembly is coupled to the front wheel; and a biasing member at least partially disposed within the head member that is configured and arranged to bias a relative travel between the frame and the front wheel mounting assembly.

Embodiment 88. The vehicle of Embodiment 87 that further includes: an energy-dissipating member at least partially disposed within the head member that is configured and arranged to dissipate at least a portion of energy associated with the relative travel between the frame and the front wheel mounting assembly.

Embodiment 89. The vehicle of Embodiment 87, wherein the biasing member is an elastomeric member.

Embodiment 90. The vehicle of Embodiment 87, wherein the biasing member is a microcellular urethane spring.

Embodiment 91. The vehicle of Embodiment 87, wherein a suspension travel occurs interior to the head tube.

Embodiment 92. A vehicle that includes: a head tube; a concentric steerer tube configuration that includes at least a first steerer tube concentric to a second steerer tube, wherein at least a portion of the concentric steerer tube configuration in positioned within the head tube.

Embodiment 93. The vehicle of Embodiment 92, wherein a lower link couples a movement of the concentric steerer tube configuration with another movement of a wheel mounting assembly included with the vehicle.

All of the embodiments and methods disclosed and claimed herein can be made and executed without undue experimentation in light of the present disclosure. While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:
1. A vehicle that includes:
a frame;
a head tube fixedly coupled to the frame;
a front wheel mounting assembly that is coupled to the frame and is configured and arranged to couple a front wheel to the vehicle;
a first steerer tube fixedly coupled to the front wheel assembly and positioned at least partially within the head tube;
a handlebar member that is coupled to the frame and is configured and arranged to provide a point of contact between a hand of a rider and the vehicle; and
a front ground-tracking system configured to, in response to a vehicle load, provide a relative translation between the frame and the front wheel mounting assembly along a first axis and a relative movement between the handlebar-member and the frame about a second axis that is substantially transverse to the first axis, the relative translation correlated with the relative move- ment and comprising a substantially linear movement of the first steerer tube along the first axis within the head tube.

2. The vehicle of claim 1, further comprising:
a stem member, coupled to the handlebar member and rotationally coupled to the front wheel mounting assembly about the second axis, the second axis substantially parallel to an axle of the front wheel of the vehicle.

3. The vehicle of claim 2, the front wheel mounting assembly further comprising:
a second steerer tube concentric to the first steerer tube, at least a portion of the second steerer tube positioned within the head tube;
wherein the first steerer tube moves substantially linearly along the first axis through the second steerer tube in response to the vehicle load.

4. The vehicle of claim 3, the front ground-tracking system comprising:
a first component fixedly coupled to the first steerer tube and rotationally coupled to the stem member at the second axis by a first axle; and
a second component fixedly coupled to the second steerer tube and rotationally coupled to the stem member by a second axle.

5. The vehicle of claim 2, the front ground-tracking system comprising:
a biasing member at least partially disposed within the head tube that is configured and arranged to bias the relative translation between the frame and the front wheel mounting assembly.

6. A vehicle comprising:
a head tube;
a concentric steerer tube configuration that includes at least a first steer tube internally concentric to, and translationally moveable within, a second steer tube, at least a portion of the concentric steerer tube configuration positioned within the head tube; and
a stem coupled to both the first steer tube and the second steer tube and configured to correlate an angular movement of the stem relative to the concentric steerer tube configuration with a translational movement of the first steer tube within the second steer tube.

7. The vehicle of claim 6, wherein:
a lower link couples a movement of the concentric steerer tube configuration with another movement of a wheel mounting assembly included with the vehicle.

8. The vehicle of claim 6, further comprising:
a fork fixedly coupled to the first steer tube, the fork configured and arranged to couple a front wheel to the vehicle; and
at least one head tube bearing positioned between the second steer tube and the head tube to rotationally couple the concentric steerer tube configuration to the head tube.

9. The vehicle of claim 6, further comprising:
a handlebar coupled to the stem;
a head steer tube clamp coupled to the stem and to the second steer tube; and
a fork steer tube clamp coupled to the stem and to the first steer tube.

10. The vehicle of claim 9, at least one of the head steer tube clamp and the fork steer tube clamp comprising a flexible portion.

11. The vehicle of claim 9, further comprising:
the head steer tube clamp rotationally coupled to the stem by a primary axle and fixedly coupled to the second steer tube; and
the fork steer tube clamp rotationally coupled to the stem by a secondary axle and fixedly coupled to the first steer tube;
wherein the angular movement of the stem relative to the concentric steerer tube configuration comprises a rotation of the stem about the primary axle.

12. The vehicle of claim 11, further comprising:
a guide link support extending from the handlebar at a fixed angle; and
a guide link coupled between the guide link support and the head steer tube clamp;
wherein the rotation of the stem about the primary axle is correlated with a rotation of the handlebar within the stem.

13. The vehicle of claim 6, further comprising:
a biasing member at least partially disposed within the head tube that is configured and arranged to bias a relative translational travel between the first steer tube and the second steer tube.

14. The vehicle of claim 6, further comprising:
a four-bar suspension system coupling the first steer tube to the second steer tube, one bar of the four bar suspension system comprising the stem.

15. A vehicle comprising:
a frame that includes a head member;
a front wheel mounting assembly configured and arranged to couple a front wheel to the vehicle, at least a portion of the front wheel mounting assembly received by the head member of the frame such that the front wheel is steerably coupled to the frame; and
a front suspension system comprising:
a fork steer tube fixed to the front wheel mounting assembly and at least partially disposed within the head member;
a head steer tube concentrically arranged around the fork steer tube and at least partially disposed within the head member;
a stem coupled to both the fork steer tube and the head steer tube and configured to correlate an angular movement of the stem relative to the head steer tube with a translational movement of the fork steer tube within the head steer tube; and
a biasing member at least partially disposed within the head member that is configured and arranged to bias a relative travel between the frame and the front wheel mounting assembly by biasing translational movement of the fork steer tube within the head steer tube
wherein a suspension travel comprises the translational movement of the fork steer tube within the head steer tube.

16. The vehicle of claim 15 that further includes:
an energy-dissipating member at least partially disposed within the head member that is configured and arranged to dissipate at least a portion of energy associated with the relative travel between the frame and the front wheel mounting assembly.

17. The vehicle of claim 15, wherein the biasing member is an elastomeric member.

18. The vehicle of claim 15, wherein the biasing member is a microcellular urethane spring.

* * * * *

UNITED STATES PATENT AND TRADEMARK OFFICE
CERTIFICATE OF CORRECTION

PATENT NO. : 10,351,206 B2  
APPLICATION NO. : 15/256561  
DATED : July 16, 2019  
INVENTOR(S) : Darrell W. Voss Page 1 of 1

It is certified that error appears in the above-identified patent and that said Letters Patent is hereby corrected as shown below:

In the Claims

In Column 36, Line 55-56, the phrase "the front wheel assembly" should be replaced with --the front wheel mounting assembly--.

Signed and Sealed this
Seventeenth Day of August, 2021

Drew Hirshfeld
*Performing the Functions and Duties of the
Under Secretary of Commerce for Intellectual Property and
Director of the United States Patent and Trademark Office*